US009774376B2

(12) United States Patent
Ko et al.

(10) Patent No.: US 9,774,376 B2
(45) Date of Patent: Sep. 26, 2017

(54) SIGNAL TRANSMISSION METHOD AND APPARATUS USING CODEBOOK IN WIRELESS COMMUNICATION SYSTEM SUPPORTING MULTIPLE ANTENNAS

(71) Applicant: LG ELECTRONICS INC., Seoul (KR)

(72) Inventors: Hyun Soo Ko, Anyang-si (KR); Jae Hoon Chung, Anyang-si (KR); Seung Hee Han, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/133,506

(22) Filed: Apr. 20, 2016

(65) Prior Publication Data

US 2016/0233935 A1 Aug. 11, 2016

Related U.S. Application Data

(63) Continuation of application No. 14/310,174, filed on Jun. 20, 2014, now Pat. No. 9,363,000, which is a
(Continued)

(51) Int. Cl.
*H04B 7/04* (2017.01)
*H04B 7/06* (2006.01)
(Continued)

(52) U.S. Cl.
CPC ......... *H04B 7/0473* (2013.01); *H04B 7/0456* (2013.01); *H04B 7/0465* (2013.01);
(Continued)

(58) Field of Classification Search
None
See application file for complete search history.

(56) References Cited

U.S. PATENT DOCUMENTS 8,792,586 B2   7/2014  Ko et al.
2008/0186212 A1*  8/2008  Clerckx ............... H04B 7/0456
                                                 341/55
(Continued)

FOREIGN PATENT DOCUMENTS

CN   101540663   9/2009
CN   101558642   10/2009
(Continued)

OTHER PUBLICATIONS

3GPP (3GPP TS 36.211 v8.1.0 (Nov. 2007 ), Technical Specification, "3rd Generation Partnership Project; Technical Specification Group Radio Access Network; Evolved Universal Terrestrial Radio Access (E-UTRA); Physical Channels and Modulation (Release 8)").*

(Continued)

*Primary Examiner* — Leon-Viet Nguyen
(74) *Attorney, Agent, or Firm* — Lee Hong Degerman Kang Waimey

(57) ABSTRACT

The present invention relates to a method for transmitting, by a base station, a downlink signal using a plurality of transmission antennas comprises the steps of: applying a precoding matrix indicated by the PMI, received from a terminal, in a codebook to a plurality of layers, and transmitting the precoded signal to the terminal through a plurality of transmission antennas. Among precoding matrices included in the codebook, a precoding matrix for even number transmission layers can be a 2×2 matrix containing four matrices (W1s), the matrix (W1) having rows of a number of transmission antennas and columns of half the number of transmission layers, the first and second columns of the first row in the 2×2 matrix being multiplied by 1, the first column of the second row being multiplied by coeffi- (Continued)

cient "a" of a phase, and the first column of the second row being multiplied by "−a".

12 Claims, 44 Drawing Sheets

Related U.S. Application Data continuation of application No. 13/639,991, filed as application No. PCT/KR2011/002488 on Apr. 8, 2011, now Pat. No. 8,792,586.

(60) Provisional application No. 61/321,887, filed on Apr. 8, 2010, provisional application No. 61/324,295, filed on Apr. 14, 2010.

(51) Int. Cl.
*H04L 25/03* (2006.01)
*H04B 7/0456* (2017.01)
*H04L 27/26* (2006.01)
*H04W 72/02* (2009.01)
*H04W 72/04* (2009.01)
*H04W 88/02* (2009.01)
*H04W 88/08* (2009.01)

(52) U.S. Cl.
CPC ......... *H04B 7/0478* (2013.01); *H04B 7/0639* (2013.01); *H04B 7/0669* (2013.01); *H04L 25/03898* (2013.01); *H04L 25/03949* (2013.01); *H04L 27/2602* (2013.01); *H04L 27/2636* (2013.01); *H04W 72/02* (2013.01); *H04W 72/0446* (2013.01); *H04B 7/0469* (2013.01); *H04L 27/2633* (2013.01); *H04W 88/02* (2013.01); *H04W 88/08* (2013.01)

(56) References Cited

U.S. PATENT DOCUMENTS

| | | |
|---|---|---|
| 2009/0080560 A1 | 3/2009 | Na et al. |
| 2009/0110114 A1 | 4/2009 | Onggosanusi et al. |
| 2009/0117862 A1 | 5/2009 | Le Nir et al. |
| 2009/0190685 A1 | 7/2009 | Kimura |
| 2009/0322613 A1 | 12/2009 | Bala et al. |
| 2010/0172430 A1* | 7/2010 | Melzer ............... H04B 7/0417 375/267 |
| 2010/0239036 A1 | 9/2010 | Koo et al. |
| 2010/0272014 A1 | 10/2010 | Orlik et al. |
| 2013/0294542 A1 | 11/2013 | Zhang et al. |

FOREIGN PATENT DOCUMENTS

| | | |
|---|---|---|
| JP | 5785605 | 9/2015 |
| WO | 2010/013950 | 2/2010 |
| WO | 2010/016719 | 2/2010 |
| WO | 2010/145554 | 12/2010 |

OTHER PUBLICATIONS

Catt, "Investigation on Precoding Codebooks for 8Tx DL MIMO," 3GPP TSG RAN WG1 #60bis, R1-101770, Apr. 2010, 8 pages.
Ericsson, et al., "Further Refinements of Feedback Framework," 3GPP TSG-RAN WG1 #60bis, R1-101742, Apr. 2010, 9 pages.
Catr, "DL 8-TX MIMO Codebook Design for LTE-A systems," 3GPP TSG RAN WG1 Meeting #60bis, R1-102012, Apr. 2010, 6 pages.
Texas Instruments, "Possible Refinement on 8Tx Codebook Design," 3GPP TSG RAN WG1 60bis, R1-102104, Apr. 2010, 8 pages.
Marvell Semiconductor, "Precoding options for 8Tx antennas in LTE-A DL," 3GPP TSG RAN WG1 Meeting #55bis, R1-090388, Jan. 2009, 6 pages.
LG Electronics, "Feedback Codebook Design and Performance Evaluation," 3GPP TSG RAN WG1 Meeting #61bis, R1-103970, Jun. 2010, 6 pages.
LG Electronics, "DL Codebook design for 8Tx precoding," 3GPP TSG RAN WG1 Meeting #60bis, R1-102380, Apr. 2010, 4 pages.
Ericsson, et al., "Refinements on UE Feedback," R1-102560, Apr. 2010, 2 pages.
3rd Genereation Partnership Project, "Technical Specification Group Radio Access Network; Evolved Universal Terrestrial Radio Access (E-UTRA); Physical Channels and Modulations (Release 8)", 3PP TS 36.211 v8.1.0, Nov. 2007, 54 pages.
The State Intellectual Property Office of the People's Republic of China Application Serial No. 201180026763.8, Office Action dated Nov. 4, 2014, 6 pages.
European Patent Office Application Serial No. 11766192.6, Search Report dated Jun. 1, 2017, 11 pages.
CATT, "Codebook design for 8Tx DL MIMO", R1-100890, 3GPP TSG RAN WG1 Meeting #60, R1-100890, 10 pages.

\* cited by examiner

FIG. 13
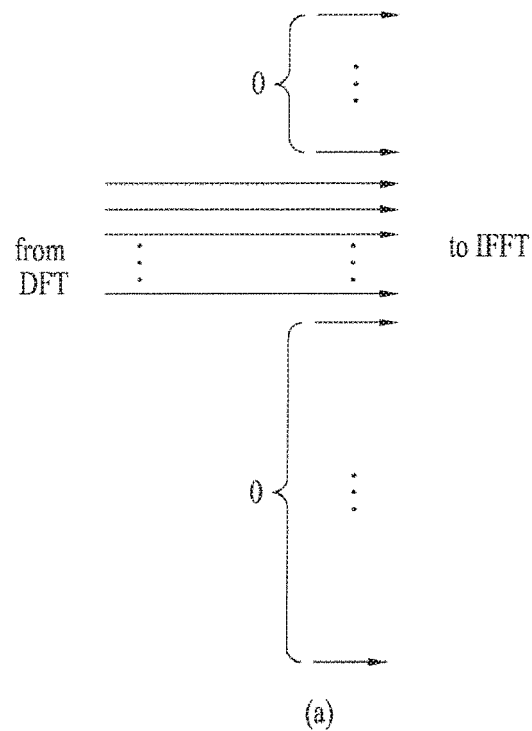
(a)
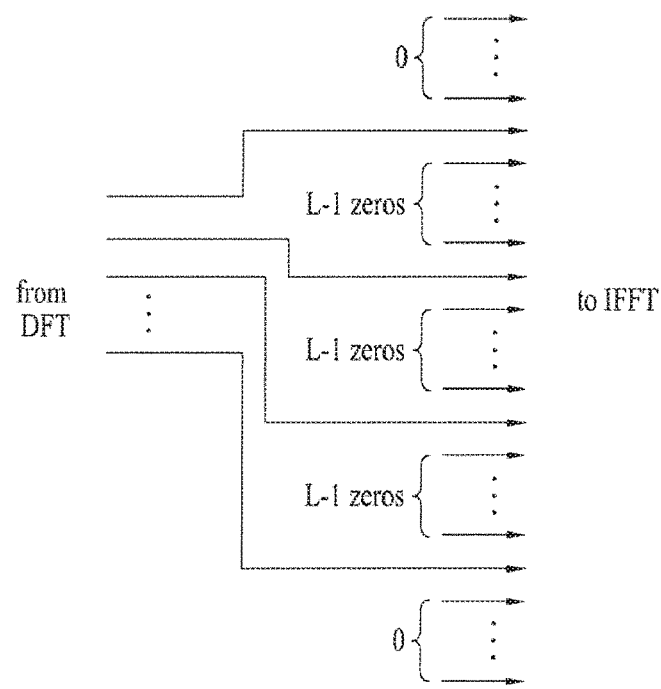
(b)

FIG. 15
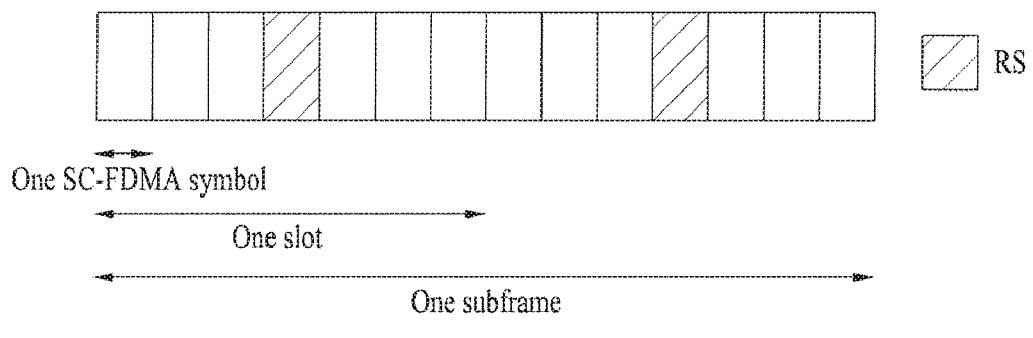
(a)
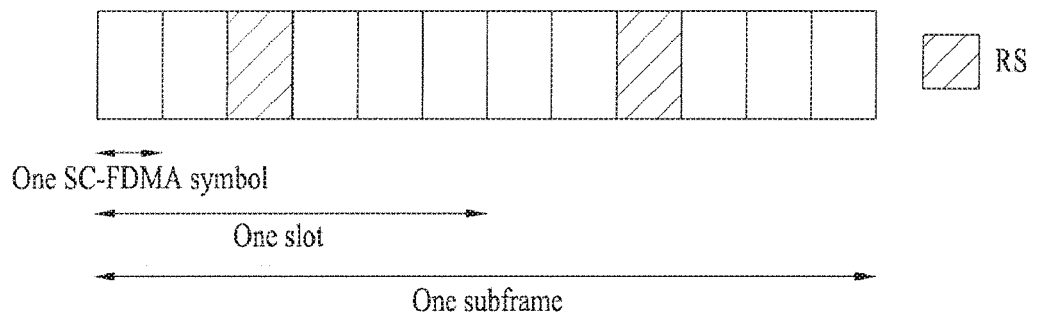
(b)

FIG. 23
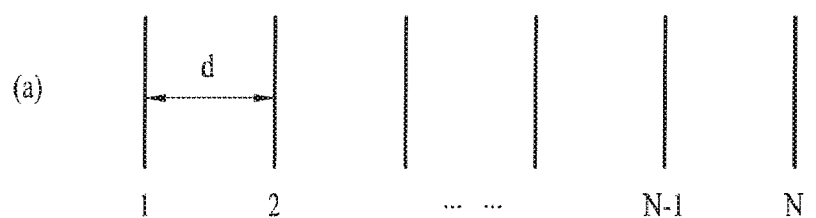
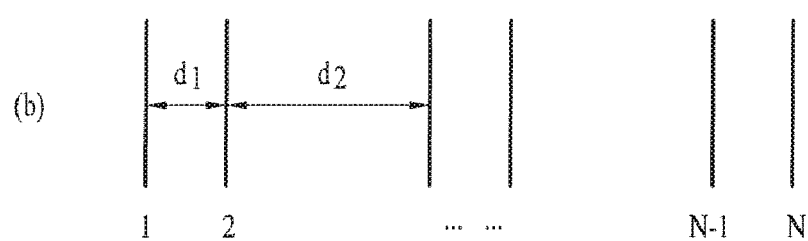
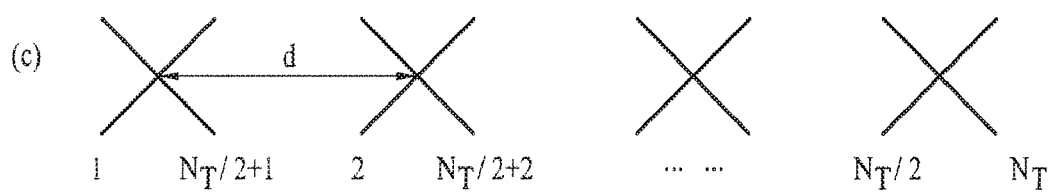

SIGNAL TRANSMISSION METHOD AND APPARATUS USING CODEBOOK IN WIRELESS COMMUNICATION SYSTEM SUPPORTING MULTIPLE ANTENNAS

CROSS-REFERENCE TO RELATED APPLICATIONS

This application is a continuation of U.S. application Ser. No. 14/310,174, filed on Jun. 20, 2014, now U.S. Pat. No. 9,363,000, which is a continuation of U.S. application Ser. No. 13/639,991, filed on Dec. 10, 2012, now U.S. Pat. No. 8,792,586, which is the National Stage filing under 35 U.S.C. 371 of International Application No. PCT/KR2011/002488, filed on Apr. 8, 2011, which claims the benefit of U.S. Provisional Application No. 61/321,887, filed on Apr. 8, 2010, and 61/324,295, filed on Apr. 14, 2010, the contents of which are all hereby incorporated by reference herein in their entirety.

TECHNICAL FIELD

The present invention relates to a wireless communication system, and more particularly to a method and apparatus for transmitting signals using a codebook in a wireless communication system supporting multiple antennas.

BACKGROUND ART

Generally, Multiple-Input Multiple-Output (MIMO) technology will hereinafter be described in detail. In brief, MIMO is an abbreviation for Multiple Input Multiple Output. MIMO technology uses multiple transmit (Tx) antennas and multiple receive (Rx) antennas to improve the efficiency of transmit/receive (Tx/Rx) of data, whereas the conventional art generally uses a single transmit (Tx) antenna and a single receive (Rx) antenna. In other words, MIMO technology allows a transmitting end and a receiving end to use multiple antennas so as to increase capacity or improve performance. If necessary, the MIMO technology may also be called multi-antenna technology.

In order to support MIMO transmission, a precoding matrix that properly distributes transmission information according to a channel condition and the like can be used. The conventional 3GPP system supports a maximum of 4Tx antennas for downlink transmission, and defines a precoding codebook for a maximum of 4Tx antennas.

DISCLOSURE

Technical Problem

Accordingly, the present invention is directed to a method and apparatus for transmitting signals using a codebook in a wireless communication system supporting multiple antennas that substantially obviate one or more problems due to limitations and disadvantages of the related art.

In a legacy 3GPP LTE system (for example, a system of 3GPP LTE Release 8 or 9), a codebook for supporting a maximum of 4 transmit (Tx) antennas on downlink has been designed. The 3GPP LTE-A system evolved from the legacy 3GPP LTE is configured to use the extended antenna structure for improved performance (for example, improved spectral efficiency), and can support a maximum of 8Tx antennas on downlink. In order to provide higher throughput, a closed loop MIMO scheme for 8Tx-antennas downlink transmission can be used. In addition, in order to reduce the amount of channel information feedback overhead, a closed-loop MIMO scheme based on a predefined codebook may be used. Therefore, there is a need to design a precoding codebook capable of providing superior performance to downlink transmission based on a maximum of 8 transmit (Tx) antennas.

An object of the present invention is to provide a method and apparatus for transmitting signals using a codebook capable of efficiently supporting MIMO transmission supporting an extended antenna configuration. Another object of the present invention is to provide a method and apparatus for transmitting signals using a codebook that reduces feedback overhead and at the same time maintains system performance for MIMO transmission based on a plurality of Tx antennas.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting a downlink signal using 2·N (N is a natural number) transmit (Tx) antennas by a base station (BS) including: receiving a first precoding matrix index (PMI) and a second precoding matrix index (PMI) from a user equipment (UE); determining a precoding matrix indicated by a combination of the first PMI and the second PMI on the basis of a prestored codebook; performing precoding by applying the determined precoding matrix to the downlink signal mapped to R layers (where $1 \leq R \leq 8$); and transmitting the precoded signal to the user equipment (UE) through 2·N Tx antennas, wherein the prestored codebook includes precoding matrices configured in the form of $$\begin{bmatrix} W_1 & W_1 \\ aW_1 & -aW_1 \end{bmatrix}$$

when R is an even number, where $W_1$ is an $N \times (R/2)$ matrix and a is a coefficient of a phase.

In another aspect of the present invention, a method for processing a downlink signal using 2·N (N is a natural number) transmit (Tx) antennas by a user equipment (UE) includes transmitting a first precoding matrix index (PMI) and a second precoding matrix index (PMI) indicating a precoding matrix selected from a prestored codebook to a base station (BS); receiving the downlink signal, that is mapped to R layers (where $1 \leq R \leq 8$), is precoded by a precoding matrix indicated by a combination of the first and second PMIs, and is then transmitted through the 2·N Tx antennas, from the base station (BS); and processing the downlink signal using the precoding matrix, wherein the prestored codebook includes precoding matrices configured in the form of $$\begin{bmatrix} W_1 & W_1 \\ aW_1 & -aW_1 \end{bmatrix}$$

when R is an even number, where $W_1$ is an N×(R/2) matrix and a is a coefficient of a phase.

In another aspect of the present invention, a base station (BS) for transmitting a downlink signal includes: 2·N (N is a natural number) transmit (Tx) antennas; a transmission (Tx) module for transmitting the downlink signal to a user equipment (UE) through the 2·N Tx antennas; a reception (Rx) module for receiving an uplink signal from the user equipment (UE); a memory for storing a codebook including a precoding matrix; and a processor for controlling the base station (BS), wherein the processor enables the reception (x) module to receive a first precoding matrix index (PMI) and a second precoding matrix index (PMI) from a user equipment (UE), determines a precoding matrix indicated by a combination of the first PMI and the second PMI on the basis of the codebook stored in the memory, maps the downlink signal to R layers (where 1≤R≤8), performs precoding by applying the determined precoding matrix to the downlink signal mapped to the R layers, and allows the transmission (Tx) module to transmit the precoded signal to the user equipment (UE) through 2·N Tx antennas, and wherein the prestored codebook includes precoding matrices configured in the form of $$\begin{bmatrix} W_1 & W_1 \\ aW_1 & -aW_1 \end{bmatrix}$$

when R is an even number, where $W_1$ is an N×(R/2) matrix and a is a coefficient of a phase.

In another aspect of the present invention, a user equipment (UE) for processing a downlink signal received from a base station (BS) including 2·N (N is a natural number) transmit (Tx) antennas includes: a reception (Rx) module for receiving the downlink signal from the base station (BS); a transmission (Tx) module for transmitting an uplink signal to the base station (BS); a memory for storing a codebook including a precoding matrix; and a processor for controlling the user equipment (UE), wherein the processor enables the transmission (Tx) module to transmit a first precoding matrix index (PMI) and a second precoding matrix index (PMI) indicating a precoding matrix selected from a codebook prestored in the memory to a base station (BS); enables the reception (Rx) module to receive the downlink signal, that is mapped to R layers (where 1≤R≤8), is precoded by a precoding matrix indicated by a combination of the first and second PMIs, and is then transmitted through the 2·N Tx antennas, from the base station (BS); and processes the downlink signal using the precoding matrix, and wherein the prestored codebook includes precoding matrices configured in the form of $$\begin{bmatrix} W_1 & W_1 \\ aW_1 & -aW_1 \end{bmatrix}$$

when R is an even number, where $W_1$ is an N×(R/2) matrix and a is a coefficient of a phase.

$W_1$ may be a Discrete Fourier Transform (DFT) matrix.

If R is an even number, $W_1$ may be configured as a matrix of [v1 ... v(R/2)], and each of v1 ... v(R/2) may be an N×1 matrix.

Each of v1 ... v(R/2) may be configured as a DFT matrix.

If R is equal to 4 (R=4), $W_1$ may be configured in the form of $$\begin{bmatrix} v1 & v2 & v1 & v2 \\ a \cdot v1 & a \cdot v2 & -a \cdot v1 & -a \cdot v2 \end{bmatrix}.$$

If R is denoted by 3≤R≤7, the precoding matrix of the R layers may be comprised of a column subset of precoding matrices of (R+1) layers.

N may be set to 4 (N=4).

It is to be understood that both the foregoing general description and the following detailed description of the present invention are exemplary and explanatory and are intended to provide further explanation of the invention as claimed.

Advantageous Effects

Exemplary embodiments of the present invention have the following effects. The embodiments of the present invention can provide a method and apparatus for transmitting signals using a codebook capable of efficiently supporting MIMO transmission supporting an extended antenna configuration. The embodiments of the present invention can also provide a method and apparatus for transmitting signals using a codebook that reduces feedback overhead and at the same time maintains system performance for MIMO transmission based on a plurality of Tx antennas.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 13 shows a signal mapping scheme in which a DFT processed signal is mapped to a frequency domain.

FIG. 15 shows the position of a symbol mapped to a reference signal.

FIG. 23 exemplarily shows 8 transmit (Tx) antennas.

BEST MODE

Figure 1:
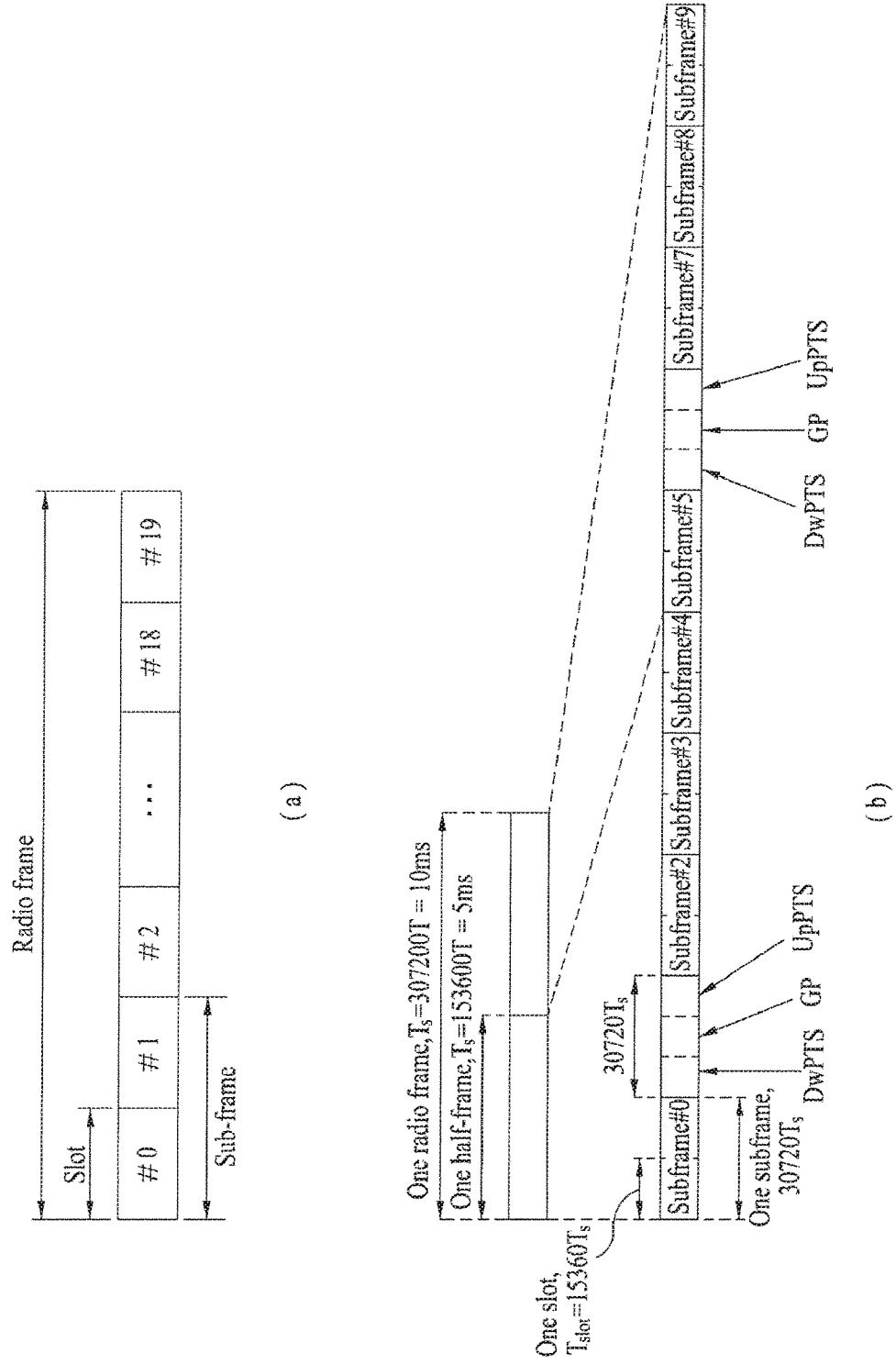
FIG. 1 is a conceptual diagram illustrating a downlink radio frame structure.

The following embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any one embodiment may also be included in other embodiments, or may be replaced with those of the other embodiments as necessary.

The embodiments of the present invention are disclosed on the basis of a data communication relationship between a base station and a terminal. In this case, the base station is a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB), or access point as necessary. In addition, the term "Base Station (BS)" may include the concept of a cell or sector. The term "relay" may be replaced with the terms a Relay Node (RN) or Relay Station (RS). The term "terminal" may also be replaced with the terms User Equipment (UE), Mobile Station (MS), Mobile Subscriber Station (MSS) or Subscriber Station (SS) as necessary. While the following description exemplarily uses a UE or a relay node (RN) as an uplink transmission entity and exemplarily uses a BS (eNB) or RN as an uplink reception entity, the scope or spirit of the present invention is not limited thereto. Similarly, the downlink transmission entity may be a BS or RN and the downlink reception entity may be a UE or RN. In other words, uplink transmission may indicate transmission from the UE to the BS, transmission from the UE to the RN, or transmission from the RN to the BS. Similarly, downlink transmission may indicate transmission from the BS to the UE, transmission from the BS to the RN, or transmission from the RN to the UE.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on 3GPP LTE and 3GPP LTE-A. However, technical features of the present invention are not limited thereto.

FIG. 1 exemplarily shows a radio frame structure for use in a 3rd Generation Partnership Project Long Term Evolution (3GPP LTE) system. A downlink (DL) radio frame structure will hereinafter be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. 3GPP LTE supports a type 1 radio frame structure applicable to Frequency Division Duplexing (FDD) and a type 2 radio frame structure applicable to Time Division Duplexing (TDD).

FIG. 1(a) is a diagram showing the structure of the type 1 radio frame. A downlink radio frame includes 10 subframes, and one subframe includes two slots in a time domain. A time required for transmission of one subframe is defined in a Transmission Time Interval (TTI). For example, one subframe may have a length of 1 ms and one slot may have a length of 0.5 ms. One slot may include a plurality of OFDM symbols in a time domain and include a plurality of Resource Blocks (RBs) in a frequency domain. Since 3GPP LTE uses OFDMA in downlink, the OFDM symbol indicates one symbol duration. The OFDM symbol may be called an SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce inter-symbol interference.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
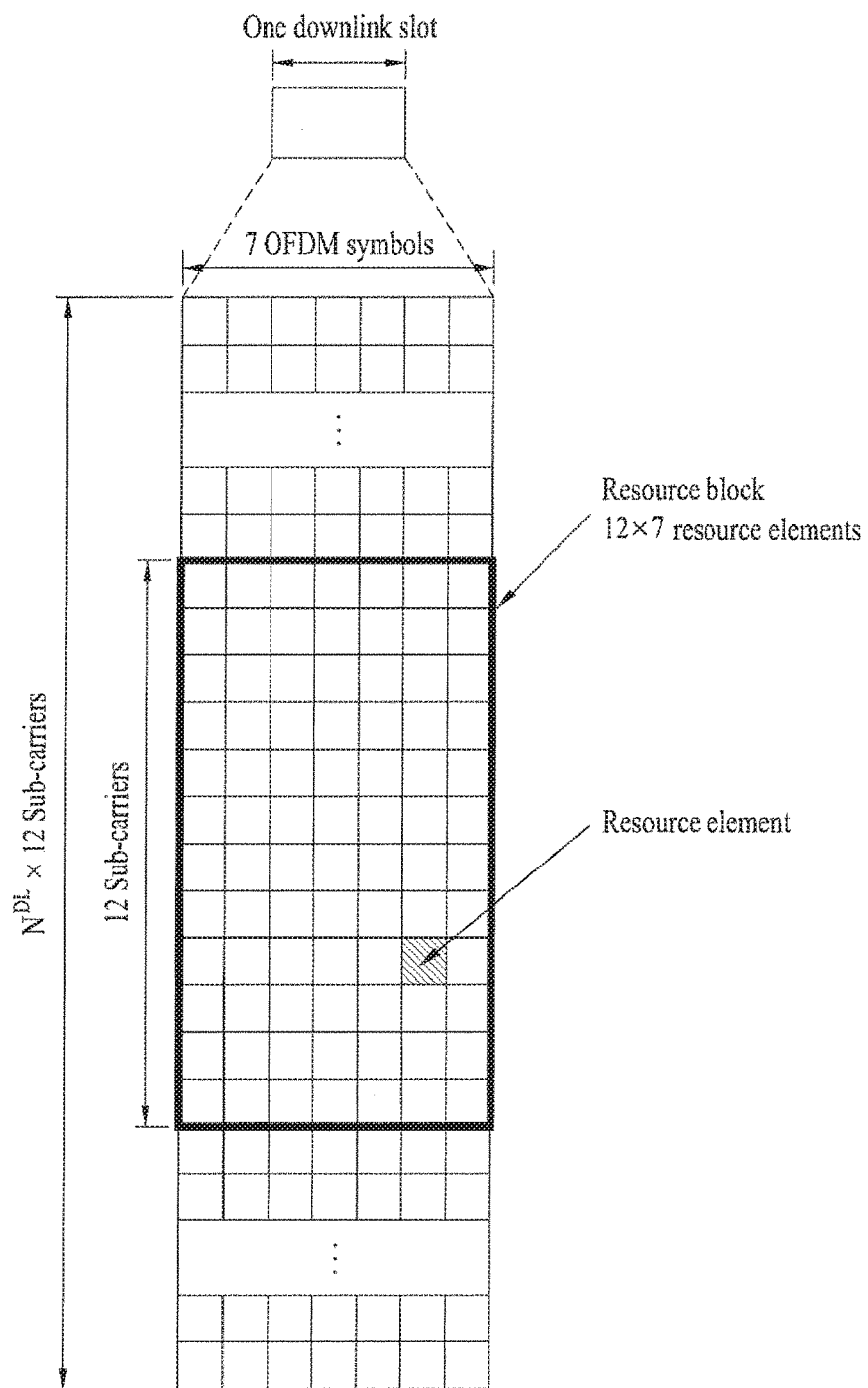
FIG. 2 exemplarily shows a resource grid of a downlink (DL) slot.

FIG. 2 is a diagram showing an example of a resource grid in one downlink slot. OFDM symbols are configured by the normal CP. Referring to FIG. 2, the downlink slot includes a plurality of OFDM symbols in a time domain and includes a plurality of RBs in a frequency domain. Although one downlink slot includes seven OFDM symbols and one RB includes 12 subcarriers, the present invention is not limited thereto. Each element of the resource grid is referred to as a Resource Element (RE). For example, an RE a(k,l) is located at a k-th subcarrier and an l-th OFDM symbol. In case of the normal CP, one RB includes 12×7 REs (in case of the extended CP, one RB includes 12×6 REs). Since a distance between subcarriers is 15 kHz, one RB includes about 180 kHz in the frequency region. $N^{DL}$ denotes the number of RBs included in the downlink slot. The $N^{DL}$ is determined based on downlink transmission bandwidth set by scheduling of a base station (BS).

Figure 3:
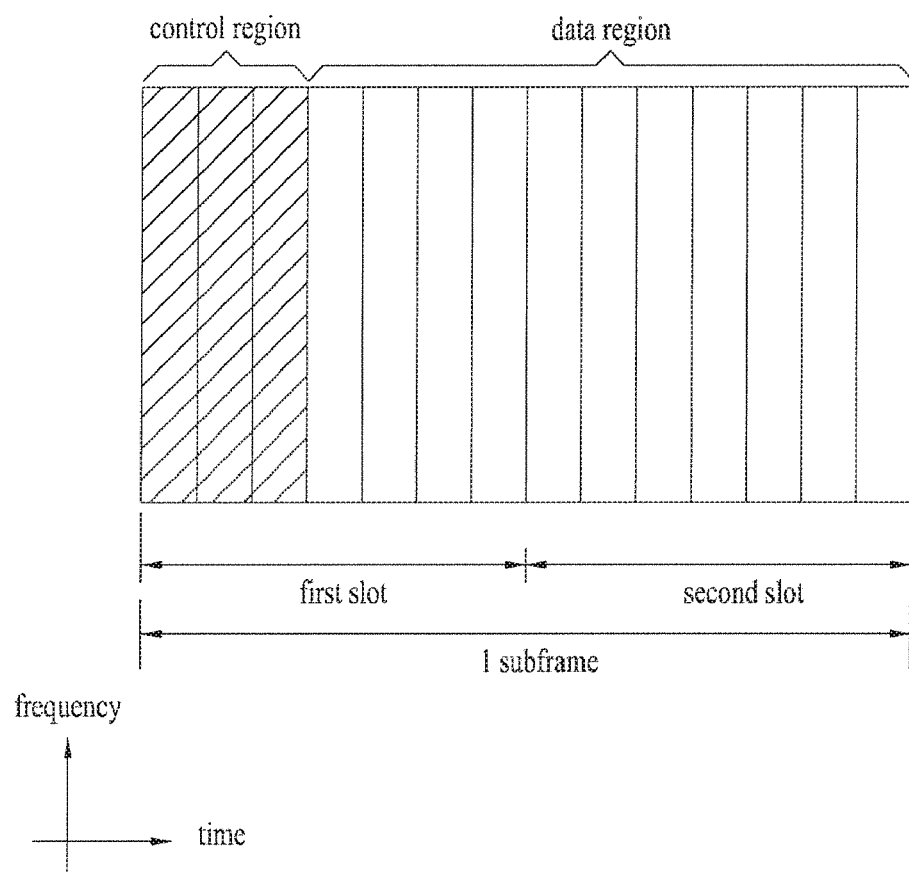
FIG. 3 exemplarily shows a downlink (DL) frame structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. That is, a PDCCH and a PDSCH are allocated to two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
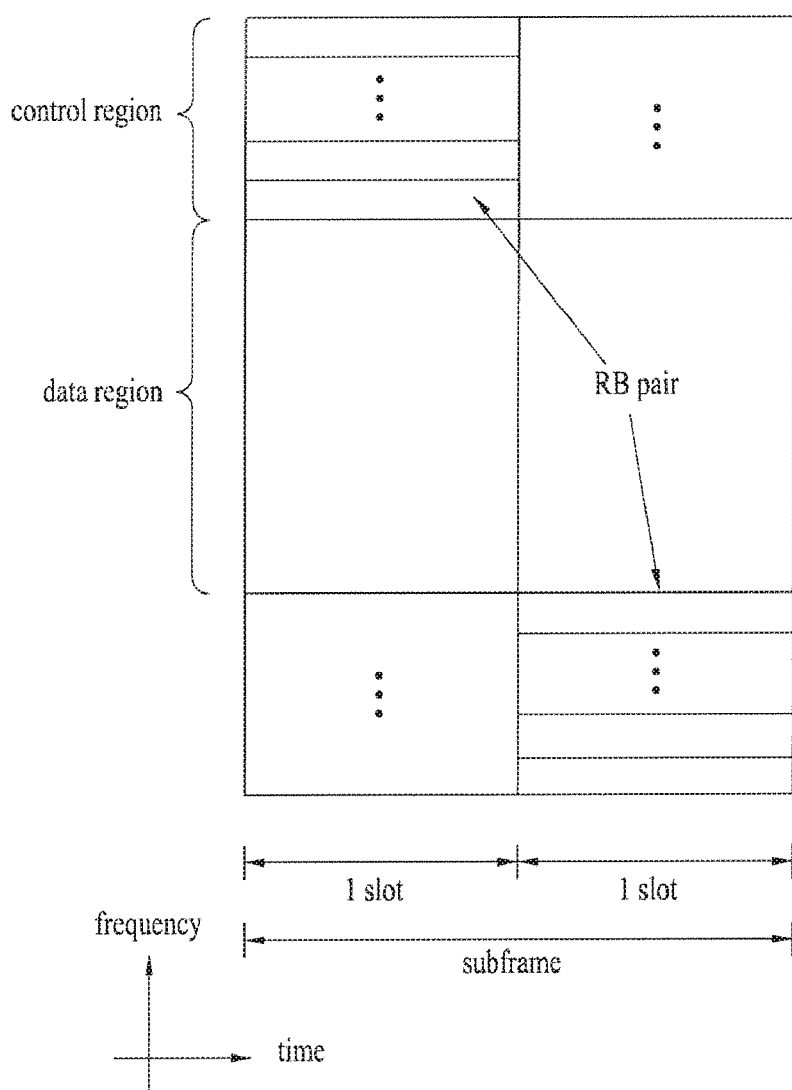
FIG. 4 exemplarily shows an uplink (UL) subframe structure for use in a system.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Reference Signal

In a MIMO system, each transmission antenna has an independent data channel. A receiver estimates a channel with respect to each transmission antenna and receives data transmitted from each transmission antenna. Channel estimation refers to a process of compensating for signal distortion due to fading so as to restore the received signal. Fading refers to a phenomenon in which the intensity of a signal is rapidly changed due to multi-path delay and time delay in a wireless communication system environment. For channel estimation, a reference signal known to both a transmitter and a receiver is necessary. The reference signal may be abbreviated to RS or referred to as a pilot signal according to the standard used.

The legacy 3GPP LTE Release-8 or Release-9 has defined a downlink reference signal transmitted from the base station (BS). A downlink reference signal is a pilot signal for coherent demodulation, such as a Physical Downlink Shared Channel (PDSCH), a Physical Control Format Indicator Channel (PCFICH), a Physical Hybrid Indicator Channel (PHICH), and a Physical Downlink Control Channel (PDCCH). The downlink reference signal includes a Common Reference Signal (CRS) shared among all UEs in a cell and a Dedicated Reference Signal (DRS) for a specific UE. The CRS may be referred to as a cell-specific reference signal. The DRS may be referred to as a UE-specific reference signal or a Demodulation Reference Signal (DMRS).

A downlink reference signal (DRS) allocation scheme for use in a legacy 3GPP LTE system will hereinafter be described in detail. The resource element position (i.e., a reference signal pattern) to which a reference signal is transmitted will hereinafter be described on the basis of a single resource block (i.e., the length of one subframe in a time domain x the length of 12 subcarriers in a frequency domain). One subframe is composed of 14 OFDM symbols (in case of a normal CP), or is composed of 12 OFDM symbols (in case of an extended CP). The number of subcarriers in one OFDM symbol is set to one of 128, 256, 512, 1024, 1536, or 2048.

Figure 5:
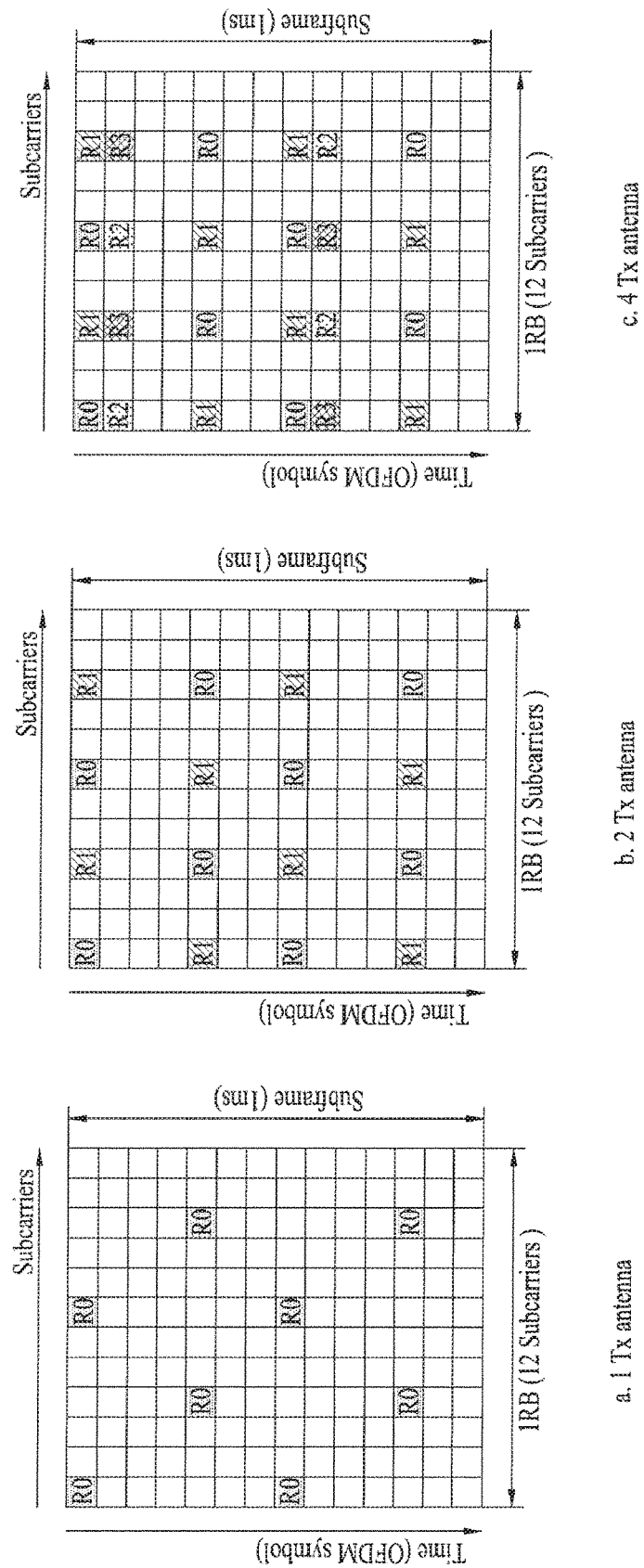
FIG. 5 exemplarily shows a common reference signal (CRS) pattern.

FIG. 5 shows a common reference signal (CRS) pattern when one TTI (i.e., one subframe) includes 14 OFDM symbols. FIG. 5(a) shows a CRS pattern for use in a system having one Tx (1Tx) transmit antenna, FIG. 5(b) shows a CRS pattern for use in a system having 2 Tx antennas, and FIG. 5(c) shows a CRS pattern for use in a system having 4 Tx antennas.

In FIG. 5, R0 is a reference signal for an antenna port index #0. In FIG. 5, R1 is a reference signal of an antenna port index #1, R2 is a reference signal of an antenna port index #2, and R3 is a reference signal of an antenna port index #3. No signal is transmitted to the position of an RE to which a reference signal for each antenna port is transmitted, such that interference is prevented from occurring in the remaining antenna ports other than a specific antenna port where a reference signal is transmitted.

Figure 6:
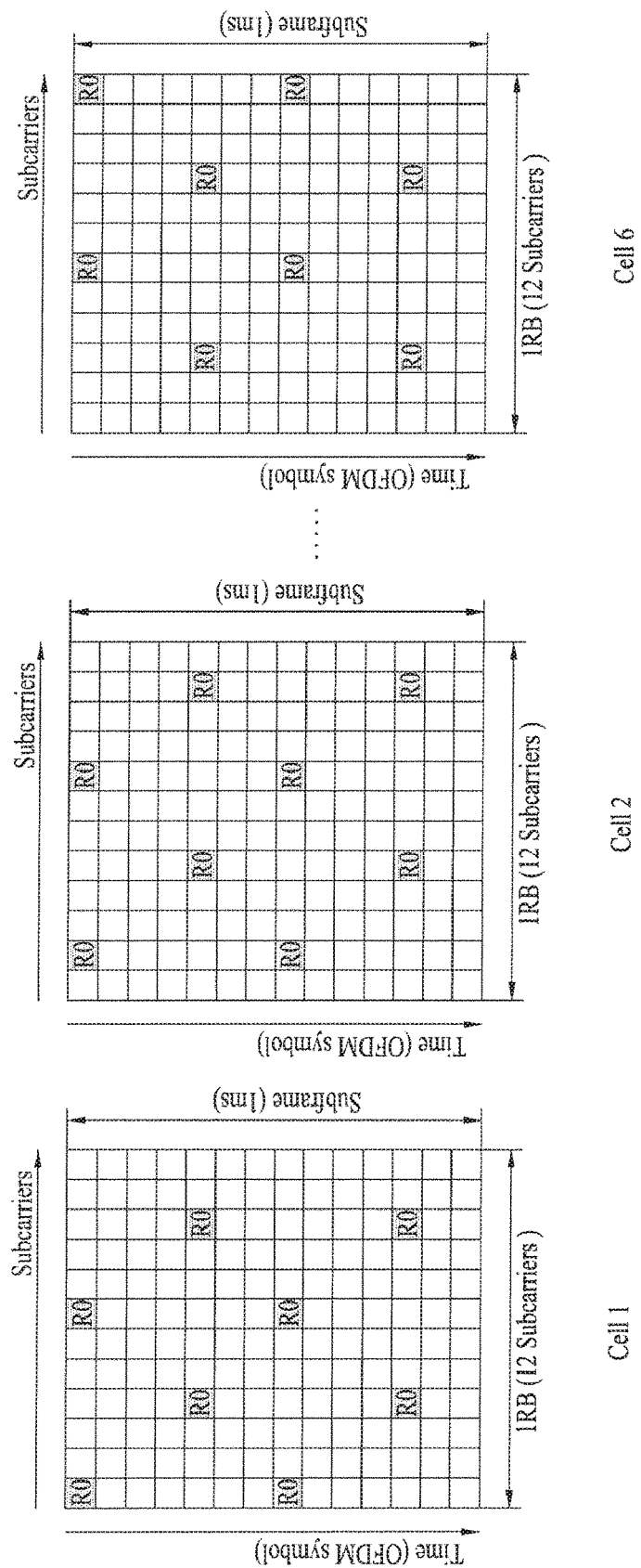
FIG. 6 exemplarily shows a reference signal pattern shift.

FIG. 6 shows that a reference signal pattern is shifted per cell so as to prevent reference signals of a plurality of cells from colliding. Assuming that a reference signal pattern of a single antenna port is used at Cell #1 of FIG. 6, a reference signal pattern is shifted in units of a subcarrier or OFDM symbol so as to prevent reference signals of Cell #2 and Cell #3 contiguous to Cell #1 from colliding with each other, such that it can protect the reference signal. For example, in case of 1Tx antenna transmission, a reference signal is located on a single OFDM symbol at intervals of 6 subcarriers, such that at least 5 contiguous cells may locate their reference signals at different resource elements under the condition that shifting is applied to each cell on the basis of a frequency-domain subcarrier. For example, frequency shift of a reference signal can be represented by Cells #2~#6 of FIG. 6.

In addition, a Pseudo-Random (PN) sequence is multiplied by a downlink reference signal per cell, and is then transmitted, so that the receiver can reduce interference caused by a reference signal received from a contiguous cell, resulting in an increase in channel estimation performance. The PN sequence can be applied in units of an OFDM symbol of a single subframe. In addition, different PN sequences can be applied to a cell ID, a subframe number, and OFDM symbol positions.

In case of the improved system (for example, a wireless communication system (e.g., 3GPP LTE Release-10 or subsequent release) supporting 8 Tx antennas) having an extended antenna structure as compared to the legacy communication system (for example, a 3GPP LTE Release 8 or 9 system) supporting 4 Tx antennas, DMRS-based data demodulation has been considered to support not only efficient reference signal management but also the developed transmission scheme. That is, DMRS for at least two layers can be defined to support data transmission through an extended antenna. Since DMRS is precoded by the same precoder as that of data, the receiver can easily estimate channel information for data demodulation without using separate precoding information. In the meantime, whereas a downlink receiver can obtain precoded channel information for the extended antenna structure through a DMRS, a separate reference signal other than the DMRS is needed to obtain non-precoded channel information. Therefore, LTE-A can define a reference signal (i.e., CSI-RS) for obtaining channel state information (CSI) from a receiver. CSI-RS can be transmitted through 8 antenna ports. In order to discriminate between an antenna port to which CSI-RS is transmitted and an antenna port of the legacy 3GPP LTE Release 8/9, antenna port indices #15~#22 can be used.

Downlink Control Channel structure

The first three OFDM symbols for each subframe can be basically used as a transmission region of a downlink control channel, and the first to third OFDM symbols may be used according to overhead of a downlink control channel. PCFICH may be used to adjust the number of OFDM symbols for a downlink control channel per subframe. In order to provide acknowledgement/negative acknowledgment (ACK/NACK) information for uplink transmission on downlink, a Physical Hybrid-automatic repeat request (ARQ) Indicator Channel (PHICH) may be used. In addition, a PDCCH may be used to transmit either control information for downlink data transmission or control information for uplink data transmission.

Figure 7:
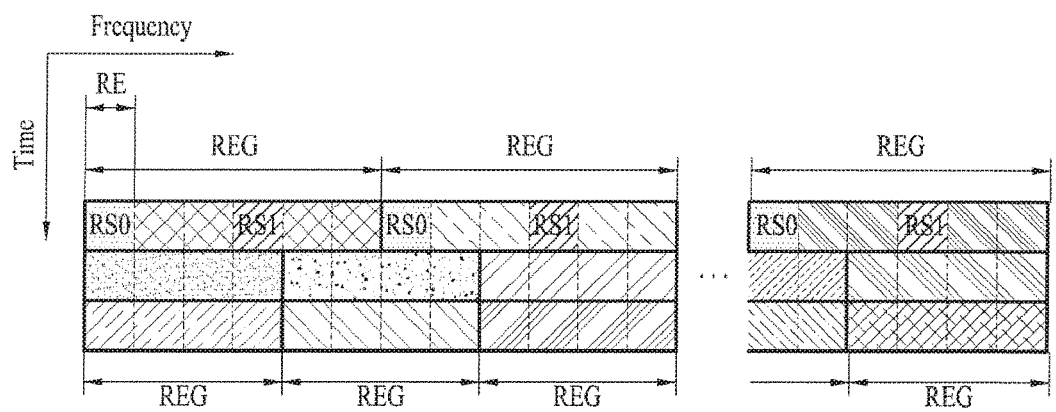
FIGS. 7 and 8 exemplarily show a resource element group (REG) serving as an allocation unit of a downlink control channel.
Figure 8:
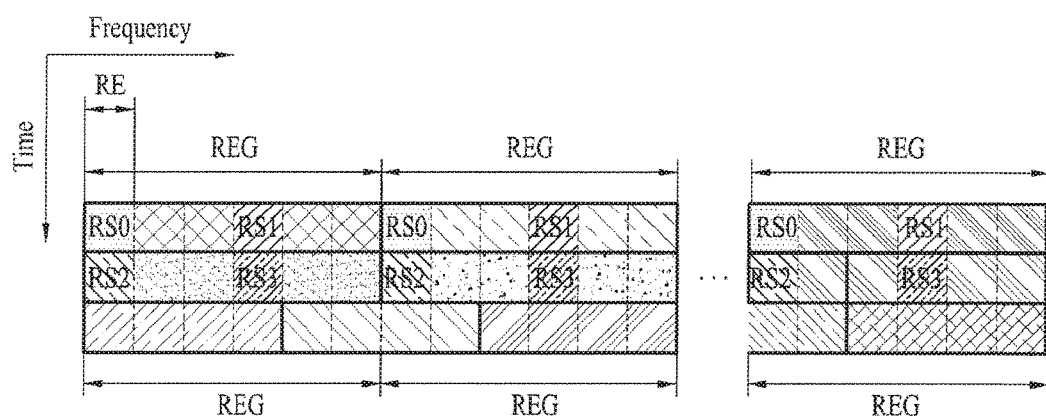

FIGS. 7 and 8 exemplarily show that the above-mentioned downlink control channels are allocated in units of a resource element group (REG) in a control region for each subframe. In more detail, FIG. 7 shows a system having 1Tx antenna or 2Tx antennas, and FIG. 8 shows a system having 4Tx antennas. As can be seen from FIGS. 7 and 8, an REG serving as a basic resource unit to which a control channel is allocated is composed of 4 concatenated resource elements (REs) in a frequency domain other than some REs to which reference signals are allocated. A predetermined number of REGs may be used to transmit a downlink control channel according to downlink control channel (DCH) overhead.

PCFICH (Physical Control Format Indicator Channel)

In order to provide resource allocation information or the like of the corresponding subframe to each subframe, a PDCCH may be transmitted among OFDM symbol indices #0 to #2. In accordance with overhead of a control channel, an OFDM symbol index #0 may be used, OFDM symbol indices #0 and #1 may be used, or OFDM symbol indices #0 to #2 may be used. The number of OFDM symbols used by a control channel may be changed per subframe, and information regarding the number of OFDM symbols may be provided over a PCFICH. Therefore, PCFICH must be transmitted per subframe.

Three kinds of information can be provided through a PCFICH. The following Table 1 shows a Control Format Indicator of a PCFICH. CFI=1 denotes that a PDCCH is transmitted at OFDM symbol index #0, CFI=2 denotes that a PDCCH is transmitted at OFDM symbol indices #0 and #1, and CFI=3 denotes that a PDCCH is transmitted at OFDM symbol indices #0 to #2.

TABLE 1

| CFI | CFI codeword <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information transmitted over a PCFICH may be differently defined according to system bandwidth. For example, if a system bandwidth is less than a specific threshold value, CFI=1, CFI=2, and CFI=3 may indicate that two OFDM symbols, three OFDM symbols, and four OFDM symbols are used for a PDCCH, respectively.

Figure 9:
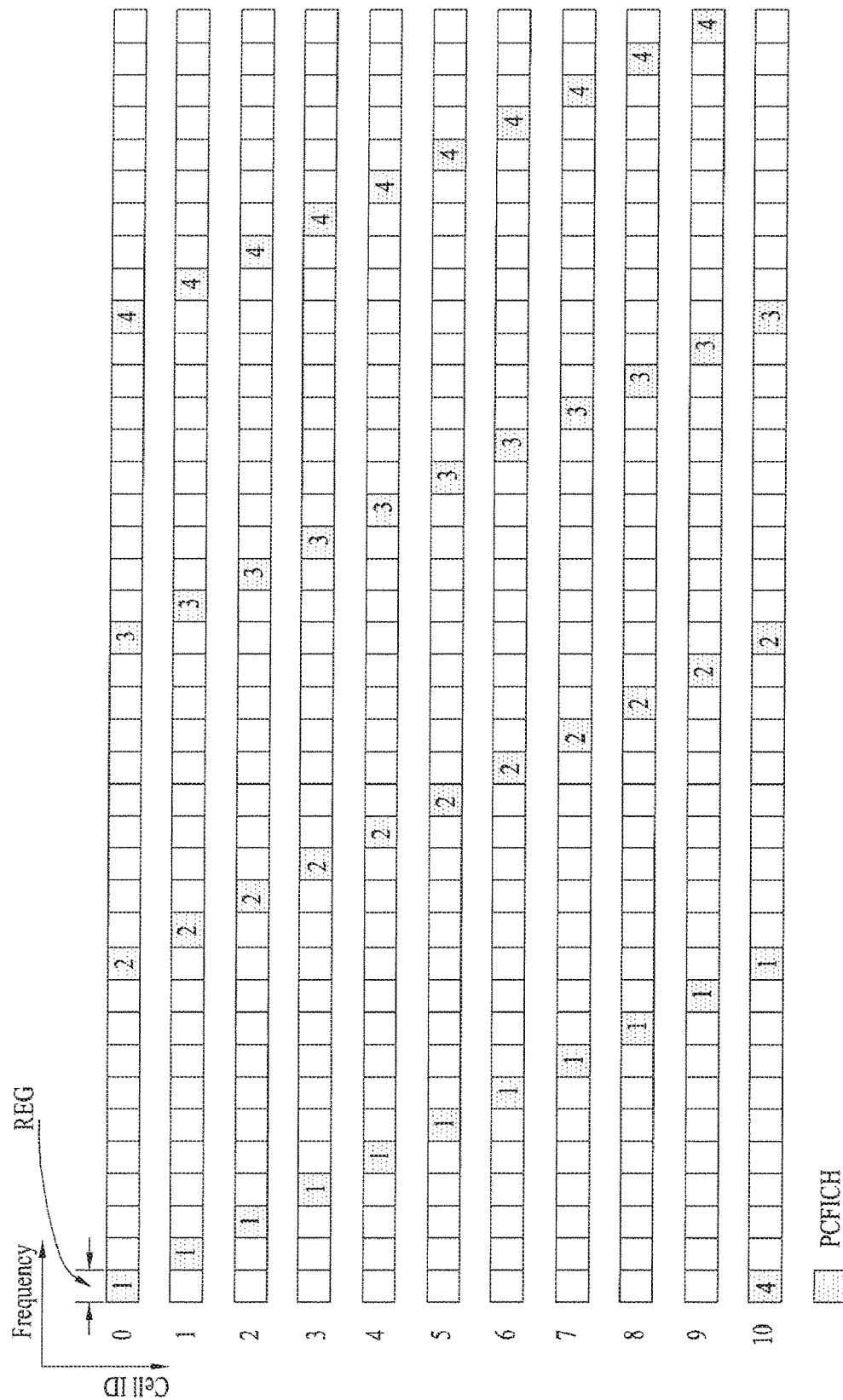
FIG. 9 is a conceptual diagram illustrating a Physical Control Format Indicator Channel (PCFICH) transmission scheme.

FIG. 9 is a conceptual diagram illustrating a PCFICH transmission scheme. An REG shown in FIG. 9 may be composed of 4 subcarriers, and may be composed only of data subcarriers other than a reference signal (RS). Generally, a transmit diversity scheme may be applied to the REG To prevent inter-cell interference of the PCFICH, the REGs to which the PCFICH is mapped may be shifted per cell in the frequency domain (according to a cell ID). The PCFICH is transmitted at the first OFDM symbol of a subframe all the time. Accordingly, when receiving a subframe, the receiver first confirms PCFICH information, and recognizes the number of OFDM symbols needed for PDCCH transmission, such that it can receive control information transmitted over a PDCCH.

Physical Hybrid-ARQ Indicator Channel (PHICH)

Figure 10:
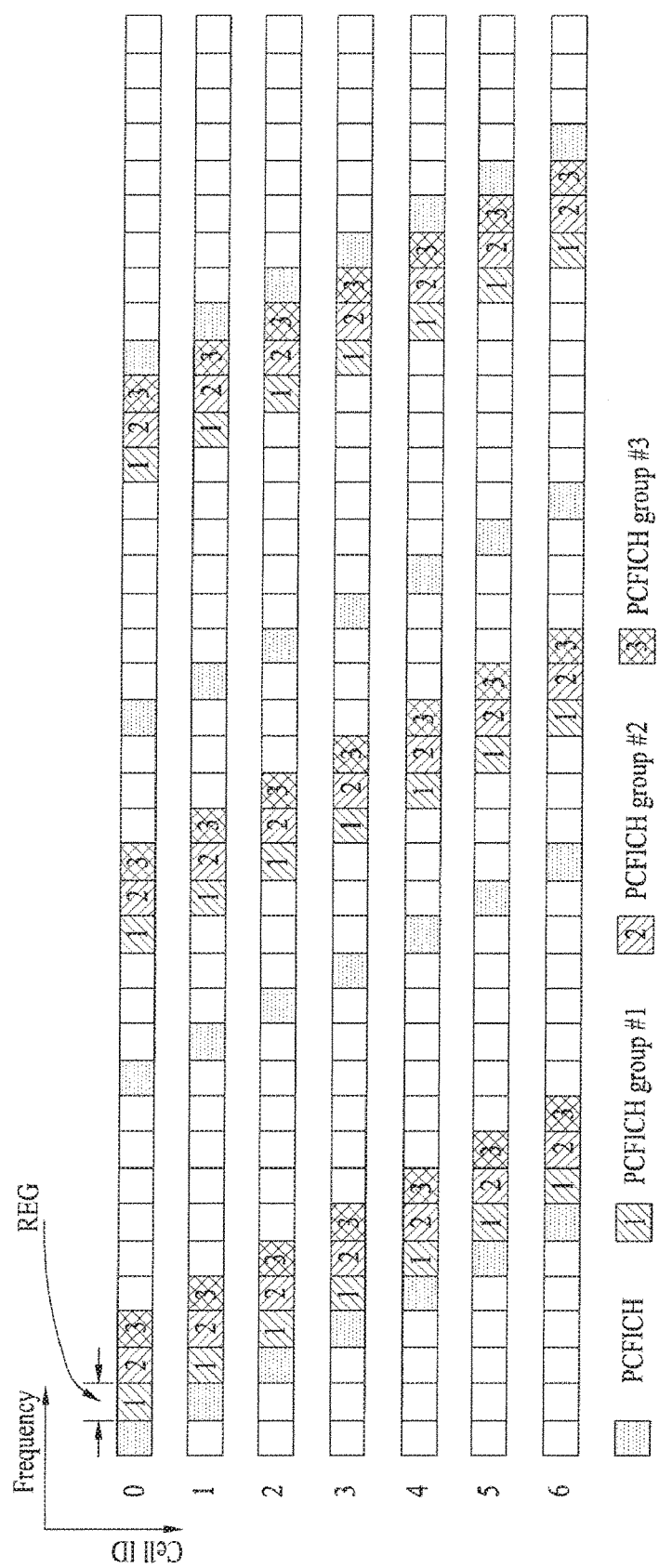
FIG. 10 shows the positions of a PCFICH and a Physical hybrid ARQ indicator Channel (PHICH).

FIG. 10 shows the positions of PCFICH and PHICH generally applied to a specific bandwidth. ACK/NACK information for uplink data transmission is transmitted over a PHICH. A plurality of PHICH groups is constructed in a single subframe, and a plurality of PHICHs may be present in a single PHICH group. Therefore, PHICH channels for multiple UEs are contained in a single PHICH group.

Referring to FIG. 10, allocating a PHICH to each UE of a plurality of PHICH groups is achieved not only using a lowest physical resource block (PRB) index of a PUSCH resource allocation but also a cyclic shift (CS) index for a demodulation RS (DMRS) transmitted on a UL grant PDCCH. DMRS is an uplink reference signal, and is provided along with UL transmission so as to perform channel estimation for demodulating UL data. In addition, a PHICH resource is signaled as an index pair such as ($n_{PHICH}^{group}$, $n_{PHICH}^{seq}$). In the index pair ($n_{PHICH}^{group}$, $n_{PHICH}^{seq}$), $n_{PHICH}^{group}$ denotes a PHICH group number and $n_{PHICH}^{seq}$ denotes an orthogonal sequence index in the corresponding PHICH group. $n_{PHICH}^{group}$ and $n_{PHICH}^{seq}$ are defined as shown in the following equation 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH}$$ [Equation 1]

In Equation 1, $n_{DMRS}$ denotes a cyclic shift of a DMRS used for uplink transmission related to a PHICH, $N_{SF}^{PHICH}$ denotes the size of a spreading factor sued for a PHICH, $I_{PRB\_RA}^{lowest\_index}$ is the lowest PRB index of uplink resource allocation, and $N_{PHICH}^{group}$ denotes the number of PHICH groups. $N_{PHICH}^{group}$ can be obtained using the following equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Equation 2]

In Equation 2, $N_g$ denotes information regarding the amount of PHICH resources transmitted on a physical broadcast channel (PBCH), and $N_g$ is 2 bits long and is denoted by $N_g \in \{1/6, 1/2, 1, 2\}$.

In addition, examples of orthogonal sequences defined in the legacy 3GPP LTE Release 8/9 are shown in the following table 2.

TABLE 2

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 11:
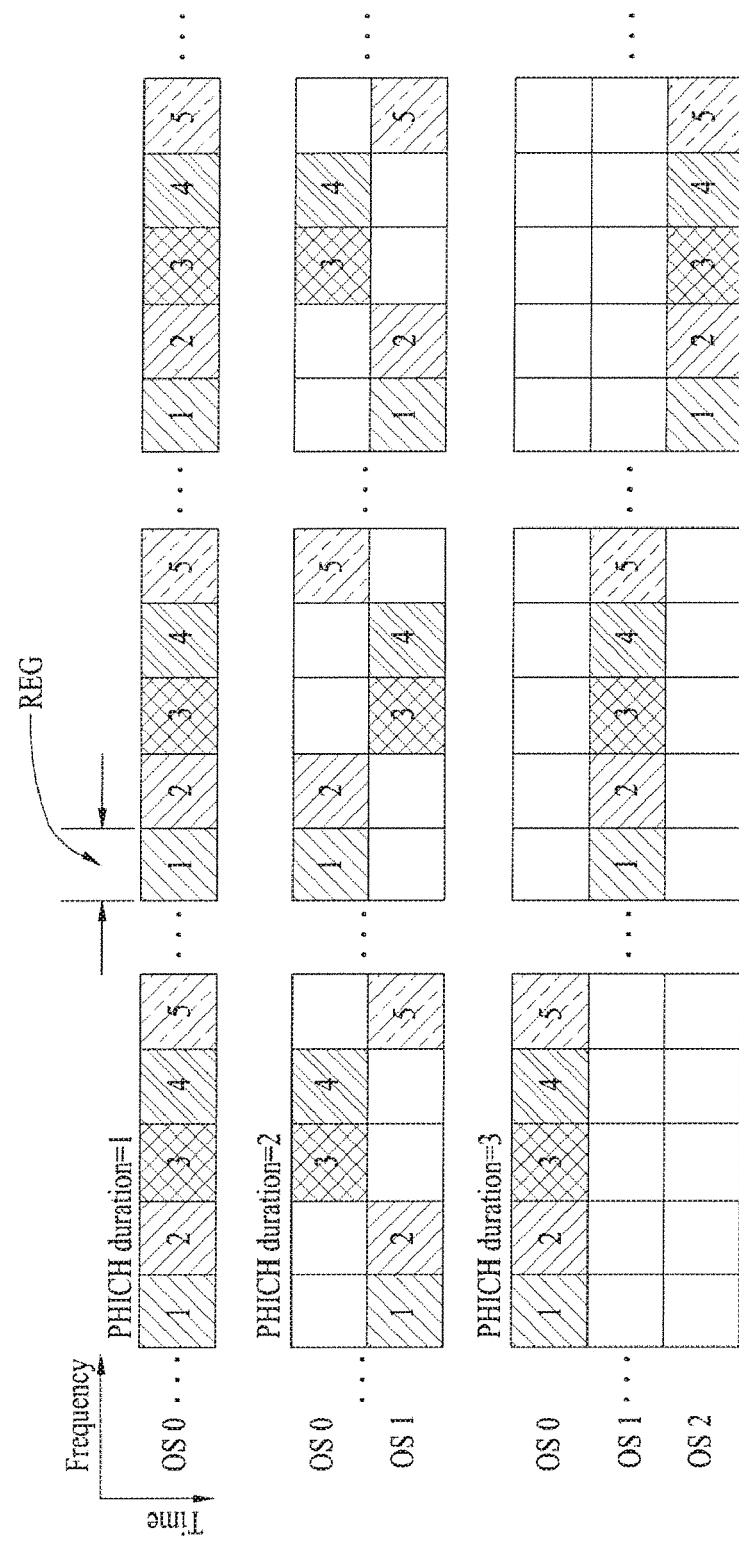
FIG. 11 shows a downlink resource element position mapped to a PHICH group.

FIG. 11 shows a downlink resource element position mapped to a PHICH group. A PHICH group may be constructed in different time domains (i.e., different OFDM Symbols (OSs)) of a single subframe according to a PHICH duration.

Physical Downlink Control Channel (PDCCH)

Control information transmitted over a PDCCH may have different sizes and usages of control information according to a downlink control information (DCI) format, and the PDCCH size may be changed according to coding rate. For example, DCI formats for use in the legacy 3GPP LTE Release 9/9 can be defined as shown in the following table 3.

TABLE 3

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

The DCI format of Table 3 may be independently applied to each UE. PDCCHs of multiple UEs may be multiplexed in one subframe. PDCCH of each UE may be independently channel-coded such that a CRC (Cyclic Redundancy Check) may be added to the PDCCH. The CRC is masked as a unique ID for each UE in such a manner that each UE can receive its own PDCCH. However, the UE does not know where its own PDCCH is transmitted, such that the UE performs blind detection (also called blind decoding) of all PDCCHs of the corresponding DCI format for each subframe until one PDCCH having a UE ID is received. A basic resource allocation unit of the PDCCH is a control channel element (CCE), and one CCE is composed of 9 REGs. One PDCCH may be composed of 1, 2, 4, or 8 CCEs. The PDCCH configured according to each UE is interleaved and mapped to a control channel region of each subframe according to the CCE-to-RE mapping rule. The RE position mapped to a CCE may be changed according to the number of OFDM symbols for a control channel of each subframe, the number of PHICH groups, a Tx antenna, a frequency shift, and the like.

Uplink Retransmission

Uplink retransmission may be indicated through the above-mentioned PHICH and DCI format 0 (DCI format for scheduling PUSCH transmission). The UE receives ACK/NACK information for previous uplink transmission through a PHICH, such that it can perform synchronous non-adaptive retransmission. Alternatively, the UE receives an uplink grant from a base station (BS) through DCI format 0 PDCCH, such that it can perform synchronous adaptive retransmission.

The term "synchronous retransmission" means that retransmission is performed at a predetermined time (for example, the $(n+k)^{th}$ subframe) after lapse of a transmission time (for example, the $n^{th}$ subframe) of one data packet (where k may be set to 4). In the case of retransmission caused by a PHICH and retransmission caused by a UL grant PDCCH, synchronous retransmission is performed.

In the case of non-adaptive retransmission in which retransmission is performed through a PHICH, the same frequency resource (for example, a physical resource block (PRB)) and retransmission method (for example, a modulation method or the like) as those of previous transmission are applied to retransmission. On the other hand, in the case of adaptive retransmission in which retransmission is performed through a UL grant PDCCH, the frequency resource and transmission method in which retransmission is performed according to scheduling control information indicated by a UL grant may be established in a different way from those of previous transmission.

If the UE simultaneously receives a PHICH and a UL grant PDCCH, the PHICH is disregarded and UL transmission can be performed according to control information of a UL grant PDCCH. A new data indicator (NDI) is contained in a UL grant PDCCH (for example, DCI format 0). If an NDI bit is toggled more than a previous NDI value, the UE decides that previous transmission was successfully achieved such that it can transmit new data. On the other hand, although the UE receives an ACK for previous transmission through a PHICH, if an NDI value is not toggled simultaneously with PHICH reception or if an NDI value is not toggled at a UL grant PDCCH to be received after PHICH reception, the UE is configured not to flush a buffer for previous transmission.

Uplink Transmission Structure

Figure 12:
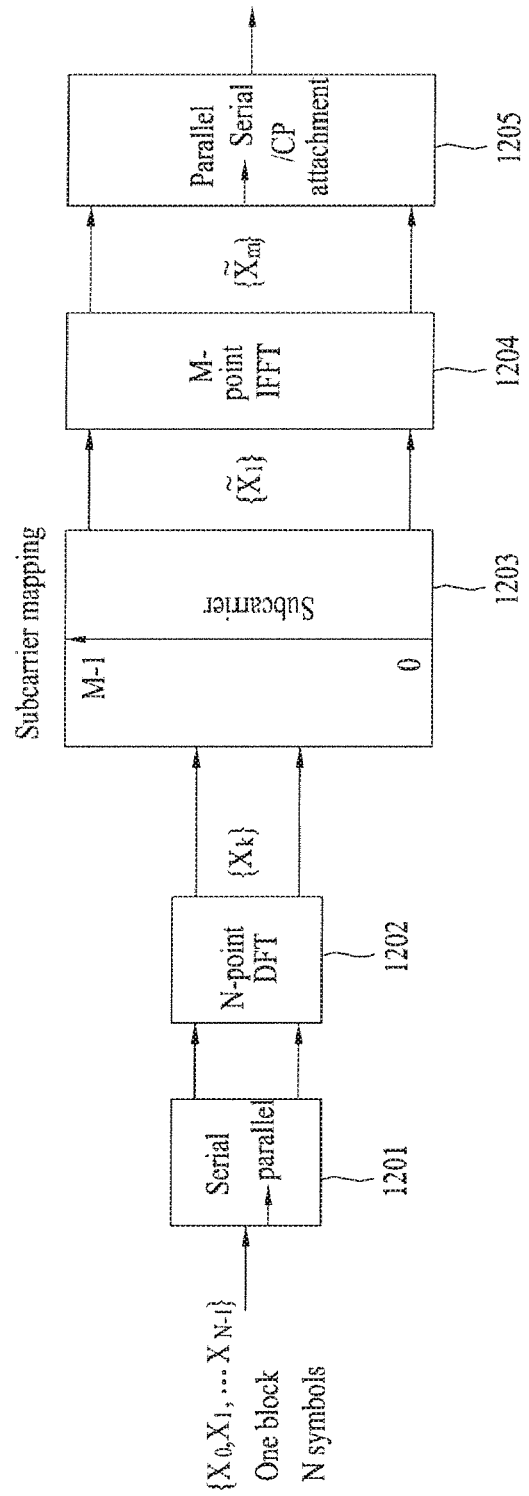
FIG. 12 is a block diagram illustrating a transmitter for use in a Single Carrier Frequency-Division Multiple Access (SC-FDMA) system.

FIG. 12 is a block diagram illustrating a transmitter for use in a Single Carrier Frequency-Division Multiple Access (SC-FDMA) system.

Referring to FIG. 12, a serial-to-parallel (SP) converter 1201 converts one block composed of N symbols input to the transmitter into parallel signals. An N-point DFT module 1202 spreads the parallel signals and a subcarrier mapping module 1203 maps the spread parallel signals to a frequency area. Each subcarrier signal is a linear combination of N symbols. An M-point Inverse Fast Fourier Transform (IFFT) module 1204 converts signals mapped to a frequency domain into time-domain signals. A parallel-to-serial converter 1205 converts the time-domain signals to a serial signal and adds a CP to the serial signal. The DFT processing of the N-point DFT module 1202 compensates for the effects of the IFFT processing of the M-point IFFT module 1204 to a certain degree. The SC-FDMA scheme may also be referred to as DFT-s-OFDMA (DFT-spread-OFDMA). The signals input to the DFT module 1202 have a low Peak-to-Average Power Ratio (PAPR) or Cubic Metric (CM). However, the signals have a high PAPR after the DFT processing. The IFFT signals output from the IFFT module 1204 may have a low PAPR gain. That is, the SC-FDMA scheme can transmit signals through the remaining parts other than a non-linear distortion interval of the power amplifier (PA), such that implementation costs of transmission can be reduced.

FIG. 13 shows a signal mapping scheme in which a DFT processed signal is mapped to a frequency domain. One of the two schemes shown in FIG. 13 is performed so that output signals of the SC-FDMA transmitter can satisfy single carrier properties. FIG. 13(a) shows the localized mapping scheme in which output signals from the DFT module 1202 are mapped only to a specific part of the subcarrier region. FIG. 13(b) shows the distributed mapping scheme in which output signals from the DFT module 1202 are distributed and mapped to the entire subcarrier region. The legacy 3GPP LTE Release 8/9 system is defined to use the localized mapping scheme.

Figure 14:
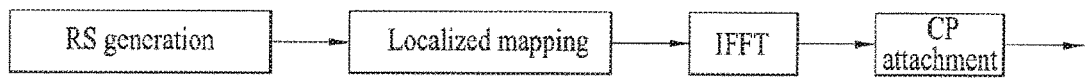
FIG. 14 is a conceptual diagram illustrating a method for transmitting a reference signal.

FIG. 14 is a block diagram illustrating transmission processing of a reference signal (RS) for demodulating a transmission signal based on the SC-FDMA scheme. A data part for use in the legacy 3GPP LTE Release 8/9 system is defined as follows. That is, after a signal generated in a time domain is DFT-processed and converted into a frequency-domain signal, the signal is mapped to subcarriers and IFFT-processed (See FIG. 12). A reference signal (RS) for use in the legacy 3GPP LTE Release 8/9 system is defined as follows. That is, RS is directly generated in the frequency domain without DFT processing, is mapped to subcarriers, and is IFFT-processed, such that a CP is attached to the IFFT result and then transmitted.

FIG. 15 shows the position of a symbol mapped to a reference signal (RS) in a subframe structure based on the SC-FDMA scheme. FIG. 15(a) shows that a reference signal (RS) is located at a fourth SC-FDMA symbol of each of two slots of a single subframe in case of a normal CP. FIG. 15(b) shows that a reference signal (RS) is located at a third SC-FDMA symbol of each of two slots of one subframe in case of an extended CP.

FIGS. 16 to 19 are conceptual views illustrating the clustered DFT-s-OFDMA scheme. Referring to FIGS. 16 to 19, clustered DFT-s-OFDMA is a modification of the above-described SC-FDMA, in which a DFT signal is divided into a plurality of sub-blocks and mapped to positions separated from each other in the frequency domain.

Figure 16:
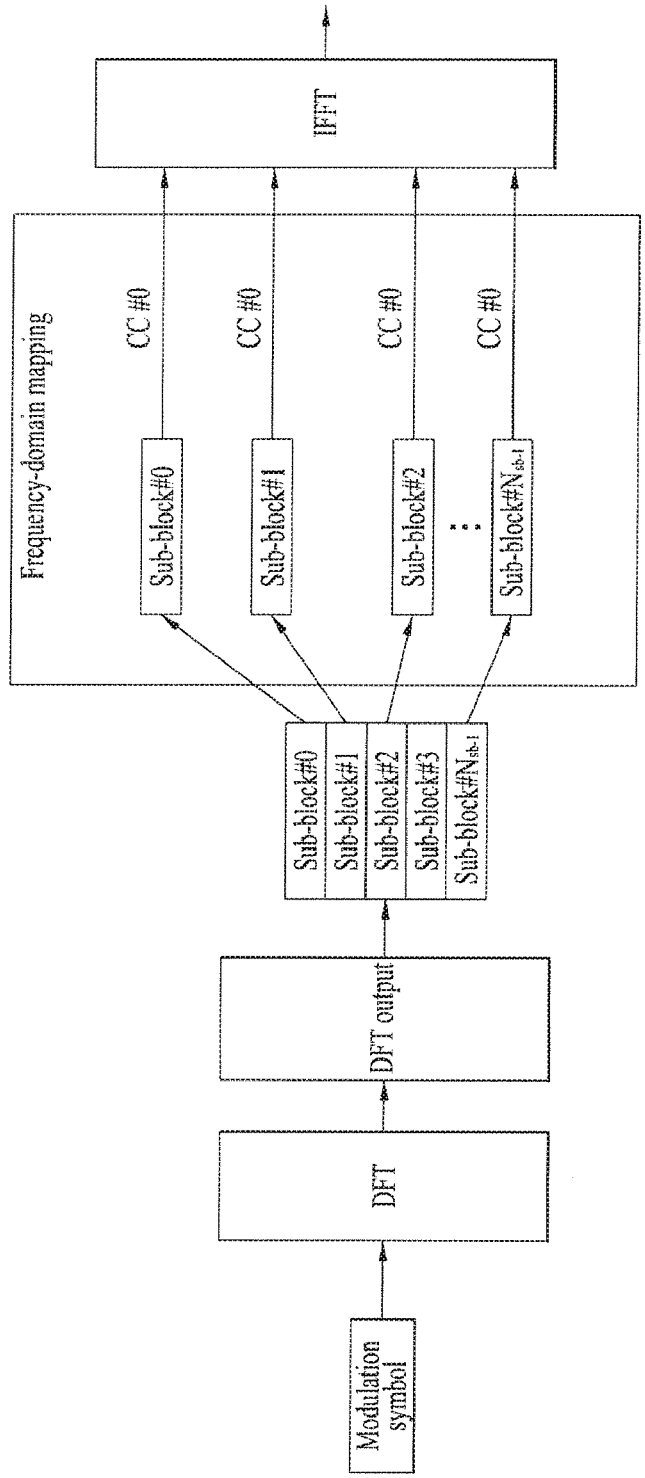
FIGS. 16 to 19 are conceptual views illustrating the clustered DFT-s-OFDMA scheme.

FIG. 16 illustrates a clustered DFT-s-OFDMA scheme in a single carrier system. For example, a DFT output may be divided into Nsb sub-blocks (sub-block #0 to sub-block #Nsb−1). The sub-blocks, sub-block #0 to sub-block #Nsb−1 are mapped to positions spaced from each other in the frequency domain on a single carrier (e.g. a carrier having a bandwidth of 20 MHz). Each sub-block may be mapped to a frequency area in the localized mapping scheme.

Figure 17:
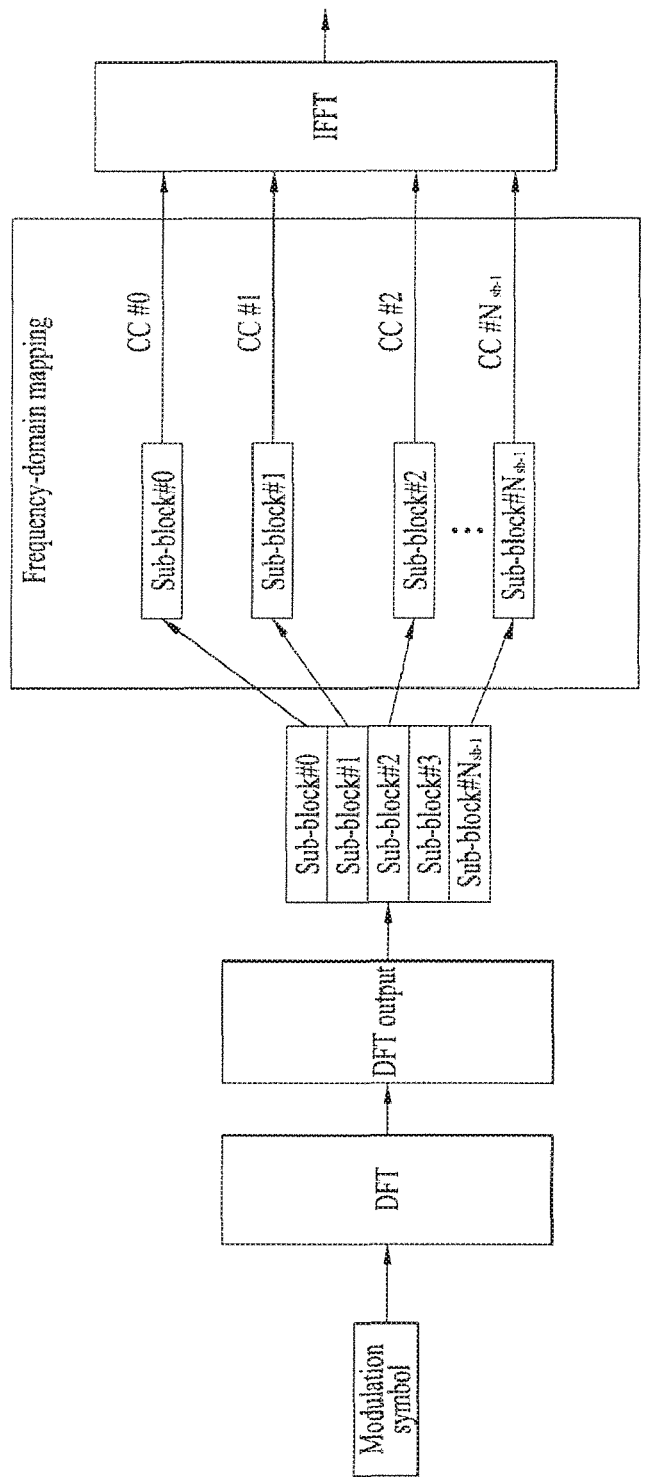
Figure 18:
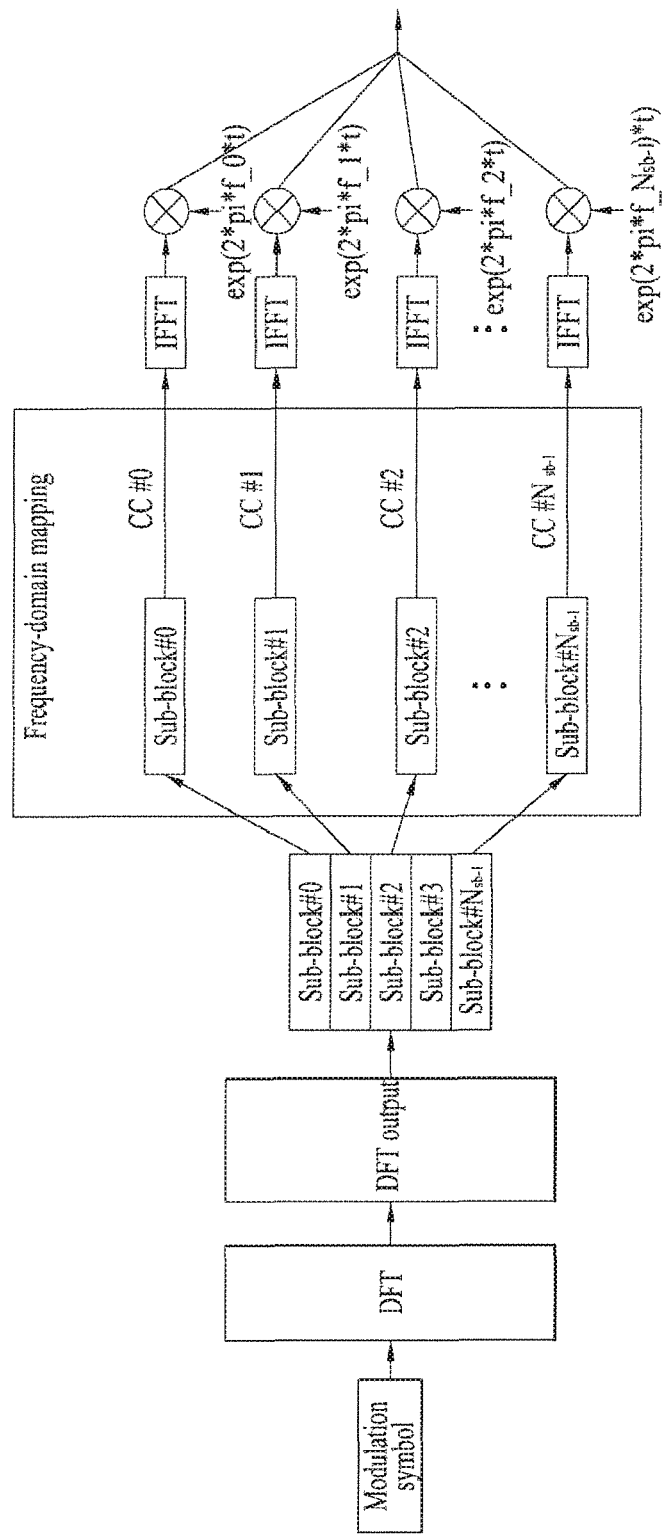

FIGS. 17 and 18 illustrate clustered DFT-s-OFDMA schemes in a multi-carrier system.

FIG. 18 illustrates an example of generating a signal through one IFFT module, when multiple carriers are contiguously configured (i.e. the respective frequency bands of the multiple carriers are contiguous) and a specific subcarrier spacing is aligned between adjacent carriers. For example, a DFT output may be divided into Nsb sub-blocks (sub-block #0 to sub-block #Nsb−1) and the sub-blocks, sub-block #0 to sub-block #Nsb−1 may be mapped, in one-to-one correspondence, to the Component Carriers (CCs), CC #0 to CC #Nsb−1 (each CC may have, for example, a bandwidth of 20 MHz). Each sub-block may be mapped to a frequency area in the localized mapping scheme. The sub-blocks mapped to the respective CCs may be converted into a time signal through a single IFFT module.

FIG. 18 illustrates an example of generating signals through a plurality of IFFT modules, when multiple carriers (or multiple cells) are non-contiguously configured (i.e. the respective frequency bands of the multiple carriers are non-contiguous). For example, a DFT output may be divided into Nsb sub-blocks, sub-block #0 to sub-block #Nsb−1 and the sub-blocks, sub-block #0 to sub-block #Nsb−1 may be mapped, in a one-to-one correspondence, to CCs, CC #0 to CC #Nsb−1 (each CC (or each cell) may have, for example, a bandwidth of 20 MHz). Each sub-block may be mapped to a frequency area in the localized mapping scheme. The sub-blocks mapped to the respective CCs may be converted into time-domain signals through respective IFFT modules.

If the clustered DFT-s-OFDMA scheme for a single carrier illustrated in FIG. 16 is intra-carrier (or intra-cell) DFT-s-OFDMA, it may be said that the clustered DFT-s-OFDMA schemes for multiple carriers (or multiple cells) illustrated in FIGS. 17 and 18 are inter-carrier (or inter-cell) DFT-s-OFDMA. Intra-carrier DFT-s-OFDMA and inter-carrier DFT-s-OFDMA may be used in combination.

Figure 19:
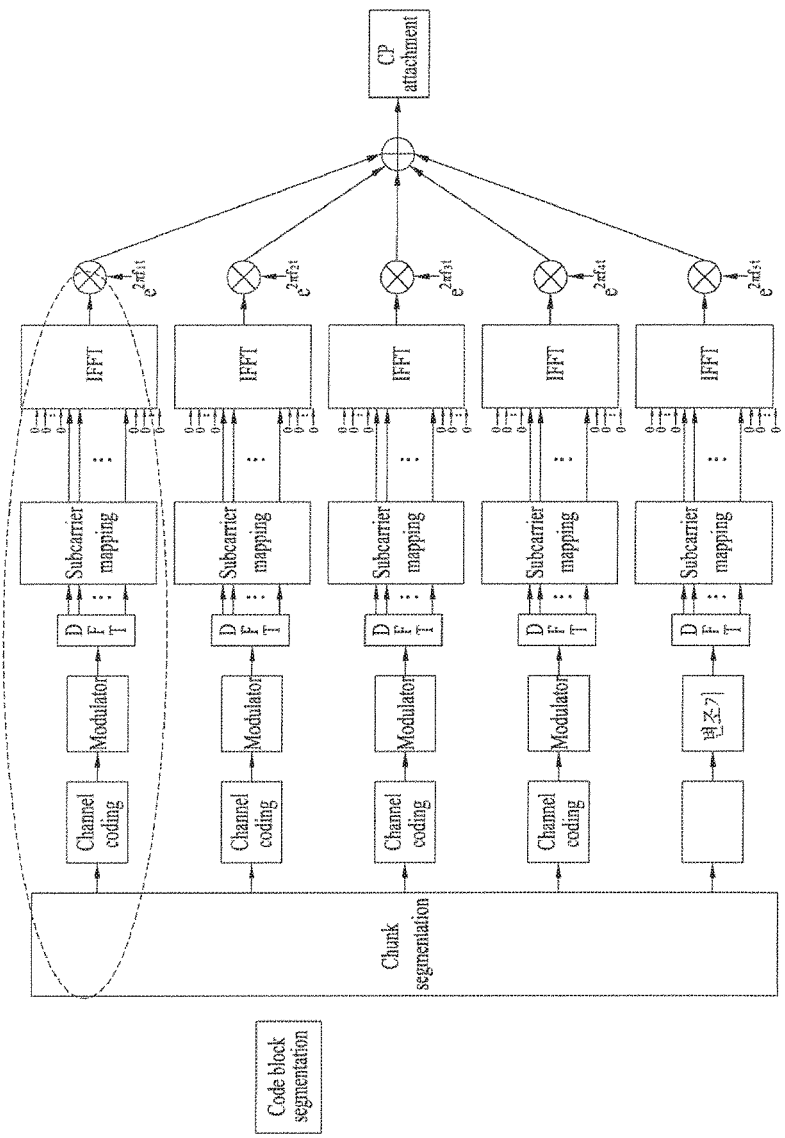

FIG. 12 illustrates a chunk-specific DFT-s-OFDMA scheme in which DFT, frequency-domain mapping, and IFFT processing are performed on a chunk basis. Chunk-specific DFT-s-OFDMA may also be referred to as Nx SC-FDMA. A code block resulting from code block segmentation is divided into chunks and the chunks are channel-encoded and modulated individually. The modulated signals are subjected to DFT, frequency-domain mapping, and IFFT and the IFFT signals are summed and then a CP is added thereto in the same manner as described with reference to FIG. 12. The Nx SC-FDMA scheme illustrated in FIG. 19 is applicable to both a case of contiguous multiple carriers (or contiguous multiple cells) and a case of non-contiguous multiple carriers.

MIMO System

Figure 20:
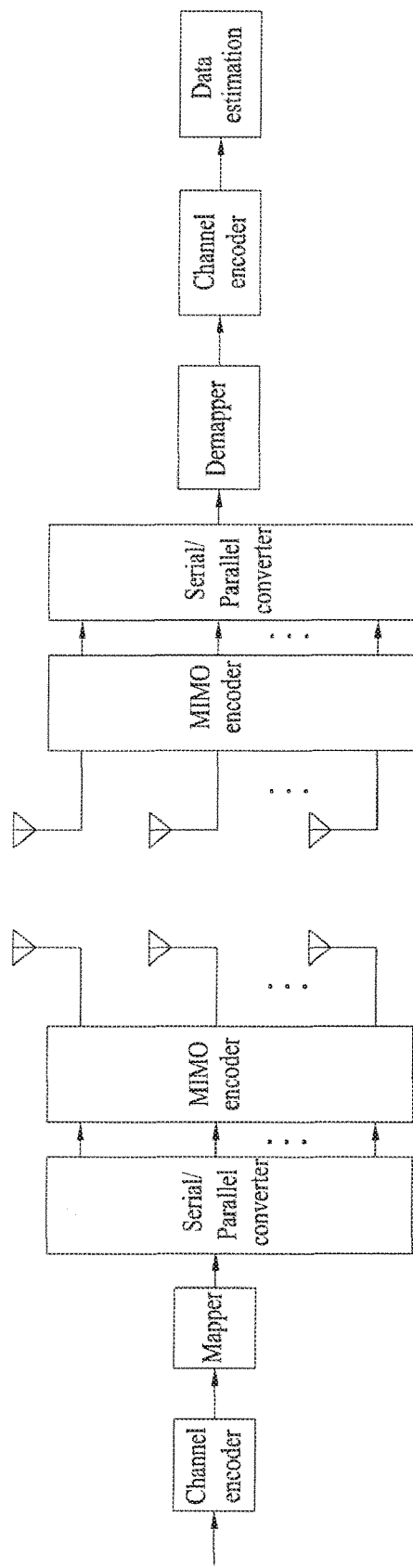
FIG. 20 is a block diagram illustrating a MIMO system.

FIG. 20 is a block diagram illustrating a MIMO system including multiple Tx antennas and multiple Rx antennas. Individual blocks of FIG. 20 conceptually illustrate functions or operations of the transmitter and receiver for MIMO transmission.

The channel encoder shown in FIG. 20 illustrates that a redundancy bit is attached to input data bits so that influence caused by noise from a channel can be greatly reduced. The mapper converts data bit information into data symbol information. The S/P converter converts serial data into parallel data. The MIMO encoder converts a data symbol into a time-spatial signal. Multiple antennas of the transmitter are used to transmit time-spatial signals over a channel, and multiple antennas of the receiver are used to receive signals through a channel.

The MIMO decoder shown in FIG. 20 converts the received time-spatial signal into respective data symbols. The P/S converter converts a parallel signal into a serial signal. The demapper converts a data symbol into data bit information. The channel decoder illustrates the decoding operation of a channel code, and estimates the decoded resultant data.

The above-mentioned MIMO Tx/Rx system may have one or more codewords according to spatial multiplexing rate. One case in which only one codeword spatially is used is referred as a single codeword (SCW) structure, and the other case in which multiple codewords (MCW) are used is referred to as an MCW structure.

Figure 21:
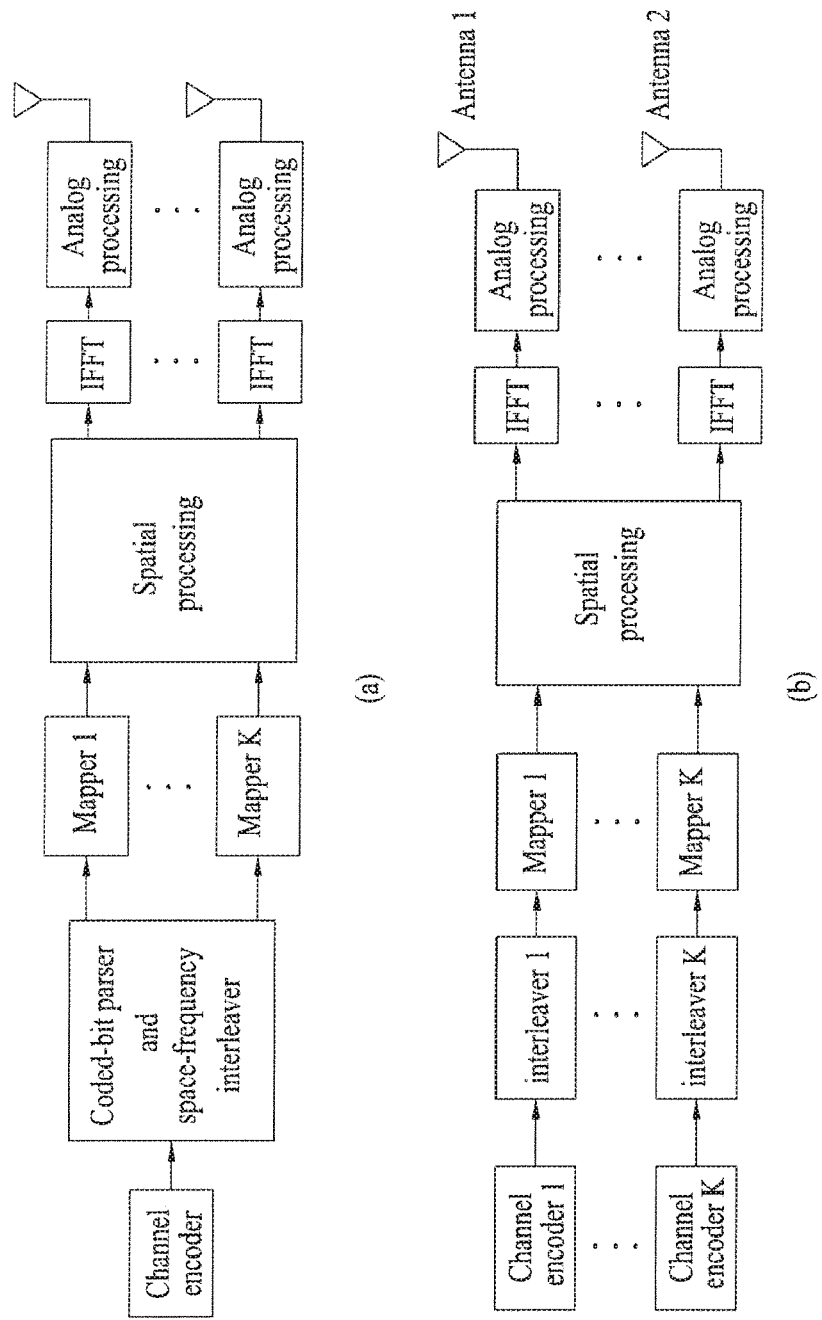
FIG. 21 is a functional block diagram illustrating a MIMO system.

FIG. 21(a) is a block diagram illustrating a transmitter of a MIMO system including an SCW structure, and FIG. 21(b) is a block diagram illustrating a transmitter of a MIMO system including an MCW structure.

Codebook-Based Precoding Scheme

The precoding scheme for properly distributing transmission information to respective antennas according to channel condition or the like so as to support MIMO transmission can be used. The codebook based precoding scheme allows each of a transmitter and a receiver to predetermine an aggregate or set of precoding matrices, the receiver measures channel information received from the transmitter, feeds back the most appropriate precoding matrix (i.e., a precoding matrix index (PMI)) to the transmitter, and the transmitter can apply the appropriate precoding to signal transmission on the basis of the PMI result. In this way, the codebook based precoding scheme can select an appropriate precoding matrix from among predetermined precoding matrix sets. As a result, although optimum precoding is not always applied, feedback overhead can be more reduced than feedback overhead obtained when optimum precoding information is explicitly fed back to actual channel information.

Figure 22:
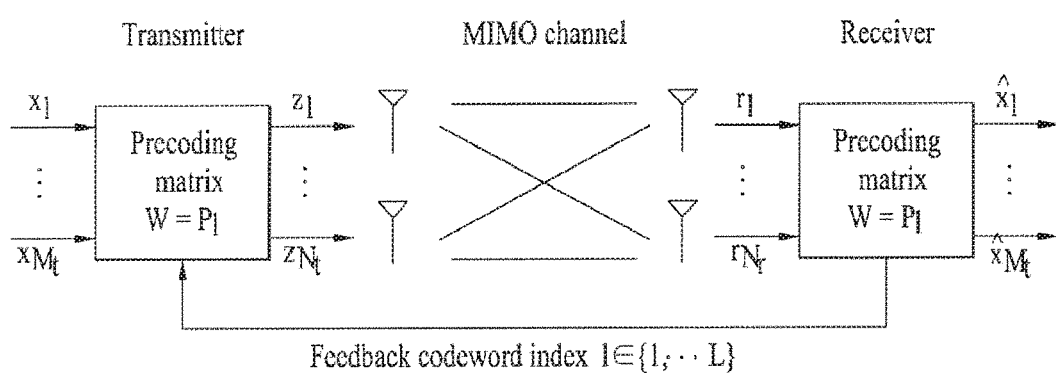
FIG. 22 is a conceptual diagram illustrating codebook based precoding.

FIG. 22 is a conceptual diagram illustrating codebook based precoding.

In accordance with the codebook based precoding scheme, a transceiver may share codebook information including a predetermined number of precoding matrices according to a transmission rank, the number of antennas, etc. That is, if feedback information is infinite, the precoding-based codebook scheme may be used. The receiver measures a channel state through a received signal, so that an infinite number of preferred precoding matrix information (i.e., an index of the corresponding precoding matrix) may be fed back to the transmitter on the basis of the above-mentioned codebook information. For example, the receiver may select an optimum precoding matrix by measuring an ML (Maximum Likelihood) or MMSE (Minimum Mean Square Error) scheme. Although the receiver shown in FIG. 22 transmits precoding matrix information for each codeword to the transmitter, the scope or spirit of the present invention is not limited thereto.

Upon receiving feedback information from the receiver, the transmitter may select a specific precoding matrix from a codebook on the basis of the received information. The transmitter that has selected the precoding matrix performs a precoding operation by multiplying the selected precoding matrix by as many layer signals as the number of transmission ranks, and may transmit each precoded Tx signal over a plurality of antennas. In the precoding matrix, the number of rows is identical to the number of antennas, and the number of columns is identical to the rank value. Since the rank value is identical to the number of layers, the number of columns is identical to the number of layers. For example, assuming that the number of Tx antennas is set to 4 and the number of Tx layers is set to 2, the precoding matrix may be configured in the form of a (4×2) matrix. Information transmitted through individual layers in the precoding matrix can be mapped to individual layers.

If the receiver receives the precoded signal from the transmitter as an input, it performs inverse processing of the precoding having been conducted in the transmitter so that it can recover the reception (Rx) signal. Generally, the precoding matrix satisfies a unitary matrix (U) such as ($U*U^H=I$), so that the inverse processing of the above-mentioned precoding may be conducted by multiplying a Hermitian matrix ($P^H$) of the precoding matrix H used in precoding of the transmitter by the reception (Rx) signal.

For example, Table 4 shows a codebook for use in downlink transmission in which 2Tx antennas are used in 3GPP LTE Release 8/9, and Table 5 shows a codebook for use in downlink transmission in which 4Tx antennas are used in 3GPP LTE Release 8/9.

TABLE 4

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5, $W^{\{s\}}$ is obtained from the set $\{s\}$ composed of the equation denoted by $W_n = I - 2u_n u_n^H / u_n^H u_n$. Here, I is a (4×4) unitary matrix, and $u_n$ is given by Table 5.

As can be seen from Table 4, the codebook for 2Tx antennas includes a total of 7 precoding vectors/matrices. In this case, the unitary matrix is used for an open-loop system, and there are a total of 6 precoding vectors/matrices for precoding the closed-loop system. The codebook for 4Tx antennas shown in Table 5 includes a total of 64 precoding vectors/matrices.

The above-mentioned codebook has common properties, for example, constant modulus (CM) property, nested property, and constrained alphabet property. According to the CM property, individual elements of all precoding matrices contained in the codebook do not include the value of 0, and are configured to have the same size. The nested property means that a low-rank precoding matrix is composed of a subset of a specific column of high-rank precoding matrices. The constrained alphabet property means that alphabets of individual elements of all the precoding matrices contained in the codebook are composed of $$\left\{ \pm 1, \pm j, \pm \frac{(1+j)}{\sqrt{2}}, \pm \frac{(-1+j)}{\sqrt{2}} \right\}.$$

Feedback Channel Structure

Basically, since a base station (BS) for use in an FDD system does not recognize information of a downlink channel, channel information fed back from a user equipment (UE) is used for downlink transmission. In the case of the legacy 3GPP LTE Release 8/9 system, downlink channel information may be fed back through a PUCCH, or downlink channel information may be fed back through a PUSCH. In case of a PUCCH, channel information is periodically fed back. In case of a PUSCH, channel information is aperiodically fed back upon receiving a request from the base station (BS). In case of feedback of channel information, channel information for the entirety of the allocated frequency bands (i.e., wideband (WB)) may be fed back, and channel information for a predetermined number of RBs (i.e., subband (SB)) may be fed back.

Extended Antenna Configuration

FIG. 23 exemplarily shows 8Tx antennas. FIG. 23(a) shows an exemplary case in which independent channels are constructed without grouping N antennas. Generally, a Uniform Linear Array (ULA) is shown in FIG. 23(a). Multiple antennas are spatially spaced apart from each other, such that the space of the transmitter and/or receiver needed for constructing independent channels may be insufficient.

FIG. 23(b) shows a paired ULA in which one pair is composed of two antennas. Related channels may be used between two antennas paired with each other, and channels independent of other-paired antennas may also be used.

On the other hand, whereas the legacy 3GPP LTE Release 8/9 system uses 4 Tx antennas on downlink, the 3GPP LTE Release 10 system can use 8 Tx antennas on downlink. In order to apply the extended antenna configuration, multiple Tx antennas must be installed in an insufficient space, and ULA antenna configurations shown in FIGS. 23(a) and 23(b) may be considered inappropriate. Therefore, a method for applying dual-pole (or cross-pole) antenna configuration may be used as shown in FIG. 23(c). In the case of constructing the above-mentioned Tx antennas, although a distance (d) between antennas is relatively short, antenna correlation is reduced so that high-productivity data transmission may be possible.

Codebook Structures

As described above, the transmitter shares the predefined codebook with the receiver, and the amount of overhead needed when the receiver feeds back precoding information to be used for MIMO transmission from the transmitter can be reduced, resulting in implementation of efficient precoding.

As one example for constructing the pre-defined codebook, the precoder matrix can be constructed using a Discrete Fourier Transform (DFT) matrix or Walsh matrix. Alternatively, various types of precoders may be combined with the phase shift matrix or the phase shift diversity matrix, etc.

When constructing the DFT-matrix based codebook, a (n x n) DFT matrix may be defined as shown in Equation 3.

$$DFTn: D_n(k, \ell) = \frac{1}{\sqrt{n}} \exp(-j2\pi k\ell/n), \quad \text{[Equation 3]}$$
$$k, \ell = 0, 1, \ldots, n-1$$

The DFT matrix of Equation 3 includes only one matrix for a specific size (n). Therefore, in order to properly utilize a variety of precoding matrices according to a situation, a rotated version of a DFTn matrix may be additionally configured and used. The following equation 4 represents the exemplary rotated DFTn matrix.

$$\text{rotated } DFTn: D_n^{(G,g)}(k, \ell) = \frac{1}{\sqrt{n}} \exp(-j2\pi k(\ell + g/G)/n), \quad \text{[Equation 4]}$$
$$k, \ell = 0, 1, \ldots, n-1, g = 0, 1, \ldots, G.$$

When constructing the DFT matrix as shown in Equation 4, G rotated DFTn matrices can be generated, and the generated matrices can satisfy DFT matrix properties.

A Householder-based codebook structure will hereinafter be described in detail. The Householder-based codebook structure indicates a codebook composed of Householder matrices. The Householder matrix is used in Householder transformation. The Householder transformation may be a kind of linear transformation, and may be used for QR decomposition. The QR decomposition means that a certain matrix is decomposed into an orthogonal matrix (QW) and an upper triangular matrix (R). The upper triangular matrix (R) means a square in which all lower components of the main diagonal components are set to zero. An example of the (4×4) Householder matrix is shown in Equation 5.

$$M_1 = I_4 - 2u_0 u_1^H / \|u_0\|^2 \quad \text{[Equation 5]}$$
$$= \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$
$$u_0^T = [\,1 \quad -1 \quad -1 \quad -1\,]$$

The (4×4) unitary matrix having CM characteristics can be generated by Householder transformation. Referring to the codebook for 4Tx antennas shown in Table 5, the (n×n) precoding matrix is generated through Householder transformation, and can be used as a precoding matrix for transmitting a rank lower than 'n' using the column subset of the generated precoding matrix.

Codebook for 8Tx Antennas

A feedback scheme used in the legacy 3GPP LTE Release 8/9 system is extended and then applied to the 3GPP LTE Release-10 system having extended antenna configuration (for example, 8 Tx antennas). For example, channel state information (CSI) (such as a rank indicator (RI), a precoding matrix index (PMI), channel quality information (CQI), etc.) can be fed back. A method for designing a dual-precoder based feedback codebook applicable to a system supporting the extended antenna configuration will hereinafter be described in detail. In the dual-precoder based feedback codebook, in order to indicate the precoder to be used for MIMO transmission of the transmitter, the receiver can transmit a PMI to the transmitter, and the precoding matrix can be indicated by a combination of two different PMIs. That is, the receiver feeds back two different PMIs (i.e., a first PMI and a second PMI) to the transmitter, and the transmitter decides a precoding matrix indicated by a combination of a first PMI and a second PMI and applies the decided precoding matrix to MIMO transmission.

In a dual-precoder based feedback design, 8Tx antenna MIMO transmission, SU-MIMO (Single User-MIMO) and MU-MIMO (Multiple User-MIMO) supporting adaptability of various antenna configurations, a codebook design reference, a codebook size, etc. can be considered.

As a codebook applied to 8Tx antenna MIMO transmission, it may be possible to design a feedback codebook that supports only SU-MIMO in case of Rank 2 or more, is optimized for SU-MIMO and MU-MIMO in case of a Rank of less than Rank 2, and is suitable for various antenna configurations.

In MU-MIMO, UEs participating in MU-MIMO can be separated from each other in a correlation domain. Therefore, there is a need for the codebook for MU-MIMO to be correctly operated at a high-correlation channel. DFT vectors provide superior performance over a high-correlation channel, such that a DFT vector may be contained in the codebook set extending to Rank-2. In addition, in a high scattering propagation environment (e.g., an indoor environment having numerous reflected waves) capable of generating numerous spatial channels, the SU-MIMO operation may be more appropriately used as the MIMO transmission scheme. Therefore, the codebook for a rank higher than Rank-2 can be designed to obtain superior performance for discriminating between multiple layers.

In the precoder for MIMO transmission, it is preferable that one precoder has superior performance in various antenna configurations (low-correlation antenna configuration, high-correlation antenna configuration, cross-pole antenna configuration, etc.). In the deployment of 8 Tx antennas, a cross-pole array having an antenna interval of 4λ may be configured as the low-correlation antenna configuration, a ULA having an antenna interval of 0.5λ may be configured as the high-correlation antenna configuration, and a cross-pole array having an antenna interval of 0.5λ may be configured as the cross-pole antenna configuration. The DFT-based codebook structure can provide superior performance to the high-correlation antenna configuration. Meanwhile, block diagonal matrices may be more appropriately used for cross-pole antenna configuration as necessary. Therefore, assuming that a diagonal matrix is applied to the codebook for 8Tx antennas, it may be possible to construct the codebook capable of providing superior performance to all antenna configurations.

The codebook can be designed to satisfy a unitary codebook, CM property, finite alphabets, an appropriate codebook size, nested property, etc. The above-mentioned codebook design can be applied to the 3GPP LTE Release 8/9 codebook, and can also be applied to the 3GPP LTE Release-10 codebook supporting an extended antenna configuration.

In association with the codebook size, it is necessary to increase the codebook size so as to sufficiently support advantages obtained by 8 Tx antennas. In order to obtain a sufficient precoding gain from 8 Tx antennas under a low-correlation environment, a large-sized codebook (for example, a codebook composed of at least 4 bits for Rank-1 and Rank-2) may be needed. In order to obtain precoding gain under a high-correlation environment, the above 4-bit sized codebook may be considered sufficient. However, in order to implement MU-MIMO multiplexing gain, the codebook size for Rank-1 or Rank-2 may be increased.

Based on the above-mentioned description, the codebook structure for 8 Tx antennas can be defined as follows.

In order to support multi-granular feedback, the 8Tx-antenna codebook structure can be defined by a Kroneker product ⊗ of two base matrices. The Kroneker product ⊗ is an operation of two matrices each having a predetermined size, such that a block matrix can be obtained as the operation result of the Kroneker product ⊗ For example, the Kroneker product (A ⊗ B) of the (m×n) matrix A and the (p×q) matrix B can be denoted by the following equation 6. In Equation 6, $a_{mn}$ is an element of the matrix A, and $b_{pq}$ is an element of the matrix B.

$$A \otimes B = \begin{bmatrix} a_{11}b_{11} & a_{11}b_{12} & \cdots & a_{11}b_{1q} & \cdots & \cdots & a_{1n}b_{11} & a_{1n}b_{12} & \cdots & a_{1n}b_{1q} \\ a_{11}b_{21} & a_{11}b_{22} & \cdots & a_{11}b_{2q} & \cdots & \cdots & a_{1n}b_{21} & a_{1n}b_{22} & \cdots & a_{1n}b_{2q} \\ \vdots & \vdots & \ddots & \vdots & & & \vdots & \vdots & \ddots & \vdots \\ a_{11}b_{p1} & a_{11}b_{p2} & \cdots & a_{11}b_{pq} & \cdots & \cdots & a_{1n}b_{p1} & a_{1n}b_{p2} & \cdots & a_{1n}b_{pq} \\ \vdots & \vdots & & \vdots & \ddots & & \vdots & \vdots & & \vdots \\ \vdots & \vdots & & \vdots & & \ddots & \vdots & \vdots & & \vdots \\ a_{m1}b_{11} & a_{m1}b_{12} & \cdots & a_{m1}b_{1q} & \cdots & \cdots & a_{mn}b_{11} & a_{mn}b_{12} & \cdots & a_{mn}b_{1q} \\ a_{m1}b_{21} & a_{m1}b_{22} & \cdots & a_{m1}b_{2q} & \cdots & \cdots & a_{mn}b_{21} & a_{mn}b_{22} & \cdots & a_{mn}b_{2q} \\ \vdots & \vdots & \ddots & \vdots & & & \vdots & \vdots & \ddots & \vdots \\ a_{m1}b_{p1} & a_{m1}b_{p2} & \cdots & a_{m1}b_{pq} & \cdots & \cdots & a_{mn}b_{p1} & a_{mn}b_{p2} & \cdots & a_{mn}b_{pq} \end{bmatrix}$$ [Equation 6]

The following equation 7 shows that the codebook structure is configured as the Kroneker product of two base matrices ($W_1^{(m)}$ and $W_2$).

$$W = W_2 \otimes W_1^{(m)}$$ [Equation 7]

In Equation 7, a first base matrix $W_1^{(m)}$ (where m is a transmission rank) may be used for beamforming of contiguous co-polarized antennas. For the first base matrix, a few types of codebook may be used. For example, the codebook (i.e., a codebook of Table 5) for performing downlink MIMO transmission through 4Tx antennas defined in 3GPP LTE Release 8/9 may be used as a first base matrix. Alternatively, a DFT matrix may be used as the first base matrix.

The second base matrix $W_2$ of Equation 7 may be used to adjust a relative phase between orthogonal polarizations. The matrix shown in Equation 8 may be used as the second base matrix. For example, the Rank-2 precoding matrix of a codebook (i.e., a codebook of Table 4) for performing downlink MIMO transmission through 2Tx antennas defined in 3GPP LTE Release 8/9 may be used as a second base matrix.

$$W_2 = \begin{bmatrix} 1 & 1 \\ e^{j\frac{\pi n}{N}} & -e^{j\frac{\pi n}{N}} \end{bmatrix}$$ [Equation 8]

A feedback codebook for 8 Tx antennas according to transmission rank can be defined as shown in Table 6.

TABLE 6

| | |
|---|---|
| Rank-1 | $W^1 = W^2(:,1)$, $W^1 = W^2(:,2)$ |
| Rank-2 | $W^2 = W_2 \otimes W_1^1$ |
| Rank-3 | $W^3 = W^4(:,1:3)$ |
| Rank-4 | $W^4 = W_2 \otimes W_1^2$ |
| Rank-5 | $W^5 = W^6(:,1:5)$ |
| Rank-6 | $W^6 = W_2 \otimes W_1^3$ |
| Rank-7 | $W^7 = W^8(:,1:7)$ |
| Rank-8 | $W^8 = W_2 \otimes W_1^4$ |

In Table 6, $W^2(:,x)$ is an $X^{th}$ column of a matrix $W^2$. That is, $W^1$ may be composed of a first column of the matrix $W^2$ or may be composed of a second column of the matrix $W^2$. Similarly, $W^n(:,x:y)$ denotes columns from an $x^{th}$ column to $y^{th}$ column. For example, $W^3$ may be composed of columns from a first column to a third column.

As shown in Table 6, a feedback codebook for an even rank (Rank 2, Rank 4, Rank 6, or Rank 8) may be generated by a Kroneker product of two base matrices. For example, a Rank-2 codebook $W^2$ (8×2 matrix) for 8Tx antennas is denoted by $W^2 = W_2 \otimes W_1^1$. Here, $W_2$ denotes a (2×2) matrix of a Rank-2 codebook (See Table 4) for 2 Tx antennas shown in Equation 8, and denotes a (4×1) matrix of a Rank-1 codebook (See Table 5) for 4 Tx antennas. In addition, a Rank-4 codebook WI (i.e., a (8×4) matrix) for 8 Tx antennas is denoted by $W^4 = W_2 \otimes W_1^2$. Here, $W_2$ denotes a (2×2) matrix of a Rank-2 codebook (See Table 4) for 2 Tx antennas shown in Equation 8, and $W_1^2$ denotes a (4×2) matrix of a Rank-2 codebook (See Table 5) for 4 Tx antennas.

As shown in Table 6, a feedback codebook for an odd rank (Rank 1, Rank 3, Rank 5, or Rank 7) may be composed of a subset of upper rank codebooks. For example, the Rank-1 codebook for 8 Tx antennas may be composed of a subset selected from the Rank-2 codebook for 8 Tx antennas. The Rank-3 codebook for 8 Tx antennas may be composed of a subset selected from the Rank-4 codebook for 8 Tx antennas. Alternatively, the Rank-5 codebook for 8 Tx antennas may be composed of a subset selected from the Rank-6 codebook for 8 Tx antennas. The Rank-7 codebook for 8 Tx antennas may be composed of a subset selected from the Rank-8 codebook for 8 Tx antennas. The above-mentioned codebook configuration shown in Table 6 is disclosed for illustrative purposes only, and a method for generating a codebook for each rank shown in Table 6 may be independently applied to respective ranks, or may also be simultaneously applied to respective ranks. In addition, the relationship between codebooks of respective ranks shown in Table 6 (for example, the relationship between a low-rank codebook composed of a high-rank codebook subset and a high-rank codebook) may be independently applied to respective ranks, or may also be simultaneously applied to respective ranks.

In association with multi-granular feedback application, a method for applying the Kroneker product to a method for constructing the codebook for 8 Tx antennas using a combination of two base matrices has already been disclosed as described above. Hereinafter, a method for constructing a combination of two base matrices using an inner product will be described in detail. A specific format using an inner product of two base matrices is represented by Equation 9.

$$W = \tilde{W}_1 \tilde{W}_2 \qquad \text{[Equation 9]}$$

If a codebook for 8 Tx antennas is represented as an inner product, a first base matrix can be represented by a diagonal matrix shown in Table 10 for a co-polarized antenna group.

$$\tilde{W}_1 = \begin{bmatrix} W_1 & 0 \\ 0 & W_1 \end{bmatrix} (W_1 : 4 \times N) \qquad \text{[Equation 10]}$$

In addition, if a second base matrix is used to adjust a relative phase between polarities, the second base matrix can be denoted by an ientity matrix. In association with a higher rank for the codebook for 8 Tx antennas, the second base matrix can be denoted by the following equation 11. As can be seen from Equation 11, the relationship between a coefficient (1) of a first row of the second base matrix and a coefficient (a or −a) of a second row of the second base matrix is used to reflect adjustment of the aforementioned relative phase.

$$\tilde{W}_2 = \begin{bmatrix} I & I \\ aI & -aI \end{bmatrix} (I : N \times N) \qquad \text{[Equation 11]}$$

Therefore, the codebook for 8 Tx antennas can be denoted by Equation 12 using an inner product of the first base matrix and the second base matrix.

$$W = \begin{bmatrix} W_1 & 0 \\ 0 & W_1 \end{bmatrix} \begin{bmatrix} I & I \\ aI & -aI \end{bmatrix} = \begin{bmatrix} W_1 & W_1 \\ aW_1 & -aW_1 \end{bmatrix} \qquad \text{[Equation 12]}$$

The codebook based on the inner product of Equation 12 can be simply represented using the Kroneker product shown in the following equation 13.

$$W = W_2 \otimes W_1 (W_1 : 4 \times N, W_2 : 2 \times M) \qquad \text{[Equation 13]}$$

In Equation 13, the precoding matrix contained in a codebook W includes (4×2) rows and (N×M) columns. Accordingly, the precoding matrix may be used as a codebook for 8Tx-antenna (N×M) Rank transmission. For example, assuming that the precoding codebook for 8Tx-antenna Rank-R transmission is configured and $W_2$ is composed of a (2×M) matrix, an N value of the matrix $W_1$ is denoted by R/M. For example, when constructing the precoding codebook for 8Tx-antenna Rank-4 transmission, if $W_2$ is composed of a (2×2) matrix (i.e., M=2) (for example, a matrix of Equation 8), $W_1$ may be denoted by a (4×2) matrix (i.e., N=R/M=4/2=2) (e.g., a DFT matrix).

Generation of Multiple-Codebook Based Precoder

The precoding operation for use in MIMO transmission may be considered to be the operation for mapping Tx signals to antenna(s) through layer(s). That is, Y Tx layers (or Y Tx streams) may be mapped to X Tx antennas through an (X×Y) precoding matrix.

In order to construct the ($N_t \times R$) precoding matrix when R streams (i.e., a Rank R) are transmitted through $N_t$ Tx antennas, at least one precoding matrix index (PMI) is fed back from the receiver so that the transmitter can construct the precoder matrix. The following equation 14 shows an exemplary codebook composed of $n_c$ matrices.

$$P_{N_t \times R}(k) \in \{P_1^{N_t \times R}, P_2^{N_t \times R}, P_3^{N_t \times R}, \ldots, P_{n_c}^{N_t \times R}\} \qquad \text{[Equation 14]}$$

In Equation 14, k is a specific resource index (subcarrier index, virtual resource index, or subband index). Equation 14 may be configured as shown in the following equation 15.

$$P_{N_t \times R}(k) = \begin{bmatrix} P_{M_t \times R, 1} \\ P_{M_t \times R, 2} \end{bmatrix}, N_t = 2 \cdot M_t \qquad \text{[Equation 15]}$$

In Equation 15, $P_{M_t \times R, 2}$ may be implemented by shifting $P_{M_t \times R, 1}$ by a specific complex weight $w_2$. Therefore, when a difference between $P_{M_t \times R, 1}$ and $P_{M_t \times R, 2}$ is denoted by a specific complex weight, the following equation 16 can be obtained.

$$P_{N_t \times R}(k) = \begin{bmatrix} w_1 \cdot P_{M_t \times R, 1} \\ w_2 \cdot P_{M_t \times R, 1} \end{bmatrix} \qquad \text{[Equation 16]}$$

In addition, Equation 16 can be denoted by the following equation 17 using the Kroneker product.

$$P_{N_t \times R, n, m}(k) = \begin{bmatrix} w_1 \\ w_2 \end{bmatrix} \otimes P_{M_t \times R, 1} = W_n \otimes P_m \qquad \text{[Equation 17]}$$

In Equation 17, the partial precoding matrix $$\begin{bmatrix} w_1 \\ w_2 \end{bmatrix}$$

or $P_{M_t \times R, 1}$ may be independently fed back from the receiver. The transmitter may be implemented by configuring the precoder of Equation 16 or 17 using each feedback information. When using the format of Equation 16 or 17, W is always configured in the form of a (2×1) vector, and may be configured as a codebook of Equation 18.

$$W \in \begin{bmatrix} 1 \\ e^{j\frac{2\pi}{N}i} \end{bmatrix}, i = 0, \ldots, N-1 \qquad \text{[Equation 18]}$$

In Equation 18, N is a total number of precoding vectors, and i may be used as a vector index. In order to minimize feedback overhead as well as to obtain proper performance, i may be set to any one of 2, 4, or 8. In addition, $P_{M_t \times R, 1}$ may be composed of either a codebook for 4 Tx antennas or a codebook for 2 Tx antennas. In association with the above-mentioned description, the codebook of Table 4 or 5 (i.e., the codebook for 2 or 4 Tx antennas defined in 3GPP LTE Release 8/9) may be used, and the codebook may also be configured in a rotated DFT format.

In addition, the matrix W may be configured as a (2×2) matrix. An example of the 2×2 W matrix is shown in the following equation 19.

$$P_{N_t \times 2R, n, m}(k) = \begin{bmatrix} w_1 & w_3 \\ w_2 & w_4 \end{bmatrix} \otimes P_{M_t \times R, 1} = W_n \otimes P_m, N_t = 2 \cdot M_t \qquad \text{[Equation 19]}$$

In Equation 19, if a maximum rank of the codebook $P_{M_t \times R, 1}$ is set to R, the range of the codebook design may be extended up to a Rank of 2R. For example, if the codebook of Table 4 is used as $P_{M_t \times R, 1}$, a maximum rank may be extended up to 4 (R=4) according to Equation 17. On the other hand, a maximum rank may be extended up to 8 (2R=8) as can be seen from equation 18. Therefore, it may be possible to construct a precoder that is capable of performing 8×8 transmission in a system including 8 Tx antennas. In this case, W may be configured as a codebook of Equation 20.

$$W \in \begin{bmatrix} 1 & 1 \\ e^{j\frac{2\pi}{N}i} & -e^{j\frac{2\pi}{N}i} \end{bmatrix}, i = 0, \ldots, N-1 \qquad \text{[Equation 20]}$$

The precoder configuration methods shown in Equations 17 and 18 may be differently applied according to individual ranks. For example, the scheme of Equation 17 is applied to Rank 4 or less (R≤4), and the scheme of Equation 18 is applied to Rank 5 or higher (R≥5). Alternatively, the scheme of Equation 17 may be applied only to Rank 1 (R=1), and the scheme of Equation 18 may be applied to the remaining ranks (Rank 2 or more (R≥2)). In association with Equation 17 and Equation 18, W and P may be fed back to have properties shown in the following table 7.

TABLE 7

| Case | W/P |
|---|---|
| Frequency granularity 1 | One of two matrices is fed back to a subband, and the remaining one matrix may be fed back to a wideband. |
| Frequency granularity 2 | One of two matrices is fed back to a best-M band, and the remaining one matrix may be fed back to a wideband. |
| Time granularity | One of two matrices is fed back at intervals of N, and the remaining one matrix is fed back at intervals of M. |
| Feedback channel 1 | One of two matrices is fed back to PUSCH, and the remaining one matrix is fed back to PUCCH. |
| Feedback channel 2 | If a feedback to PUSCH is performed, one (e.g., W) of two matrices is fed back to a subband, and the remaining one matrix (e.g., P) is fed back to a wideband. If a feedback to PUCCH is performed, both W and P can be fed back to a wideband. |
| Unequal protection | One (e.g., P) of two matrices can be encoded with a higher reliability coding rate, and the remaining one matrix (e.g., W) can be encoded with a lower reliability coding rate. |
| Alphabet restriction 1 | Alphabet of a matrix W may be limited to BPSK, and alphabets of the matrix P may be limited to QPSK or 8PSK. |
| Alphabet restriction 2 | Alphabet of a matrix W may be limited to QPSK, and alphabets of the matrix P may be limited to QPSK or 8PSK. |

It may be possible to construct the codebook using Equation 17 and Equation 18. However, it may be impossible to construct the precoder on the condition that two kinds of combinations are not used according to situation. In order to solve the above-mentioned problem, the precoder can be constructed as shown in the following equation 21.

$$P_{N_t \times N_t, n, m} = \begin{bmatrix} w_1 & w_3 \\ w_2 & w_4 \end{bmatrix} \otimes P_{M_t \times M_t} = W_n \otimes P_m, N_t = 2 \cdot M_t \qquad \text{[Equation 21]}$$

A precoder for an exemplary case (R=$N_t$) is configured using $P_{N_t \times N_t}$ obtained from Equation 21. Here, the case (R=$N_t$) indicates that a rank value is identical to the number of Tx antennas, and the column subset of the configured precoder may be used for a lower rank. When constructing the precoder as described above, nested properties are satisfied so that CQI calculation can be simplified. In Equation 21, $P_{N_t \times N_t, n, m}$ is a precoder in case of R=$N_t$. For example, a subset composed of the $0^{th}$ and $2^{nd}$ columns of the precoder $P_{N_t \times N_t, n, m}$ may be used as the precoder of R=2, and may be denoted by $P_{N_t \times N_t, n, m}(0,2)$. Here, $P_{N_t \times M_t}$ may be composed of a rotated DFT matrix or other types of codebook.

On the other hand, in order to increase a diversity gain under an open-loop environment, beam diversity gain can be maximized by replacing a precoder with another precoder according to a specific resource on the basis of the above-mentioned precoder. For example, if the precoder of Equation 17 is used, the scheme for applying the precoder according to a specific resource can be denoted by the following equation 22.

$$P_{N_t \times R, n, m}(k) W_{k \bmod n_c} \otimes P_{k \bmod m_c} \qquad \text{[Equation 22]}$$

In Equation 22, k is a specific resource region. The precoding matrix for the specific resource region k is determined by the modulo operation shown in Equation 22. In Equation 22, $n_c$ is the size of a codebook for the matrix W, and $m_c$ is the size of a codebook for the matrix P. Each of $n_c$ and $m_c$ may correspond to each subset.

When applying cycling of both matrices as shown in Equation 22, diversity gain can be maximized and complexity can be increased. Therefore, long-term cycling may be applied to a specific matrix, and short-term cycling may be applied to the remaining matrices.

For example, the modulo operation may be applied to the matrix W according to a PRB index, and the modulo operation may be applied to the matrix P according to a subframe index. Alternatively, the modulo operation may be applied to the matrix W according to a subframe index, and the modulo operation may be applied to the matrix P according to a PRB index.

In another example, the modulo operation may be applied to the matrix W according to a PRB index, and the modulo operation may be applied to the matrix P according to a subband index. Alternatively, the modulo operation may be applied to the matrix W according to a subframe index, and the modulo operation may be applied to the matrix P according to a PRB index.

In addition, precoder cycling based on the modulo operation is applied to only one of two matrices, and the other matrix may be fixed.

When constructing the precoder using two matrices, the codebook structure may be denoted by an inner product as shown in Equations 9 to 12, or the codebook structure may also be denoted by a Kroneker product shown in Equation 13.

Detailed Information of Codebook Structure for 8 Tx Antennas

Based on the precoder structure applicable to the system including a maximum of 8 Tx antennas, the embodiments of the present invention for detailed information (precoder size, factor component, etc.) through which precoding can be applied to a MIMO system will hereinafter be described. In addition, the exemplary precoding structures capable of supporting various antenna configurations will hereinafter be described.

Codebook Structure

The codebook for 8 Tx antennas may be configured by a combination of two base matrices. In association with the aforementioned description, two combination methods can be used. One of the two combination methods is implemented by the inner product, and the other combination method is implemented by the Kroneker product.

First, the codebook denoted by an inner product of two base matrices is shown in the following equation 23.

$$W = \tilde{W}_1 \tilde{W}_2 \qquad \text{[Equation 23]}$$

If the codebook for 8 Tx antennas is represented in the form of an inner product, a first base matrix for the co-polarized antenna group can be represented by a diagonal matrix shown in Equation 24.

$$\tilde{W}_1 = \begin{bmatrix} W_1 & 0 \\ 0 & W_1 \end{bmatrix} (W_1 : 4 \times N) \qquad \text{[Equation 24]}$$

In addition, if a second base matrix is used to adjust a relative phase between polarities, the second base matrix can be denoted by an identity matrix. In addition, for a high rank of a codebook for 8 Tx antennas, the second base matrix can be denoted as shown in Equation 25. In Equation 25, the relationship between a coefficient '1' of a first row of the second base matrix and a coefficient (a) of a second row of the second base matrix is used to adjust the aforementioned relative phase.

$$\tilde{W}_2 = \begin{bmatrix} I \\ aI \end{bmatrix} (I: N \times N) \qquad \text{[Equation 25]}$$

Therefore, the codebook for 8 Tx antennas can be represented by the following equation 26 using inner products of the first base matrix and the second base matrix.

$$W = \begin{bmatrix} W_1 & 0 \\ 0 & W_1 \end{bmatrix} \begin{bmatrix} I \\ aI \end{bmatrix} = \begin{bmatrix} W_1 \\ aW_1 \end{bmatrix} \qquad \text{[Equation 26]}$$

The codebook denoted by the inner product as shown in Equation 26 can be represented using the Kroneker product shown in the following equation 27.

$$W = W_2 \otimes W_1 (W_1 : 4 \times N, W_2 : 2 \times M) \qquad \text{[Equation 27]}$$

DFT Based Codebook

A (n×n) DFT matrix can be defined as shown in the following equation 28.

$$\text{DFT\_N: } D_N(k, n) = \frac{1}{\sqrt{N}} \exp(-j2\pi kn/N), \qquad \text{[Equation 28]}$$
$$k, n = 0, 1, \ldots, N-1$$

For example, when generating the codebook for 8Tx-antenna MIMO transmission, the simplest codebook can be denoted by the following equation 29.

$$\text{DFT\_8: } D_8(k, n) = \frac{1}{\sqrt{8}} \exp(-j2\pi kn/8), k, n = 0, 1, \ldots, 7 \qquad \text{[Equation 29]}$$

In the DFT_8 codebook shown in Equation 29, 8 columns can be defined as the precoding weights having different responses.

When constructing the spatial channel, a response of a Tx antenna under ULA environment can be denoted by the following equation 30.

$$a_i(\theta) = \frac{1}{\sqrt{8}} \Big[ 1 \quad e^{-j2\pi \frac{d}{\lambda} \sin(\theta)} \quad e^{-j2\pi \frac{2d}{\lambda} \sin(\theta)} \quad e^{-j2\pi \frac{3d}{\lambda} \sin(\theta)} \qquad \text{[Equation 30]}$$
$$e^{-j2\pi \frac{4d}{\lambda} \sin(\theta)} \quad e^{-j2\pi \frac{5d}{\lambda} \sin(\theta)} \quad e^{-j2\pi \frac{6d}{\lambda} \sin(\theta)} \quad e^{-j2\pi \frac{7d}{\lambda} \sin(\theta)} \Big]$$

In Equation 30, d is a spacing or distance between antennas, and λ is a wavelength of an intermediate frequency. A phase θ is an angle between a plane wave and an antenna array, and may be denoted by DoA (Direction Of Arrival) or AoA (Angle Of Arrival). In a high-correlation (or highly correlated) channel, a Tx antenna response based on the codebook obtained by Equation 29 may be obtained by an inner product related to Equation 30. For the aforementioned reasons, the vector of Equation 30 may also be referred to as the steering vector for either a transmission (Tx) direction or a reception (Rx) direction according to an antenna array.

Figure 24:
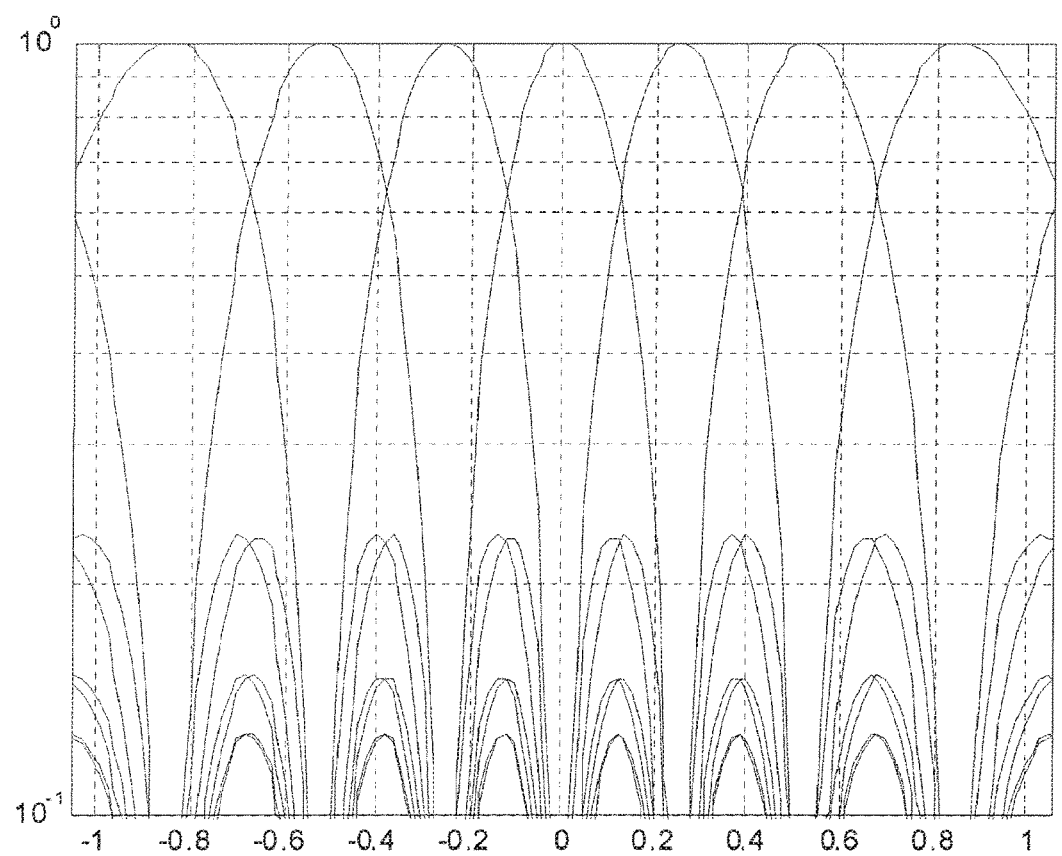
FIGS. 24 to 43 show antenna responses according to examples of the present invention.

FIG. 24 shows an antenna response of the DFT_8 codebook shown in Equation 29. In FIG. 24, a vertical axis represents the amplitude of an antenna frequency response, and a horizontal axis represents the value of θ denoted by a radian value. 8 parabolic parts each having a maximum frequency response are shown in FIG. 24. Each parabolic part may indicate an antenna response constructed by a column vector of the DFT_8 codebook. A first column vector of the DFT_8 codebook has a maximum antenna response at θ=0° (0 rad), a second column vector has a maximum antenna response at θ=14° (about 0.24 rad), a third column vector has a maximum antenna response at θ=30° (about 0.52 rad), a fourth column vector has a maximum antenna response at θ=49° (about 0.85 rad), a fifth column vector has a maximum antenna response at θ=90° (about 1.57 rad), a sixth column vector has a maximum antenna response at θ=−49° (about −0.85 rad), a seventh column vector has a maximum antenna response at θ=−30° (about −0.52 rad), and an eighth column vector has a maximum antenna response at θ=−14° (about 0.24 rad). In accordance with the present invention, the antenna response may be referred to as a beam for convenience of description and better understanding of the present invention. That is, DFT_8 may generate beams of 0°, 14°, 30°, 49°, 90°, −49°, −30°, or −14°.

In order to form more dense beams, the DFT matrix may be configured to have a small reference phase. For example, an oversampled DFT matrix shown in Equation 31 may be used as necessary.

$$\text{DFT}\_N*a: D_{N*a}(k,n) = \frac{1}{\sqrt{N}}\exp(-j2\pi kn/(N*a)), \qquad \text{[Equation 31]}$$

$$k = 0, 1, \ldots, N-1 \; n = 0, 1, \ldots, (N*a)-1$$

In Equation 31, N is the number of Tx antennas, a is an oversampling coefficient, k is an antenna index, and n is a codebook index. The codebook based on Equation 31 may form (N × a) beams having different phases using N Tx antennas. For example, assuming that oversampling is applied two times when constructing the DFT codebook for 8 Tx antennas, the following equation 32 may be used.

$$\text{DFT}\_16: D_{16}(k,n) = \frac{1}{\sqrt{8}}\exp(-j2\pi kn/(8*2)), \qquad \text{[Equation 32]}$$

$$k = 0, 1, \ldots, 8 \; n = 0, 1, \ldots, 15$$

Figure 25:
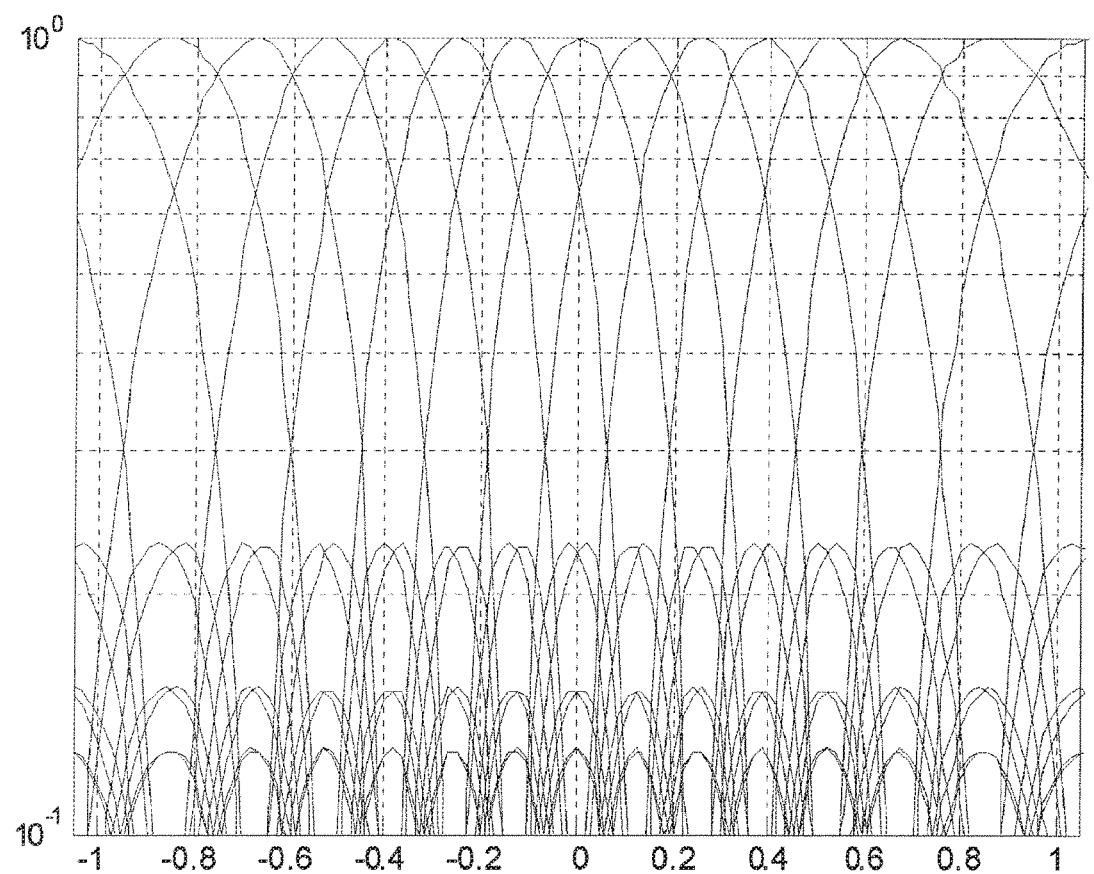

16 vectors for 8 Tx antennas can be constructed using the aforementioned Equation 32, and associated antenna responses can be represented as shown in FIG. 25.

The codebooks shown in Equations 31 and 32 are appropriate for ULA antenna configuration.

On the other hand, as a codebook structure for effectively supporting the dual-polarization antenna configuration, block-diagonal-shaped codebook structures shown in Equations 22, 23 to 27 may be preferably used as necessary. In case of using the block-diagonal-shaped matrix, the elements arranged at diagonal positions may be composed of a codebook supporting 4 Tx antennas. In addition, a codebook supporting 2 Tx antennas may be used to combine two co-polarization antennas. In this case, as a codebook for 4 Tx antennas and a codebook for 2 Tx antennas, a DFT-shaped codebook may be used. Alternatively, a codebook defined in 3GPP LTE Release 8/9 may be used as shown in Tables 4 and 5. Specifically, when using the DFT-shaped codebook, the codebook shown in the following equation 33 can be used.

$$\text{DFT}\_2: D_2(k,n) = \frac{1}{\sqrt{2}}\exp(-j2\pi kn/2), k = 0, 1 \; n = 0, 1 \qquad \text{[Equation 33]}$$

$$\text{DFT}\_4: D_4(k,n) = \frac{1}{\sqrt{4}}\exp(-j2\pi kn/4),$$

$$k = 0, 1, 2, 3 \; n = 0, 1, 2, 3$$

In Equation 33, DFT_2 may generate a (2×2) matrix, and DFT_4 may generate a (4×4) matrix, as shown in the following equation 34.

$$\text{DFT}\_2: W_2 = \begin{bmatrix} 1 & 1 \\ 1 & -1 \end{bmatrix} \qquad \text{[Equation 34]}$$

$$\text{DFT}\_4: W_1 = \begin{bmatrix} 1 & 1 & 1 & 1 \\ 1 & -j & -1 & j \\ 1 & -1 & 1 & -1 \\ 1 & j & -1 & -j \end{bmatrix}$$

In Equation 34, $W_2$ may be composed of a matrix having two vectors, and $W_1$ may be composed of a matrix having four vectors. When constructing the 8Tx antenna codebook shown in Equation 17 using $W_1$ and $W_2$ shown in Equation 34 as base codebooks, the following equation 35 can be obtained.

$$W = W_2 \otimes W_1 = \begin{bmatrix} 1 & 1 & 1 & 1 & 1 & 1 & 1 & 1 \\ 1 & -j & -1 & j & 1 & -j & -1 & j \\ 1 & -1 & 1 & -1 & 1 & -1 & 1 & -1 \\ 1 & j & -1 & -j & 1 & j & -1 & -j \\ 1 & 1 & 1 & 1 & -1 & -1 & -1 & -1 \\ 1 & -j & -1 & j & -1 & j & 1 & -j \\ 1 & -1 & 1 & -1 & -1 & 1 & -1 & 1 \\ 1 & j & -1 & -j & -1 & -j & 1 & j \end{bmatrix} \qquad \text{[Equation 35]}$$

The codebook shown in Equation 35 is used as the codebook for 8 Tx antennas, and may be composed of a matrix including 8 vectors. The antenna response for the ULA antenna configuration composed of 8 Tx antennas of the above-mentioned codebook can be represented as shown in FIG. 26.

Figure 26:
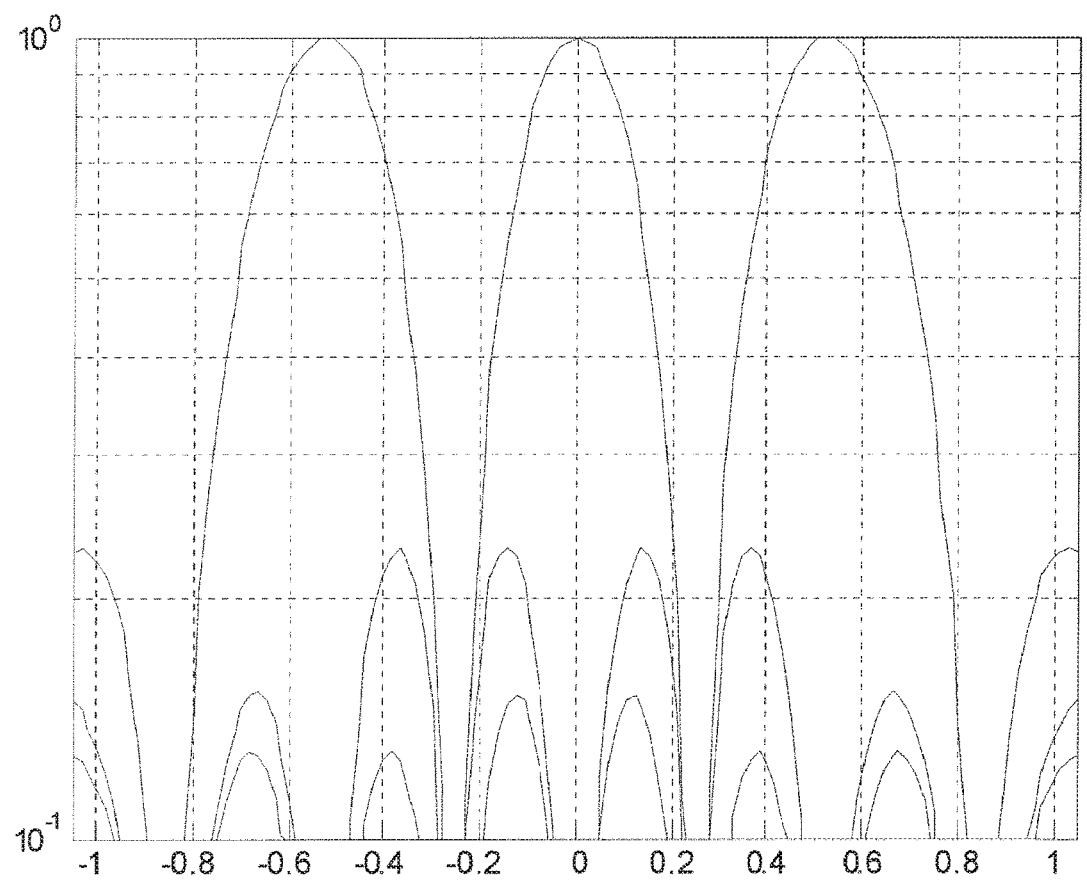

Referring to FIG. 26, the codebook obtained by a combination of DFT_4 and DFT_2 has only four antenna responses whereas it has 8 elements, because the codebook elements composed of two codebooks are 90 degrees out of phase with each other. A minimum phase value capable of being represented by any one matrix element of two base matrices may be determined to be a minimum interval of an antenna response capable of being represented by a codebook. DFT_4 may represent a phase of 90°, and DFT_2 may be extended to a phase of 180°. Therefore, provided that DFT_8 having more dense spacing for the 4Tx antenna codebook is used, the spacing of a frequency response capable of being represented is increased. The 4Tx antenna codebook having been oversampled two times according to Equation 31 can be generated as shown in the following equation 36.

$$\text{DFT\_8: } D_8(k, n) = \frac{1}{\sqrt{4}} \exp(-j2\pi kn/8), \quad \text{[Equation 36]}$$

$$k = 0, 1, 2, 3 \; n = 0, 1, \ldots, 7$$

In Equation 36, DFT_8 can generate a (4×8) matrix, as shown in the following equation 37.

$$W_1 = \frac{1}{\sqrt{4}} \begin{bmatrix} e^{j0\cdot0/8} & e^{j0\cdot1/8} & e^{j0\cdot2/8} & e^{j0\cdot3/8} & e^{j0\cdot4/8} & e^{j0\cdot5/8} & e^{j0\cdot6/8} & e^{j0\cdot7/8} \\ e^{j1\cdot0/8} & e^{j1\cdot1/8} & e^{j1\cdot2/8} & e^{j1\cdot3/8} & e^{j1\cdot4/8} & e^{j1\cdot5/8} & e^{j1\cdot6/8} & e^{j1\cdot7/8} \\ e^{j2\cdot0/8} & e^{j2\cdot1/8} & e^{j2\cdot2/8} & e^{j2\cdot3/8} & e^{j2\cdot4/8} & e^{j2\cdot5/8} & e^{j2\cdot6/8} & e^{j2\cdot7/8} \\ e^{j3\cdot0/8} & e^{j3\cdot1/8} & e^{j3\cdot2/8} & e^{j3\cdot3/8} & e^{j3\cdot4/8} & e^{j3\cdot5/8} & e^{j3\cdot6/8} & e^{j3\cdot7/8} \end{bmatrix} \quad \text{[Equation 37]}$$

8 vectors, each of which is composed of 4 elements, are represented by Equation 37. The matrix shown in Equation 37 may also be combined with a diagonal matrix having a phase shift as shown in the following equation 38.

$$W_1 = \frac{1}{\sqrt{4}} \begin{bmatrix} e^{j0\cdot 4\cdot m/8} & 0 & 0 & 0 \\ 0 & e^{j1\cdot 4\cdot m/8} & 0 & 0 \\ 0 & 0 & e^{j2\cdot 4\cdot m/8} & 0 \\ 0 & 0 & 0 & e^{j3\cdot 4\cdot m/8} \end{bmatrix} \begin{bmatrix} e^{j0\cdot0/8} & e^{j0\cdot1/8} & e^{j0\cdot2/8} & e^{j0\cdot3/8} \\ e^{j1\cdot0/8} & e^{j1\cdot1/8} & e^{j1\cdot2/8} & e^{j1\cdot3/8} \\ e^{j2\cdot0/8} & e^{j2\cdot1/8} & e^{j2\cdot2/8} & e^{j2\cdot3/8} \\ e^{j3\cdot0/8} & e^{j3\cdot1/8} & e^{j3\cdot2/8} & e^{j3\cdot3/8} \end{bmatrix}, m = 0, 1 \quad \text{[Equation 38]}$$

The 4Tx-antenna codebook (i.e., DFT_8 of Equation 36) having been oversampled two times is used as a single base matrix ($W_1$), and the 2Tx-antenna codebook (i.e., DFT_2 of Equation 33) configured to use DFT_2 is used as the other base matrix ($W_2$). The 8Tx-antenna codebook generated using Equation 17 can be represented by the following equation 39.

$$\text{DFT\_2: } W_2 = D_2(k, n) = \frac{1}{\sqrt{2}} \exp(-j2\pi kn/2), \quad \text{[Equation 39]}$$

$$k = 0, 1 \; n = 0, 1$$

$$\text{DFT\_8: } W_1 = D_8(k, n) = \frac{1}{\sqrt{4}} \exp(-j2\pi kn/8),$$

$$k = 0, 1, 2, 3 \; n = 0, 1, \ldots, 7$$

$$W = W_2 \otimes W_1$$

Figure 27:
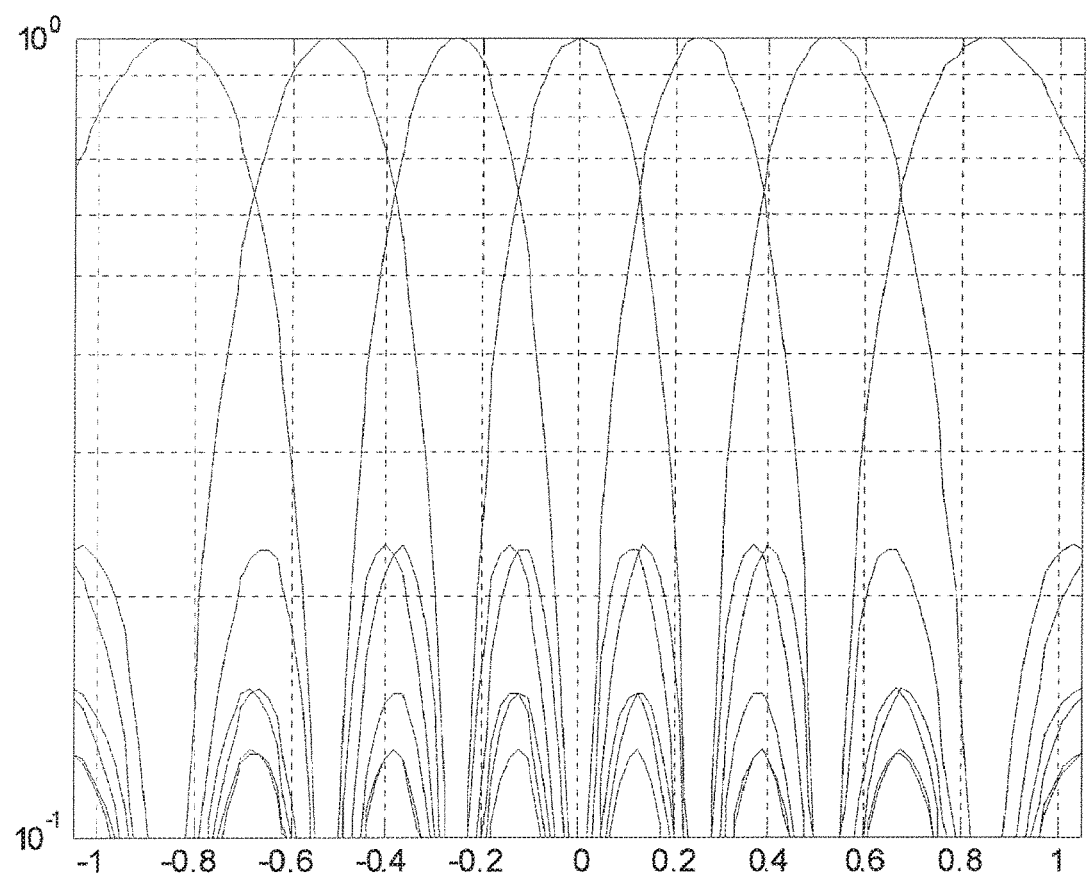

The antenna response for the 8Tx-antenna codebook obtained by Equation 39 can be represented as shown in FIG. 27.

The antenna response shown in FIG. 27 is identical to an antenna response shown in FIG. 24 (showing an antenna response of the 8Tx-antenna codebook of Equation 29). The 8Tx-antenna codebook obtained through Equation 39 is composed of 16 vectors, and the other 8Tx-antenna codebook obtained through Equation 29 is composed of 8 vectors. 8 vectors from among the codebook of Equation 39 may be completely identical to 8 vectors from among the codebook of Equation 29, or signs of all the elements (i.e., 8 vectors) of the codebook of Equation 39 are inverted (that is, '+' is inverted to '−', and '−' is inverted to '+') so that the inverted result of the codebook of Equation 39 corresponds to the codebook of Equation 29. Therefore, the antenna response of the codebook of Equation 39 may be identical to that of the codebook of Equation 29 as necessary. In addition, 8 additional vectors are shown in Equation 39, and a beam formed by the 8 additional vectors has two small-sized antenna responses.

The base codebook shown in the following equations 40 to 53 can be defined according to the oversampling factor.

$$\text{DFT\_2: } W_2 = D_2(k, n) = \frac{1}{\sqrt{2}} \exp(-j2\pi kn/2), \quad \text{[Equation 40]}$$

$$k = 0, 1 \; n = 0, 1$$

$$\text{DFT\_12: } W_1 = D_{12}(k, n) = \frac{1}{\sqrt{4}} \exp(-j2\pi kn/12),$$

$$k = 0, 1, 2, 3 \; n = 0, 1, \ldots, 11$$

$$\text{DFT\_2: } W_2 = D_2(k, n) = \frac{1}{\sqrt{2}} \exp(-j2\pi kn/2), \quad \text{[Equation 41]}$$

$$k = 0, 1 \; n = 0, 1$$

$$\text{DFT\_16: } W_1 = D_{16}(k, n) = \frac{1}{\sqrt{4}} \exp(-j2\pi kn/16),$$

$$k = 0, 1, 2, 3 \; n = 0, 1, \ldots, 15$$

$$\text{DFT\_4: } W_2 = D_4(k, n) = \frac{1}{\sqrt{2}} \exp(-j2\pi kn/4), \quad \text{[Equation 42]}$$

$$k = 0, 1 \; n = 0, 1, 2, 3$$

$$\text{DFT\_4: } D_4(k, n) = \frac{1}{\sqrt{4}} \exp(-j2\pi kn/4),$$

$$k = 0, 1, 2, 3 \; n = 0, 1, 2, 3$$

-continued $$\text{DFT\_4: } W_2 = D_4(k, n) = \frac{1}{\sqrt{2}}\exp(-j2\pi kn/4), \quad \text{[Equation 43]}$$
$$k = 0, 1 \; n = 0, 1, 2, 3$$
$$\text{DFT\_8: } W_1 = D_8(k, n) = \frac{1}{\sqrt{4}}\exp(-j2\pi kn/8),$$
$$k = 0, 1, 2, 3 \; n = 0, 1, \ldots, 7$$

$$\text{DFT\_4: } W_2 = D_4(k, n) = \frac{1}{\sqrt{2}}\exp(-j2\pi kn/4), \quad \text{[Equation 44]}$$
$$k = 0, 1 \; n = 0, 1, 2, 3$$
$$\text{DFT\_12: } W_1 = D_{12}(k, n) = \frac{1}{\sqrt{4}}\exp(-j2\pi kn/12),$$
$$k = 0, 1, 2, 3 \; n = 0, 1, \ldots, 11$$

$$\text{DFT\_4: } W_2 = D_4(k, n) = \frac{1}{\sqrt{2}}\exp(-j2\pi kn/4), \quad \text{[Equation 45]}$$
$$k = 0, 1 \; n = 0, 1, 2, 3$$
$$\text{DFT\_16: } W_1 = D_{16}(k, n) = \frac{1}{\sqrt{4}}\exp(-j2\pi kn/16),$$
$$k = 0, 1, 2, 3 \; n = 0, 1, \ldots, 15$$

$$\text{DFT\_8: } W_2 = D_8(k, n) = \frac{1}{\sqrt{2}}\exp(-j2\pi kn/8), \quad \text{[Equation 46]}$$
$$k = 0, 1 \; n = 0, 1, \ldots, 7$$
$$\text{DFT\_4: } D_4(k, n) = \frac{1}{\sqrt{4}}\exp(-j2\pi kn/4),$$
$$k = 0, 1, 2, 3 \; n = 0, 1, 2, 3$$

$$\text{DFT\_8: } W_2 = D_8(k, n) = \frac{1}{\sqrt{2}}\exp(-j2\pi kn/8), \quad \text{[Equation 47]}$$
$$k = 0, 1 \; n = 0, 1, \ldots, 7$$
$$\text{DFT\_8: } W_1 = D_8(k, n) = \frac{1}{\sqrt{4}}\exp(-j2\pi kn/8),$$
$$k = 0, 1, 2, 3 \; n = 0, 1, \ldots, 7$$

$$\text{DFT\_8: } W_2 = D_8(k, n) = \frac{1}{\sqrt{2}}\exp(-j2\pi kn/8), \quad \text{[Equation 48]}$$
$$k = 0, 1 \; n = 0, 1, \ldots, 7$$
$$\text{DFT\_12: } W_1 = D_{12}(k, n) = \frac{1}{\sqrt{4}}\exp(-j2\pi kn/12),$$
$$k = 0, 1, 2, 3 \; n = 0, 1, \ldots, 11$$

$$\text{DFT\_8: } W_2 = D_8(k, n) = \frac{1}{\sqrt{2}}\exp(-j2\pi kn/8), \quad \text{[Equation 49]}$$
$$k = 0, 1 \; n = 0, 1, \ldots, 7$$
$$\text{DFT\_16: } W_1 = D_{16}(k, n) = \frac{1}{\sqrt{2}}\exp(-j2\pi kn/16),$$
$$k = 0, 1, 2, 3 \; n = 0, 1, \ldots, 15$$

$$\text{DFT\_16: } W_2 = D_8(k, n) = \frac{1}{\sqrt{4}}\exp(-j2\pi kn/16), \quad \text{[Equation 50]}$$
$$k = 0, 1 \; n = 0, 1, \ldots, 15$$
$$\text{DFT\_4: } D_4(k, n) = \frac{1}{\sqrt{4}}\exp(-j2\pi kn/4),$$
$$k = 0, 1, 2, 3 \; n = 0, 1, 2, 3$$

$$\text{DFT\_16: } W_2 = D_8(k, n) = \frac{1}{\sqrt{2}}\exp(-j2\pi kn/16), \quad \text{[Equation 51]}$$
$$k = 0, 1 \; n = 0, 1, \ldots, 15$$
$$\text{DFT\_8: } W_1 = D_8(k, n) = \frac{1}{\sqrt{4}}\exp(-j2\pi kn/8),$$
$$k = 0, 1, 2, 3 \; n = 0, 1, \ldots, 7$$

$$\text{DFT\_16: } W_2 = D_8(k, n) = \frac{1}{\sqrt{2}}\exp(-j2\pi kn/16), \quad \text{[Equation 52]}$$
$$k = 0, 1 \; n = 0, 1, \ldots, 15$$
$$\text{DFT\_12: } W_1 = D_{12}(k, n) = \frac{1}{\sqrt{4}}\exp(-j2\pi kn/12),$$
$$k = 0, 1, 2, 3 \; n = 0, 1, \ldots, 11$$

$$\text{DFT\_16: } W_2 = D_8(k, n) = \frac{1}{\sqrt{2}}\exp(-j2\pi kn/16), \quad \text{[Equation 53]}$$
$$k = 0, 1 \; n = 0, 1, \ldots, 15$$
$$\text{DFT\_16: } W_1 = D_{16}(k, n) = \frac{1}{\sqrt{4}}\exp(-j2\pi kn/16),$$
$$k = 0, 1, 2, 3 \; n = 0, 1, \ldots, 15$$

Equations 40 to 53 show the codebook formats generated when oversampling is applied to the base codebook. Equations 40 to 53 can be represented in a matrix format. In addition, Equations 40 to 53 may also be combined with a phase diagonal matrix as necessary.

The codebook generated by a combination of the oversampled base matrices may be composed of a high-resolution codebook. The above-mentioned codebook may be composed of a codebook in which more dense beams are formed. In association with the above description, although feedback overhead is reduced, beam resolution may not be greatly deteriorated. Some indices are excluded from either the base matrix or the codebook formed by a combination of two base matrices (i.e., subsampling for the base matrices or the codebook index is applied), such that feedback to the remaining indices other than the some indices is performed and the precoder can be determined according to the feedback result.

Assuming that the precoder is selected from among a certain matrix from among two base matrices, selecting the precoder from among other base matrices may be dependent upon the previously selected precoder.

FIGS. 28 to 43 illustrate antenna responses changing with an oversampling factor for each of two base matrices. Provided that the oversampling factor for the first base matrix is denoted by OS1 (OS1=1, 2, 3 or 4) and the oversampling factor of the second base matrix is denoted by OS2 (OS2=1, 2, 3 or 4), antenna responses (shown in FIGS. 28 to 43) of respective combinations can be represented by the following table 8. For example, assuming that the oversampling factor for the first base matrix is denoted by OS1=3 and the oversampling factor for the second base matrix is denoted by OS2=2, antenna responses shown in FIG. 37 can be obtained.

TABLE 8

Figure 28:
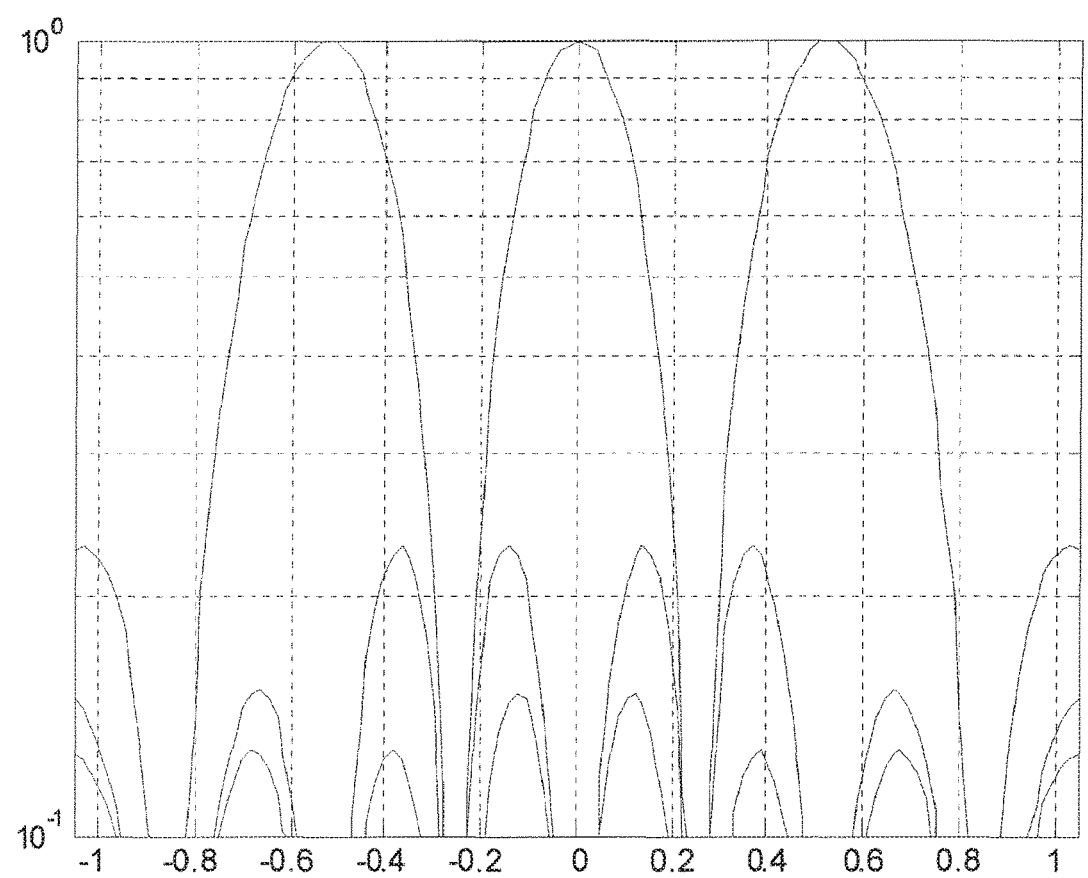
Figure 29:
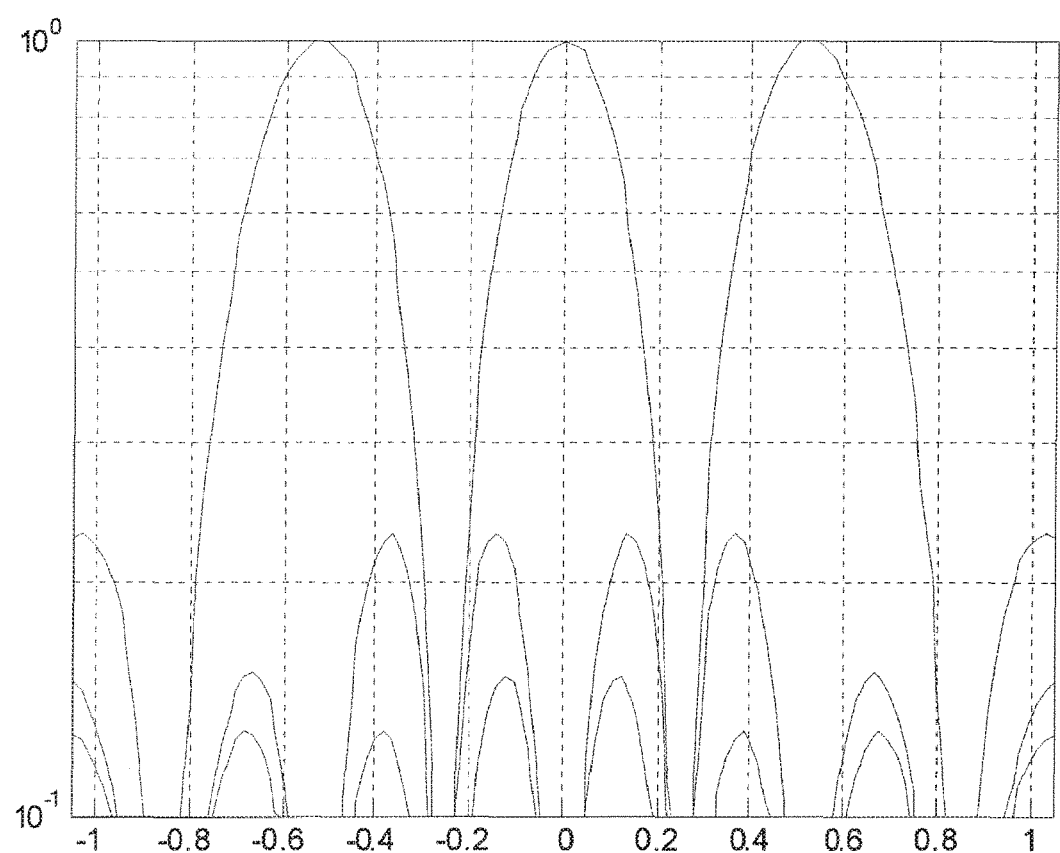
Figure 30:
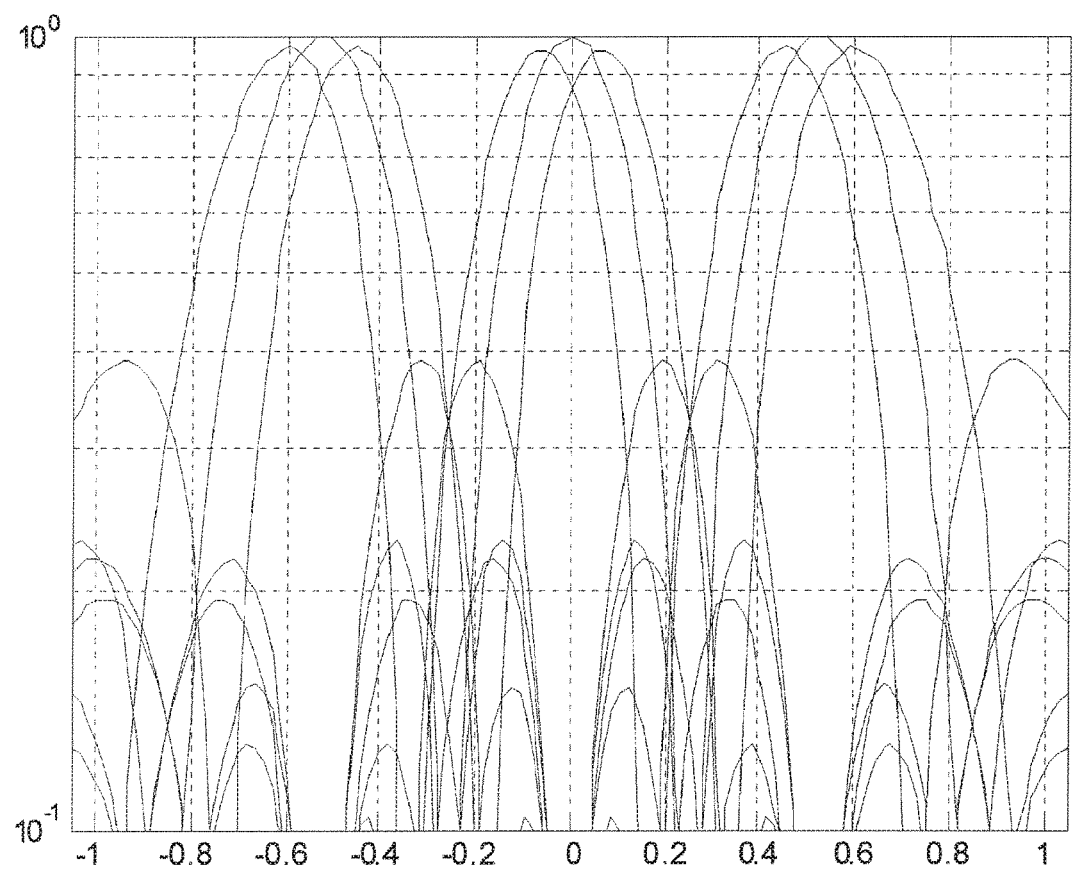
Figure 31:
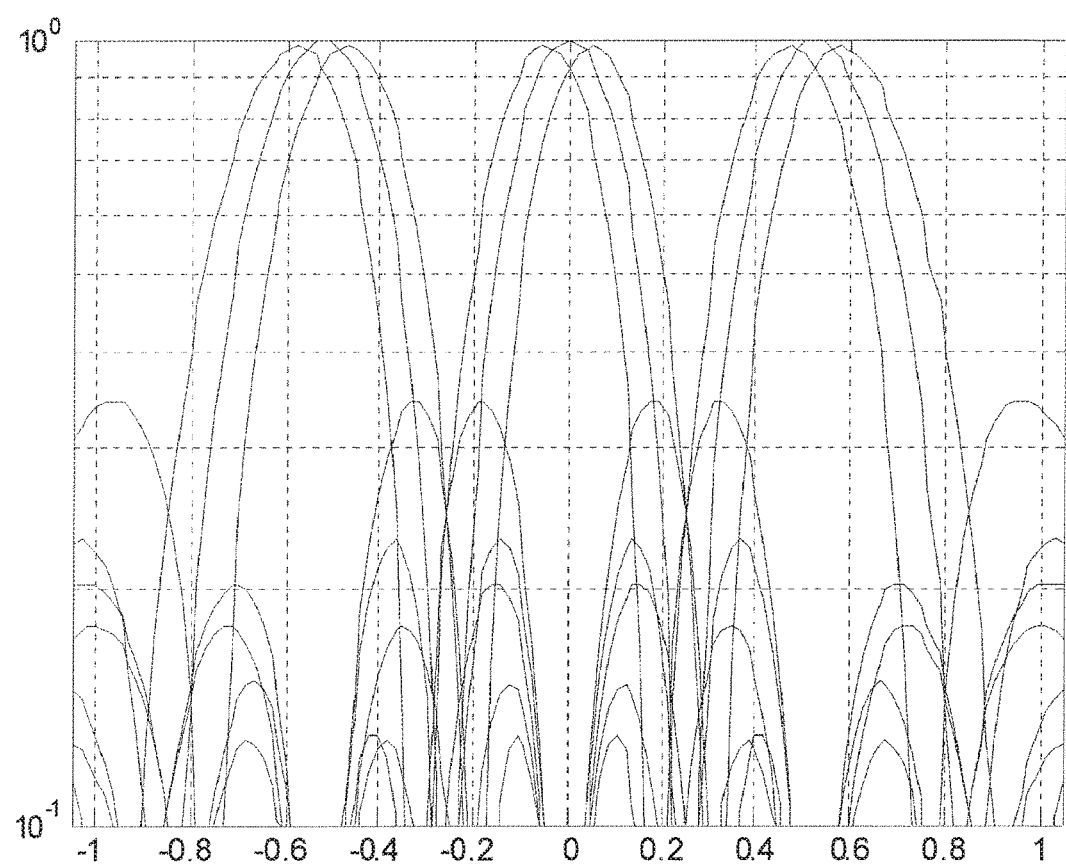
Figure 32:
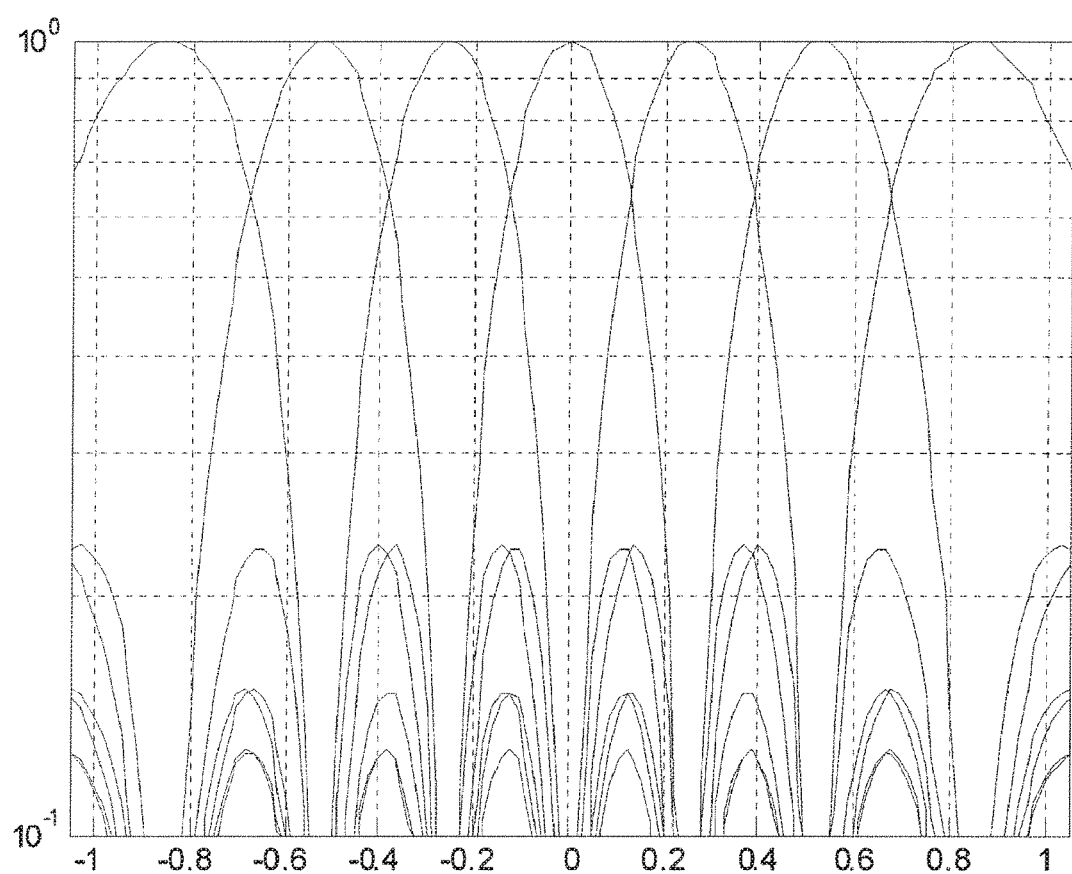
Figure 33:
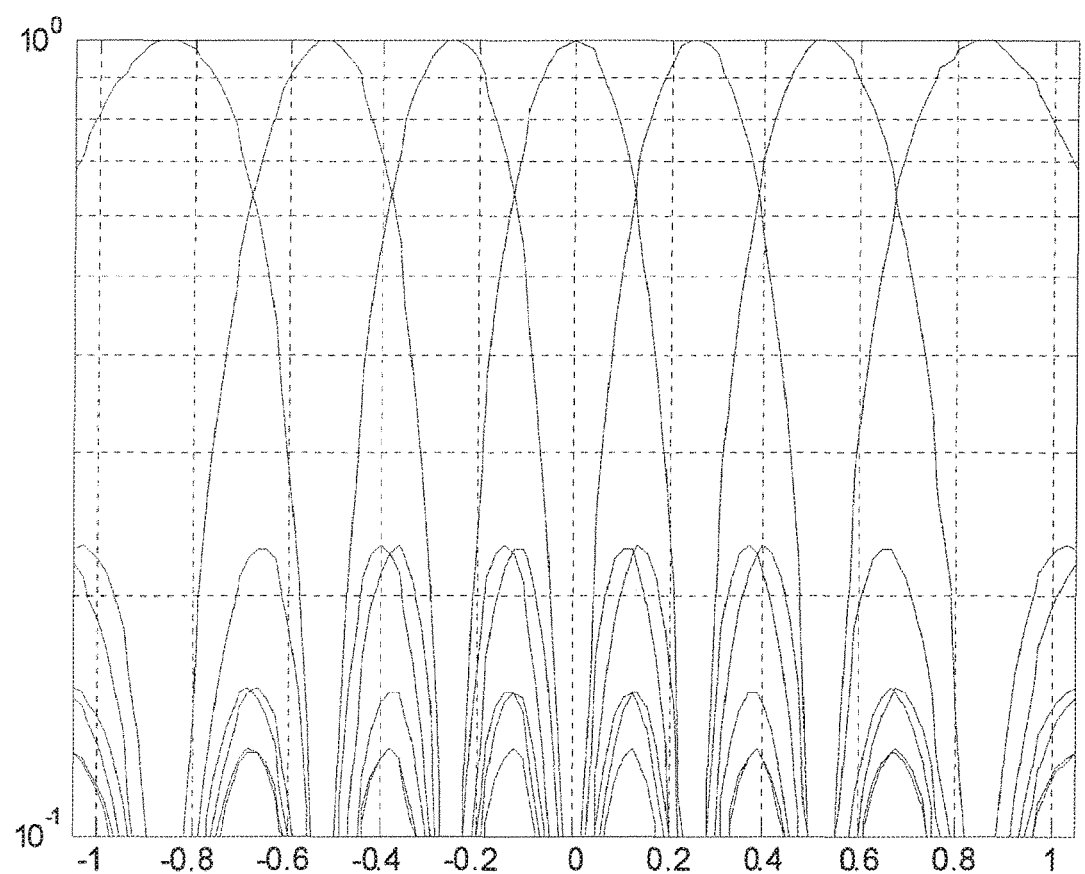
Figure 34:
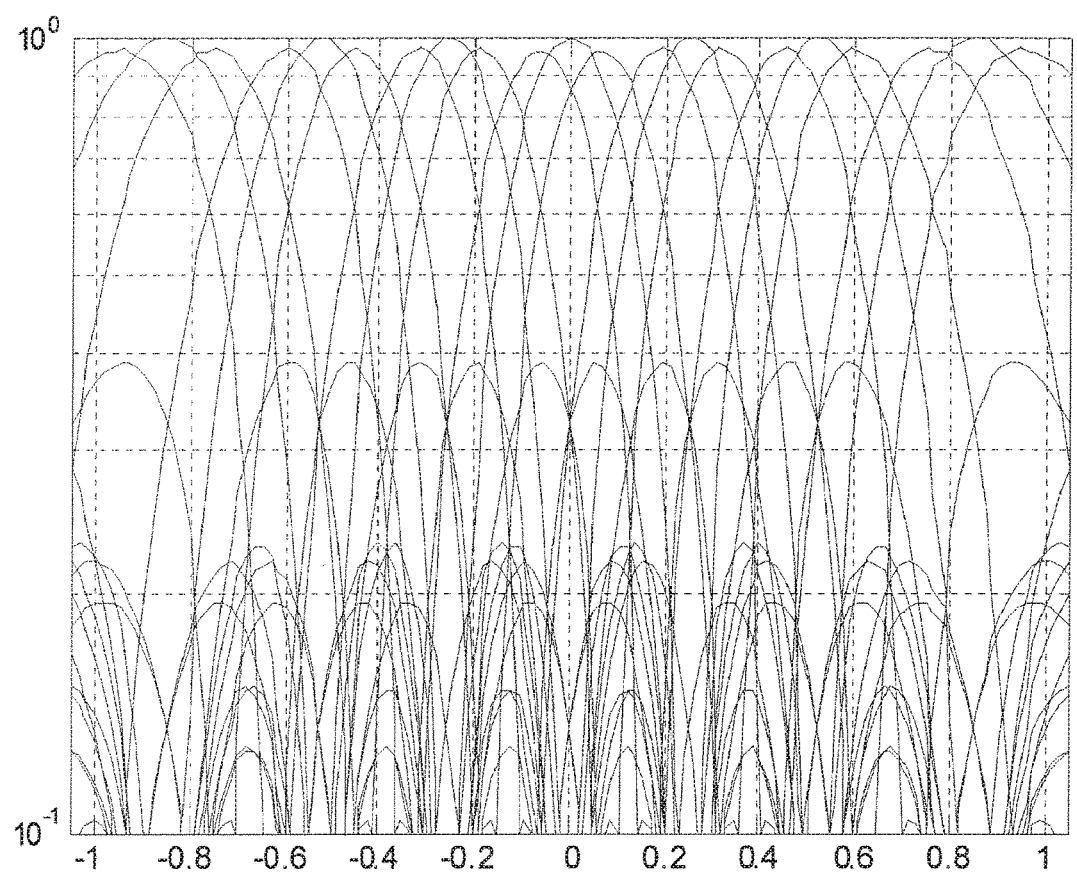
Figure 35:
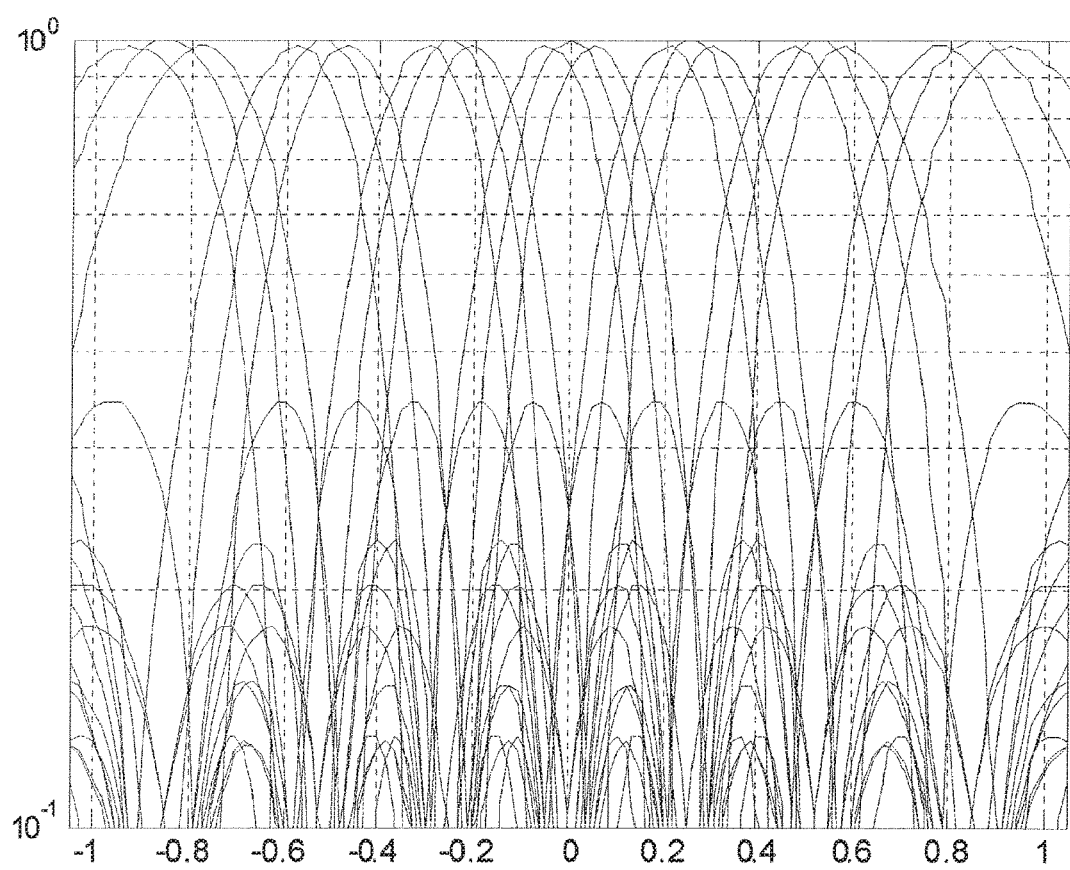
Figure 36:
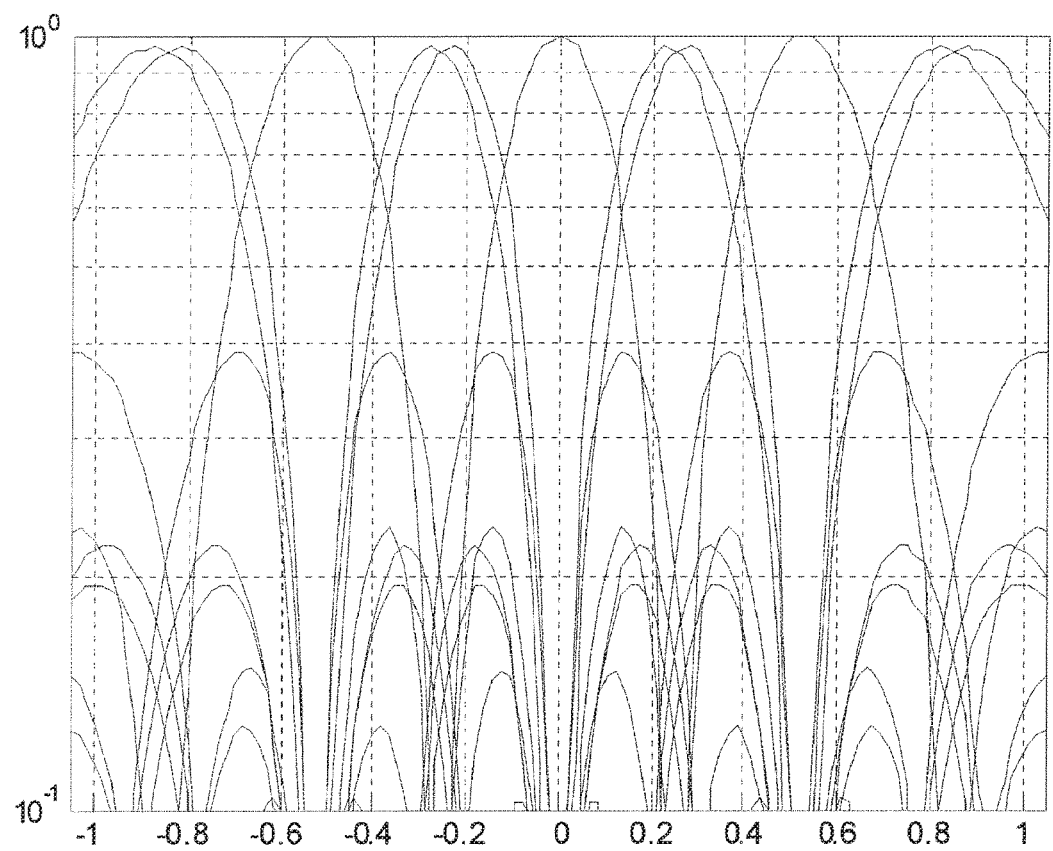
Figure 37:
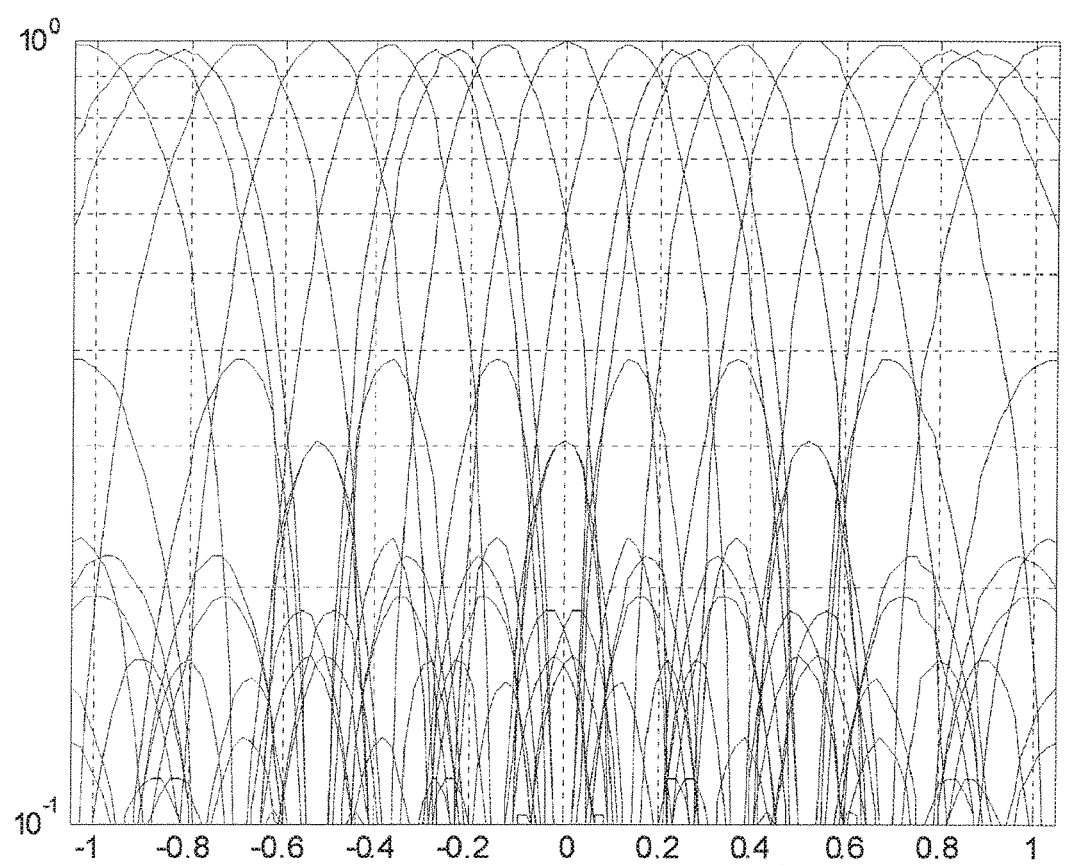
Figure 38:
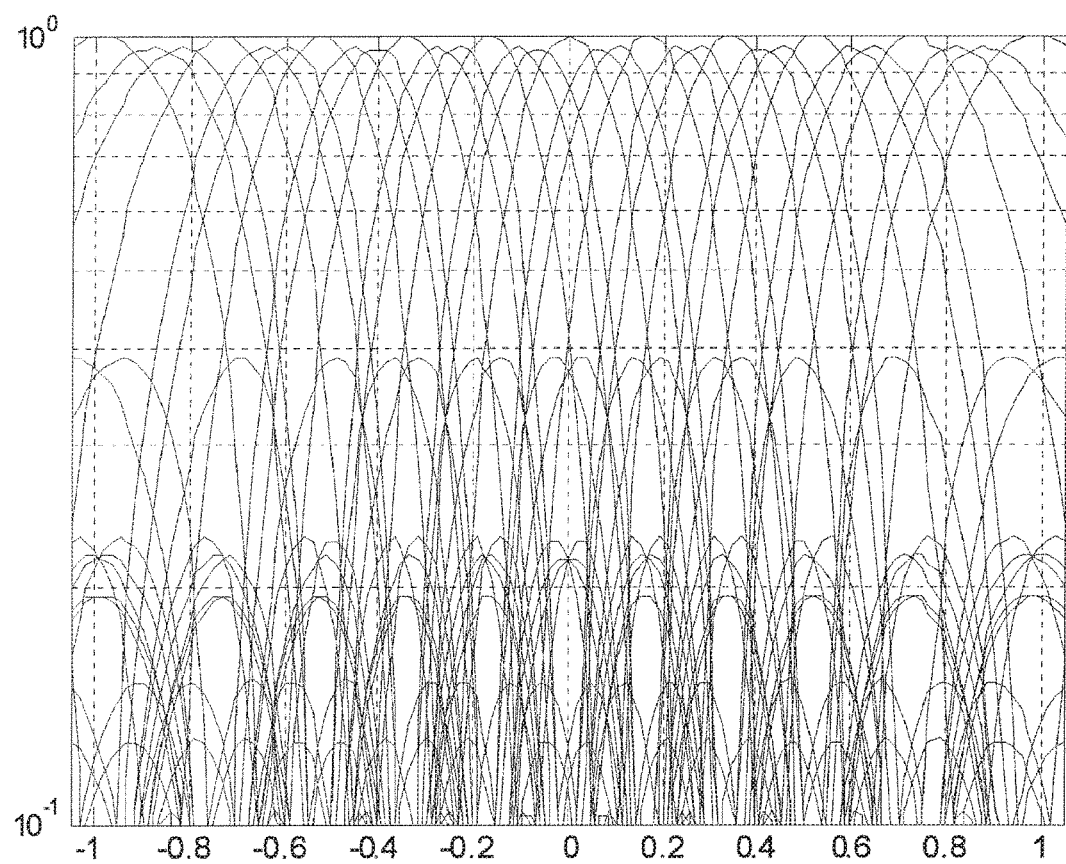
Figure 39:
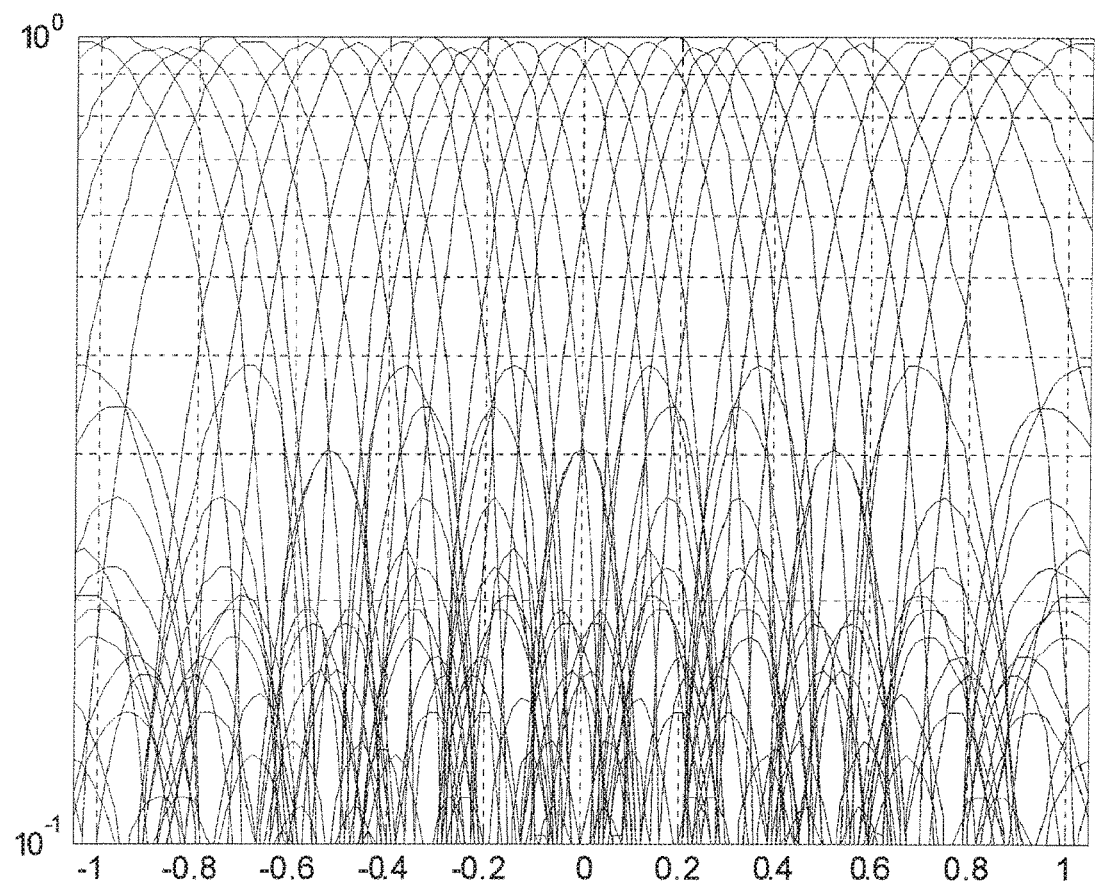
Figure 40:
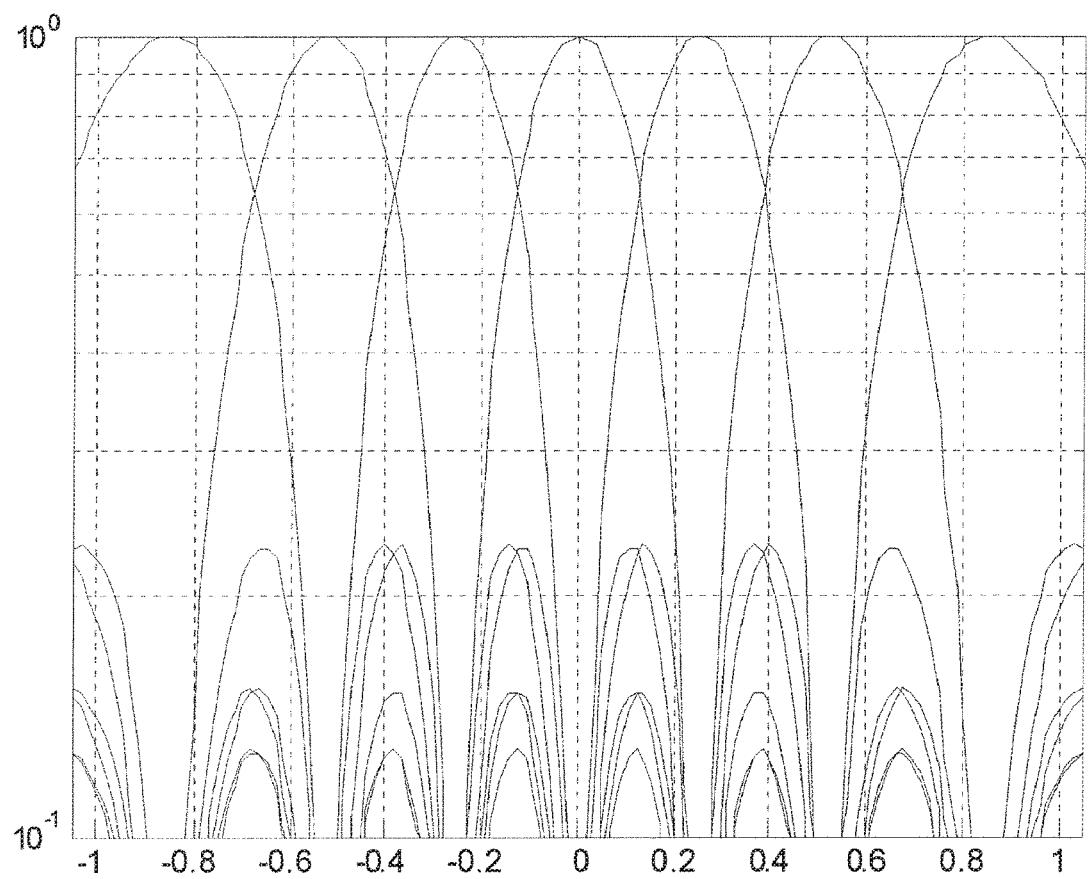
Figure 41:
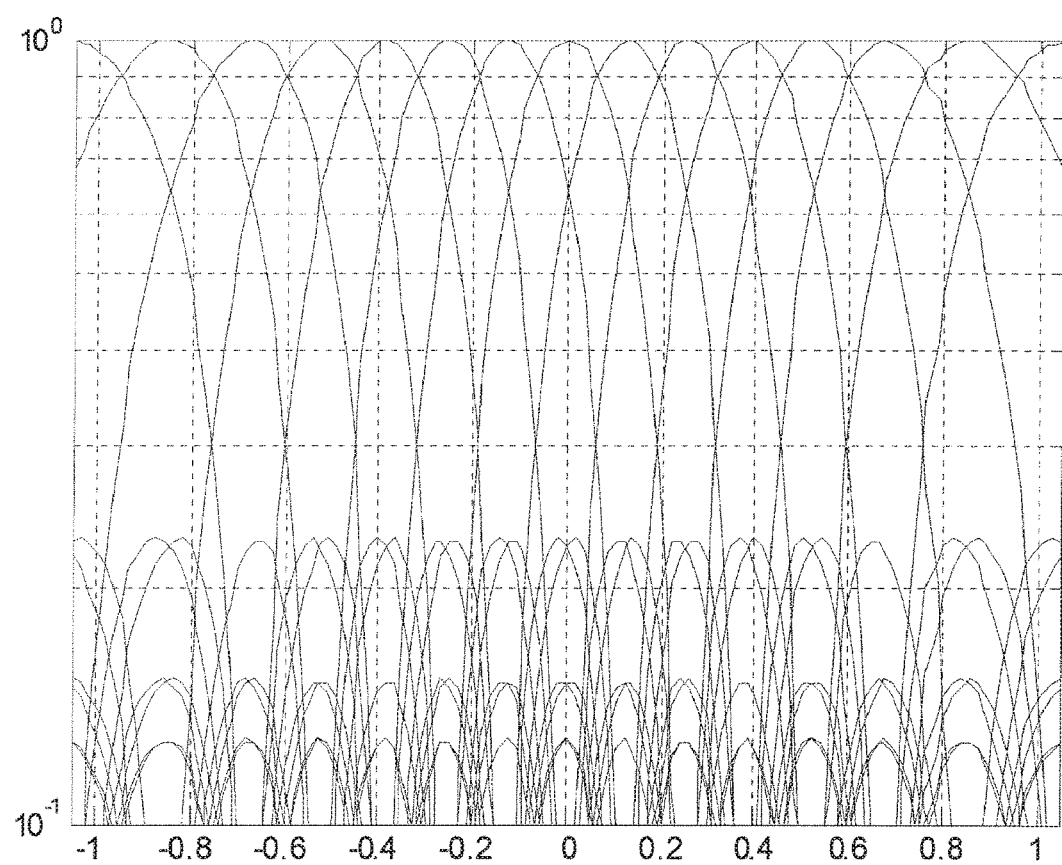
Figure 42:
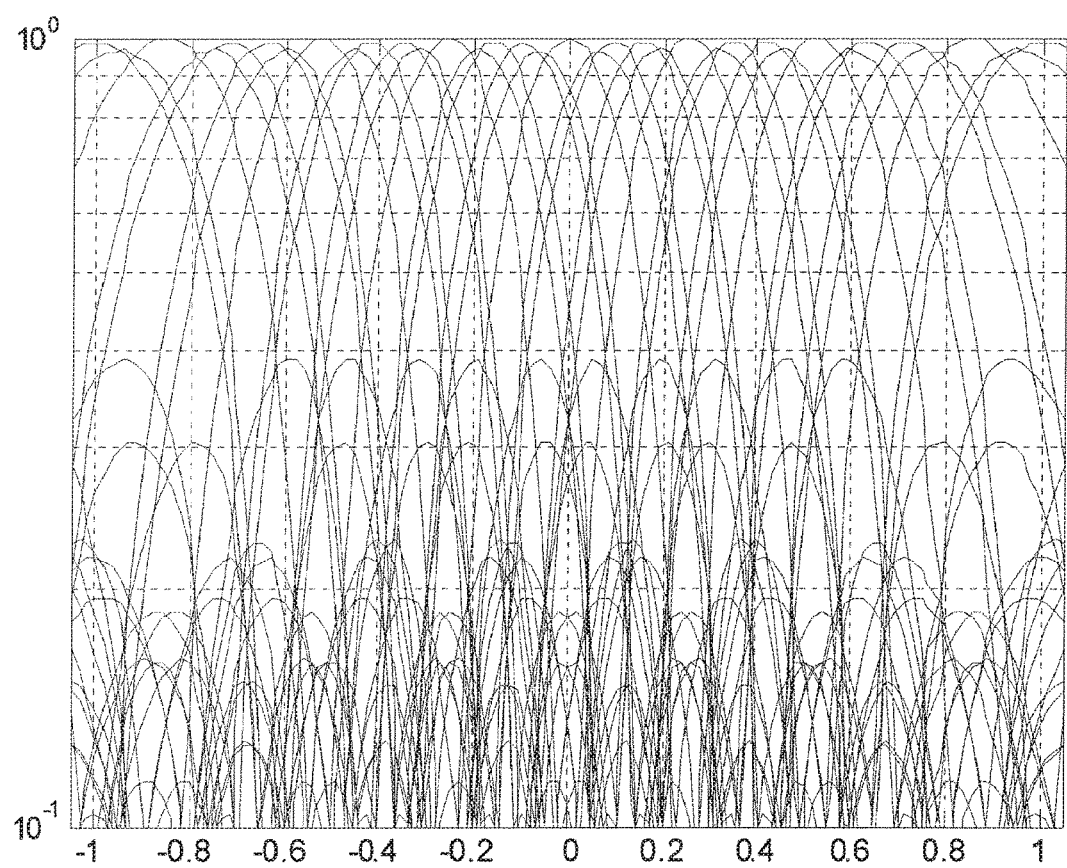
Figure 43:
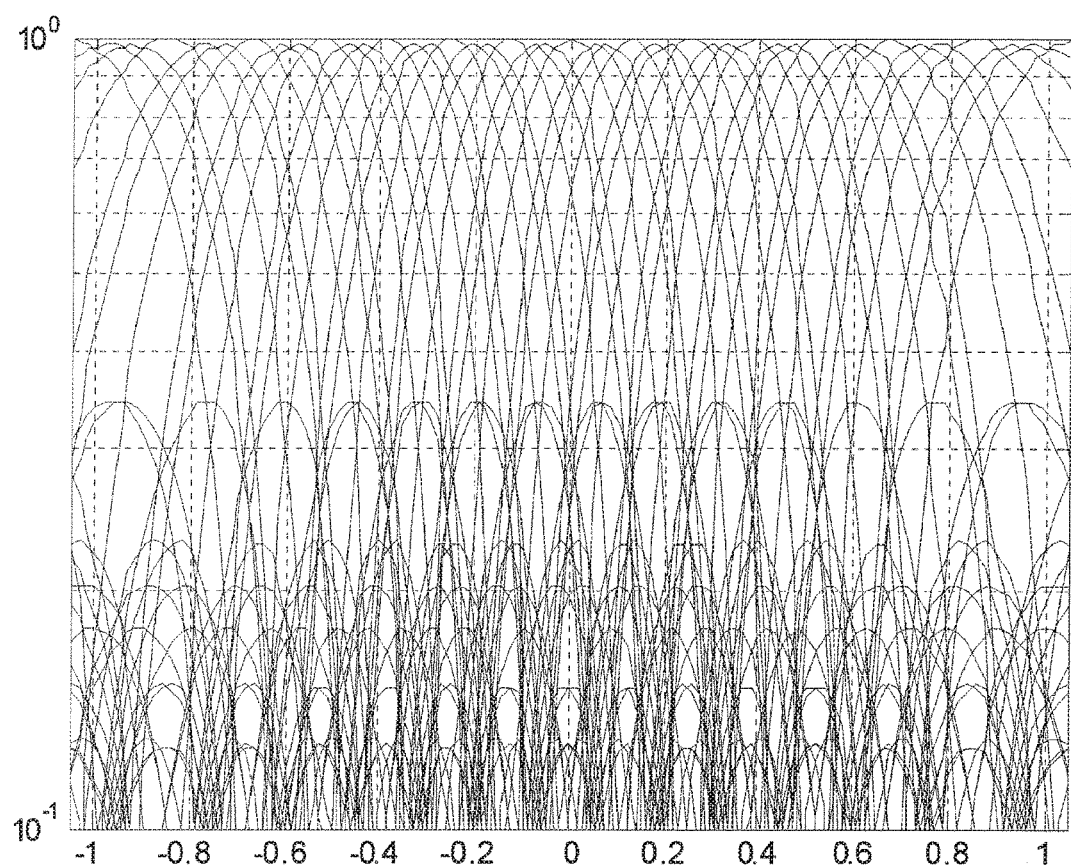

| | OS1 | | | |
|---|---|---|---|---|
| OS2 | 1 | 2 | 3 | 4 |
| 1 | FIG. 28 | FIG. 32 | FIG. 36 | FIG. 40 |
| 2 | FIG. 29 | FIG. 33 | FIG. 37 | FIG. 41 |
| 3 | FIG. 30 | FIG. 34 | FIG. 38 | FIG. 42 |
| 4 | FIG. 31 | FIG. 35 | FIG. 39 | FIG. 43 |

In accordance with the above-mentioned embodiments of the present invention, when constructing the precoder codebook applied to a maximum of 8 Tx antenna transmission using two base matrices, feedback overhead can be reduced and a high-performance codebook can be obtained. In addition, it may be possible to provide a codebook capable of guaranteeing superior performance in various antenna configurations.

Figure 44:
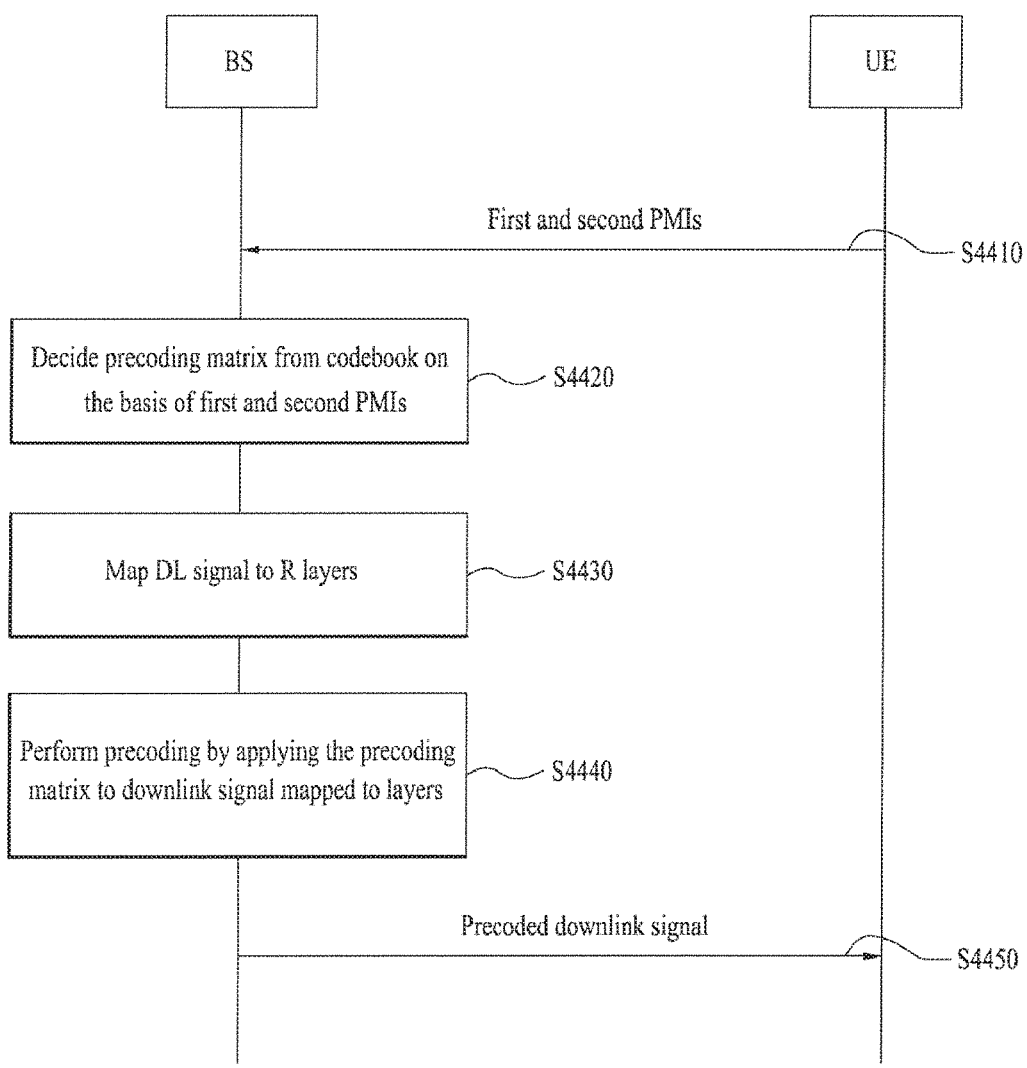
FIG. 44 is a flowchart illustrating a MIMO transmission and reception method according to embodiments of the present invention.

FIG. 44 is a flowchart illustrating a MIMO transmission and reception method according to embodiments of the present invention. UL MIMO transmission and reception methods according to the embodiments of the present invention will hereinafter be described with reference to FIG. 44.

Referring to FIG. 44, a user equipment (UE) can transmit a first PMI and a second PMI to a base station (BS) and the BS can receive the first and second PMIs in step S4410. Prior to step S4410, the UE can generate channel state information (CSI) (for example, RI/PMI/CQI) by measuring a DL channel from the BS. The UE can transmit a PMI to the BS as a CSI feedback in step S4410. In order to prevent overhead of feedback information caused by the increased Tx antenna (a maximum of 8 Tx antennas) from being increased, DL MIMO transmission from the BS can indicate a precoding matrix to be used for DL transmission using a combination of two different PMIs (first and second PMIs).

The BS can determine the precoding matrix indicated by a combination of the first PMI and the second PMI using the codebook in step S4420. Such a codebook may be constructed according to various examples of the present invention. The BS can map DL signals to R layers (where $1 \le R \le 8$) in step S4430. The number R of layers is a rank value. The BS can perform precoding in step S4440. The precoding may correspond to the operation for mapping Tx layers to antennas. The BS can map DL signals transmitted through R layers to Tx antennas using the decided precoding matrix in step S4420.

The BS can transmit a precoded DL signal (i.e., a signal mapped to the Tx antenna) to the UE, and the UE can receive the precoded DL signal from the BS in step S4450. After performing step S4460, the UE performs processing of the received DL signal using the same precoding matrix as a precoding matrix applied to the BS, such that it can recover a downlink signal. For example, the UE performs inverse precoding that multiplies the Hermitian matrix of the precoding matrix by the received DL signal, such that it can recover a downlink signal.

An example of the codebook used by (or prestored in) the BS will be described with reference to step S4420. For example, it is assumed that the BS includes 2·N transmit (Tx) antennas (where N is a natural number). For example, the BS may include 8 Tx antennas.

In this case, the codebook for MIMO transmission through 2·N transmit (Tx) antennas may include matrices shown in Equation 54 for an even number R.

$$\begin{bmatrix} W_1 & W_1 \\ aW_1 & -aW_1 \end{bmatrix}$$ [Equation 54]

The matrices of Equation 54 have characteristics related to Equation 12. For example, a is a specific value for adjusting a relative phase. In addition, since $W_2$ has the size of 2×2 as shown in Equation 12, $W_1$ may be composed of N rows corresponding to half the number of Tx antennas, or may be composed of R/2 columns corresponding to half the number (rank) of Tx layers. In other words, $W_1$ may be composed of the N×(R/2)-sized matrix. In addition, $W_1$ may be composed of a DFT matrix. For example, $W_1$ may be composed of a matrix of the codebook for 4 Tx antennas shown in Table 4.

If R is an even number, $W_1$ may be composed of a matrix [v1 ... v(R/2)]. That is, $W_1$ may be composed of R/2 column vectors. For example, $W_1$ may be composed of two column vectors [v1 v2]. In this case, $W_1$ is an N×(R/2) matrix, and each of v1 ... v(R/2) may be composed of an (N×1) matrix. In addition, each of v1 ... v(R/2) may be composed of a DFT matrix.

Therefore, assuming that the number of Tx layers is 4 (i.e., R=4), $W_1$ may be represented by the following equation 55. $W_1$ may have the same format as the codebook of Rank 4 shown in Table 6.

$$\begin{bmatrix} v1 & v2 & v1 & v2 \\ a \cdot v1 & a \cdot v2 & -a \cdot v1 & -a \cdot v2 \end{bmatrix}$$ [Equation 55]

In addition, the codebook according to the examples of the present invention may have nested properties. For example, assuming that the number of Tx layers is denoted by $3 \le R \le 7$, the precoding matrix for R layers may be composed of a column subset of the precoding matrix of (R+1) layers. For example, as shown in Table 6, the codebook of Rank 7 may be configured to exclude one column from the codebook of Rank 8, and the codebook of Rank 5 may be configured to exclude one column from the codebook of Rank 6. Alternatively, the codebook of Rank 3 may be configured to exclude one column from the codebook of Rank 4.

In association with a method for transmitting/receiving a codebook based signal as shown in FIG. 44, the contents described in the above-mentioned embodiments may be used independently of each other or two or more embodiments may be simultaneously applied, and the same parts may be omitted herein for convenience and clarity of description.

In addition, the principles of the present invention may also be applied to UL MIMO transmission and reception according to the present invention in association with not only MIMO transmission between a base station (BS) and a relay node (RN) (for use in a backhaul uplink and a backhaul downlink) but also MIMO transmission between an RN and a UE (for use in an access uplink and an access downlink).

Figure 45:
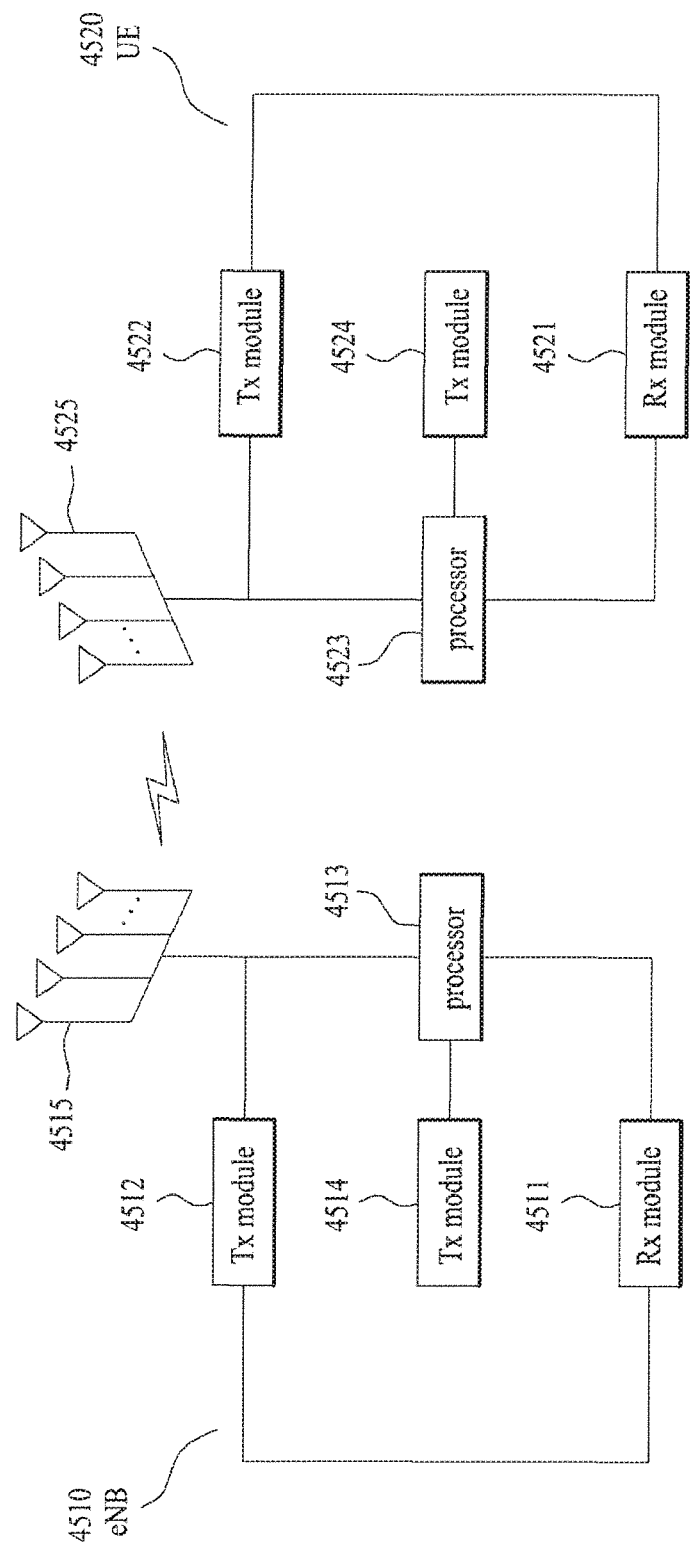
FIG. 45 is a block diagram illustrating a base station (BS) and a user equipment (UE) applicable to embodiments of the present invention.

FIG. 45 is a block diagram of a BS apparatus and a UE apparatus according to an embodiment of the present invention.

Referring to FIG. 11, a BS (or eNB) apparatus 4510 may include a reception (Rx) module 4511, a transmission (Tx) module 4512, a processor 4513, a memory 4514, and a plurality of antennas 4515. The plurality of antennas 4515 may be contained in the BS apparatus supporting MIMO transmission and reception. The reception (Rx) module 1111 may receive a variety of signals, data and information on uplink starting from the UE. The transmission (Tx) module 4512 may transmit a variety of signals, data and information on downlink for the UE. The processor 4513 may provide overall control to the BS apparatus 1110.

The BS apparatus 4510 according to one embodiment of the present invention may be constructed to transmit downlink signals through 2·N (N being a natural number) Tx antennas. The memory 4514 of the BS apparatus may store the codebook including the precoding matrix. The processor 4513 of the BS apparatus may be configured to receive the first and second PMIs from the UE through the Rx module 4511. The processor 4513 may be configured to decide the precoding matrix indicated by a combination of the first and second PMIs from the codebook stored in the memory 4514.

The processor 4513 may be configured to map DL signals to R layers (where 1≤R≤8). The processor 4513 may be configured to precode DL signals mapped to R layers using the precoding matrix. Through the Tx module 4512, the processor 4513 may be configured to transmit the precoded signals to the UE over 2·N Tx antennas. In this case, the prestored codebook may include the precoding matrices of Equation 54 when R is an even number. As shown in Equation 54, $W_1$ is an N×(R/2) matrix, and a is a coefficient regarding the phase.

The processor 4513 of the BS apparatus 4510 processes information received at the BS apparatus 4510 and transmission information. The memory 4514 may store the processed information for a predetermined time. The memory 4514 may be replaced with a component such as a buffer (not shown).

Referring to FIG. 45, a UE apparatus 4520 may include a reception (Rx) module 4521, a transmission (Tx) module 4522, a processor 4523, a memory 4524, and a plurality of antennas 4525. The plurality of antennas 4525 may be contained in the UE apparatus supporting MIMO transmission and reception. The reception (Rx) module 4521 may receive a variety of signals, data and information on downlink starting from the eNB. The transmission (Tx) module 4522 may transmit a variety of signals, data and information on uplink for the eNB. The processor 4523 may provide overall control to the UE apparatus 4520.

The UE apparatus 4520 according to one embodiment of the present invention may be constructed to process downlink signals transmitted from the BS apparatus 4510 including 2·N (N is a natural number) Tx antennas. The memory 4524 of the UE apparatus may store the codebook including the precoding matrix. The processor 4523 of the UE apparatus may be configured to transmit the first and second PMIs indicating the precoding matrix selected from the codebook stored in the memory 4524 to the BS apparatus 4510 through the Rx module 4511. The processor 4523 may be configured to receive a DL signal transmitted over 2·N Tx antennas through the Rx module 4521. In more detail, the DL signal is mapped to R layers (where 1≤R≤8) by the BS apparatus 4510, and is then precoded by the precoding matrix indicated by a combination of the first PMI and the second PMI. The processor 4523 may be configured to process a DL signal using the precoding matrix. In this case, the prestored codebook may include precoding matrices of Equation 54 when R is an even number. As shown in Equation 54, $W_1$ is an N×(R/2) matrix, and a is a coefficient regarding the phase.

The processor 4523 of the UE apparatus 4520 processes information received at the UE apparatus 4520 and transmission information. The memory 4524 may store the processed information for a predetermined time. The memory 4524 may be replaced with a component such as a buffer (not shown).

The specific configurations of the above eNB and UE apparatuses may be implemented such that the various embodiments of the present invention are performed independently or two or more embodiments of the present invention are performed simultaneously. Redundant matters will not be described herein for clarity.

The BS apparatus 4510 shown in FIG. 45 may also be applied to a relay node (RN) acting as a DL transmission entity or UL reception entity, and the UE apparatus 4520 shown in FIG. 45 may also be applied to a relay node (RN) acting as a DL reception entity or UL transmission entity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to a variety of mobile communication systems.

The invention claimed is:

1. A method for transmitting a precoding matrix indicator (PMI) by a user equipment (UE) in a Multiple-Input Multiple-Output (MIMO) system, the method comprising:
  determining, by the UE, a precoding matrix applicable to a downlink transmission from a base station (BS) in a codebook; and
  transmitting, by the UE to BS, at least one PMI corresponding to the determined precoding matrix to BS,
  wherein the codebook includes precoding matrices applicable to a downlink transmission of R layers transmitted via through 2·N (N being a natural number>0) transmit (Tx) antennas, and wherein, the codebook includes precoding matrices configured in the form of $$\begin{bmatrix} W_1 & W_1 \\ aW_1 & -aW_1 \end{bmatrix},$$

wherein $W_1$ is an N×(R/2) matrix and a is a coefficient of a phase,
wherein R is an even number,
wherein when R is equal to 4 (R=4), the precoding matrices are configured in the form of $$\begin{bmatrix} v1 & v2 & v1 & v2 \\ a \cdot v1 & a \cdot v2 & -a \cdot v1 & -a \cdot v2 \end{bmatrix},$$

and
wherein v1 is an N×1 matrix and v2 is an N×1 matrix.

2. The method according to claim 1, wherein $W_1$ is a Discrete Fourier Transform (DFT) matrix.

3. The method according to claim 1, wherein:
$W_1$ is configured as a matrix of [v1 . . . v(R/2)].

4. The method according to claim 3, wherein each of v1 . . . v(R/2) is configured as a DFT matrix.

5. The method according to claim 1, wherein:
the precoding matrix of the R layers is comprised of a column subset of precoding matrices of (R+1) layers.

6. The method according to claim 1, wherein N is set to 4 (N=4) or more.

7. The method according to claim 1, the precoding matrix is represented by a form of a product of two matrices.

8. The method according to claim 7, the product is Kronecker product.

9. The method according to claim 7, the precoding matrix is represented by $W=W_2 \otimes W_1$, and the W2 is related to the coefficient phase.

10. A method for transmitting downlink signal using 2·N (N being a natural number>0) transmit Tx antennas by a base station (BS) in a Multiple-Input Multiple-Output (MIMO) system, the method comprising:
mapping, by the BS, the downlink signal to R layers;
precoding, by the BS, the downlink signal mapped to the R layers by applying a precoding matrix in a pre-stored codebook; and
transmitting, by the BS, the precoded downlink signal to a user equipment (UE) through 2·N Tx antennas,
wherein the codebook includes precoding matrices configured in the form of $$\begin{bmatrix} W_1 & W_1 \\ aW_1 & -aW_1 \end{bmatrix},$$

wherein $W_1$ is an N×(R/2) matrix and a is a coefficient of a phase,
wherein R is an even number,
wherein when R is equal to 4 (R=4), the precoding matrices are configured in the form of $$\begin{bmatrix} v1 & v2 & v1 & v2 \\ a \cdot v1 & a \cdot v2 & -a \cdot v1 & -a \cdot v2 \end{bmatrix},$$

and
wherein v1 is an N×1 matrix and v2 is an N×1 matrix.

11. A user equipment (UE) for transmitting a precoding matrix indicator (PMI) in a Multiple-Input Multiple-Output system, the UE comprising:
a reception (Rx) module;
a transmission (Tx) module;
a memory; and
a processor;
wherein the processor is configured to determine a precoding matrix applicable to a downlink transmission from a base station (BS) in a pre-stored codebook,
wherein the Tx module is configured to transmit at least one PMI corresponding to the determined precoding matrix to the BS,
wherein the codebook includes precoding matrices applicable to a downlink transmission of R layers transmitted by the base station through 2·N (N being a natural number>0) transmit (Tx) antennas, and
wherein the codebook includes precoding matrices configured in the form of $$\begin{bmatrix} W_1 & W_1 \\ aW_1 & -aW_1 \end{bmatrix},$$

wherein $W_1$ is an N×(R/2) matrix and a is a coefficient of a phase,
wherein R is an even number,
wherein when R is equal to 4 (R=4), the precoding matrices are configured in the form of $$\begin{bmatrix} v1 & v2 & v1 & v2 \\ a \cdot v1 & a \cdot v2 & -a \cdot v1 & -a \cdot v2 \end{bmatrix},$$

and
wherein v1 is an N×1 matrix and v2 is an N×1 matrix.

12. A base station (BS) for transmitting a downlink signal in a Multiple-Input Multiple-Output system, the BS comprising:
2·N (N being a natural number, N>0) transmit (Tx) antennas;
a transmission (Tx) module for transmitting the downlink signal to a user equipment (UE) through the 2·N Tx antennas;
a reception (Rx) module for receiving an uplink signal from a user equipment (UE);
a memory for storing a codebook including a precoding matrix; and
a processor for controlling the base station (BS),
wherein the processor is configured to:
map the downlink signal to R layers,
perform precoding on the downlink signal mapped to the R layers by applying the precoding matrix in the pre-stored codebook, and
control the Tx module to transmit the precoded downlink signal to the user equipment (UE) through 2·N Tx antennas, and
wherein the codebook includes precoding matrices configured in the form of $$\begin{bmatrix} W_1 & W_1 \\ aW_1 & -aW_1 \end{bmatrix},$$

wherein $W_1$ is an N×(R/2) matrix and a is a coefficient of a phase, wherein R is an even number, wherein when R is equal to 4 (R=4), the precoding matrices are configured in the form of $$\begin{bmatrix} v1 & v2 & v1 & v2 \\ a \cdot v1 & a \cdot v2 & -a \cdot v1 & -a \cdot v2 \end{bmatrix},$$

and wherein v1 is an N×1 matrix and v2 is an N×1 matrix.

* * * * *